US006396937B2

(12) United States Patent
Chen et al.

(10) Patent No.: US 6,396,937 B2

(45) **Date of Patent: *May 28, 2002**

(54) SYSTEM, METHOD, AND PRODUCT FOR INFORMATION EMBEDDING USING AN ENSEMBLE OF NON-INTERSECTING EMBEDDING GENERATORS

(75) Inventors: Brian Chen, Somerville; Gregory W. Wornell, Wellesley, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/758,695

(22) Filed: Jan. 11, 2001

Related U.S. Application Data

(63) Continuation of application No. 09/206,806, filed on Dec. 7, 1998, now Pat. No. 6,233,347, which is a continuation-in-part of application No. 09/082,632, filed on May 21, 1998.

(51) Int. Cl.[7] .................................................. G06K 9/00

(52) U.S. Cl. ...................................................... 382/100

(58) Field of Search ................................ 382/100, 232, 382/248, 251, 276; 380/200, 205, 209, 210, 252, 253, 255, 257, 41, 758, 287; 283/72, 73, 113, 114; 713/150, 151, 168, 187, 189

(56) References Cited

U.S. PATENT DOCUMENTS 5,528,582 A 6/1996 Bodeep et al. .............. 370/276

(List continued on next page.)

FOREIGN PATENT DOCUMENTS

WO PCT/US99/05911 11/1999 ............ G06K/9/00

OTHER PUBLICATIONS

*Gerzon, et al., "A High–Rate Buried Data Channel for Audio CD," Audio Engineering Society Preprint 3551(D301), 94th Convention, Mar. 16–19, 1993, pp. 1–28 and Figs. 2, 4, 6, 8, 10, 12 & 14.

(List continued on next page.)

*Primary Examiner*—Andrew W. Johns
*Assistant Examiner*—Shervin Nakhjavan
(74) *Attorney, Agent, or Firm*—Wolf, Greenfield & Sacks, P.C.

(57) ABSTRACT

A system, method, and product are provided to (1) embed a watermark signal into a host signal, thereby generating a composite signal, (2) optionally enable the composite signal to be transmitted over a communication channel, and (3) optionally extract the watermark signal from the transmitted composite signal. In one embodiment, the invention is a method for watermarking a host signal with a watermark signal. The watermark signal is made up of watermark-signal components, each having one of two or more watermark-signal values. The host signal is made up of host-signal components, each having one of two or more host-signal values. The method includes: (1) generating two or more embedding generators, each corresponding to a single watermark-signal value of a co-processed group of one or more watermark-signal components; (2) having each embedding generator generate two or more embedding values, the total of which is referred to as an original embedding-value set such that at least one embedding value generated by one embedding generator is different than any embedding value generated by another embedding generator; and (3) setting a host-signal value of one or more selected host-signal components to an embedding value of a particular embedding generator, thereby forming a composite-signal value, such that the particular embedding generator corresponds to the watermark-signal value of the co-processed group of watermark-signal components, and such that the embedding value of the particular embedding generator is selected based on its proximity to the host-signal value.

72 Claims, 17 Drawing Sheets

U.S. PATENT DOCUMENTS

| | | | | | |
|---|---|---|---|---|---|
| 5,613,004 | A | | 3/1997 | Cooperman et al. | 380/28 |
| 5,636,292 | A | | 6/1997 | Rhoads | 382/232 |
| 5,646,997 | A | | 7/1997 | Barton | 713/176 |
| 5,659,726 | A | | 8/1997 | Sandford, II et al. | 707/101 |
| 5,664,018 | A | | 9/1997 | Leighton | 380/54 |
| 5,687,236 | A | | 11/1997 | Moskowitz | 380/28 |
| 5,689,587 | A | | 11/1997 | Bender et al. | 382/232 |
| 5,692,205 | A | | 11/1997 | Berry et al. | 707/526 |
| 5,748,763 | A | | 5/1998 | Rhoads | 382/115 |
| 5,819,270 | A | | 10/1998 | Malone et al. | 707/7 |
| 5,828,325 | A | | 10/1998 | Wolosewicz et al. | 341/52 |
| 5,933,798 | A | * | 8/1999 | Linnartz | 702/191 |
| 5,940,135 | A | * | 8/1999 | Petrovic et al. | 348/473 |
| 5,986,691 | A | | 11/1999 | Henderson | 725/111 |
| 6,070,163 | A | | 5/2000 | Malone et al. | 707/7 |
| 6,233,347 | B1 | * | 5/2001 | Chen et al. | 382/100 |
| 6,298,142 | B1 | * | 10/2001 | Nakano et al. | 382/100 |
| 6,330,672 | B1 | * | 12/2001 | Shur | 713/176 |

OTHER PUBLICATIONS

*Oomen, et al., "A Variable–Bit–RateBuried–Data hannel for Compact Disc," Philips Research Laboratories, The Netherlands, pp. 1–11.

*Kundur, et al., "Digital Watermarking Using Multiresolution Wavelet Decomposition," 0–7803–4428–6, Washington State Convention, May 12–15, 1998 IEEE, pp. 2969–2972.

*Zamir et al., "On Lattice Quantization Noise," IEEE Transactions on Information Theory, vol. 42, Jul. 1996, pp. 1152–1159.

*Marcellini et al., "Trellis Coded Quantization of memoryless and Gauss–markov Sources," IEEE Transactions on vol. 38, No. 1, Jan. 1990, pp. 82–93.

Jayant et al., "Digital Coding of Waveforms," Prentice Hall, 1984, pp. 164–175.

*Cox et al., "A secure, robust watermark for multimedia," in Information Hiding, First International Workshop Proceedings, pp. 185–206, Jun. 1996.

*Smith et al., "Modulation and information hiding in images," in Information Hiding, First International Workshop Proceedings, pp. 207–225, Jun. 1996.

*Bender et al., "Techniques for Data Hiding," IBM Systems Journal, vol. 35. Nos. 3&4, 1996, pp. 313–336.

*Boney et al., "Digital Watermarks for Audio Signals," Proc. IEEE Multimedia '96, 1996, pp. 473–480.

*Delaigle et al. "Digital Watermarking," SPIE vol. 2659, 1996, pp. 99–110.

*Davern et al. "Fractal based image steganography," in Information Hiding, First International Workshop Proceedings, pp. 279–294, Jun. 1996.

*Anderson, "Stretching the Limites of Steganography," in Information Hiding. First International Workshop Proceedings, pp. 39–48.

*Pfitzmann, "Information hiding terminology," in Information Hiding, First International Workshop Proceedings, pp. 347–350, Jun. 1996.

*Braudaway, "Protecting Publicly Available Images with a Visible Image Watermark," SPIE vol. 2659, pp. 126–133, Feb. 1996.

*Tanaka et al, "Embedding Secret Information into a Dithered Multi–level Image," Proc. 1990 IEEE Military Communications Conference, pp 216–220, Jun. 1990.

*Hernandez et al., "Performance Analysis of a 2–D–Multipulse Amplitude Modulation Scheme for Data Hiding Hiding and Watermarking of Still Images," IEEE Journal on Selected Areas In Communications, vol. 16 No. 14, pp 510–524 May 1998.

*Alliro Product Information; at least as early as Jan. 8, 1998.

Wu et al., "Data Hiding In Images Via Multiple–Based Number Conversion And Lossy Compression," IEEE Trans. On Consumer Electronics, vol. 44, No. 4, Nov. 1998.

Chen et al., "An Information–Theoretic Approach To The Design Of Robust Digital Watermarking Systems," Proc. Of IEEE ICMCS, vol. I, Mar. 1999, pp. 2061–2064.

Takahiko Fukinuki et al., "Extended Definition TV Fully Compatible with Existing Standards", IEEE Transactions On Communications, vol. COM–32, No. 8, Aug. 1984, pp. 948–953.

Walter S. Ciciora, "4.5 Mbps Data Compatibly Transmitted In 6 MHz Analog Television", presented at the 1998 NCTA Convention in Atlanta, pp. 1–8.

Mitchell D. Swanson et al., "Multimedia Data–Embedding And Watermarking Technologies", Proceedings of the IEEE, vol. 86, No. 6, Jun. 1998, pp. 1064–1087.

Brian Chen et al., "Provably Robust Digital Watermarking", Proc. Of SPIE: Multimedia Systems and Applications II, vol. 3845, 1999 pp. 43–54.

Brian Chen et al., "Dither Modulation: A New Approach to Digital Watermarking And Information Embedding", Proc. Of SPIE: Security and Watermarking of Multimedia Contents, vol. 3657, 1999, pp. 342–353.

F.A.P. Petitcolas et al., "Information Hiding—A Survey", Proceedings of the IEEE, vol. 87, No. 7, Jul. 1999, pp. 1062–1078.

F. Hartung et al, "Multimedia Watermarking Techniques", Proceedings of the IEEE, vol. 87, No. 7, Jul. 1999, p. 1079–1107.

EnCamera Sciences Corporation, Executive Summary, 1998, pp. 1–15.

Mitchell D. Swanson et al., "Data Hiding For Video–In–Video", ICIP–97, vol. 2, 1997, pp. 676–679.

Before the Federal Communications Commission, Washington, DC, In the matter of Digital Data Transmission Within The Video Portion Of Television Broadcast Station Transmissions, MM Docket No. 95–42, RM–7567, Report And Order, Jun. 28, 1996, pp. 1–9.

* cited by examiner

SYSTEM, METHOD, AND PRODUCT FOR INFORMATION EMBEDDING USING AN ENSEMBLE OF NON-INTERSECTING EMBEDDING GENERATORS

RELATED APPLICATION

This application is a continuation of application Ser. No. 09/206,806, filed Dec. 7, 1998, is now U.S. Pat. No. 6,233,347 entitled SYSTEM, METHOD, AND PRODUCT FOR INFORMATION EMBEDDING USING AN ENSEMBLE OF NON-INTERSECTING EMBEDDING GENERATORS, which is a continuation-in-part of U.S. patent application, Ser. No. 09/082,632, entitled "System, Method, and Product for Information Embedding Using An Ensemble of Non-Intersecting Embedding Generators," filed on May 21, 1998.

GOVERNMENT SUPPORT

This invention was made with government support under Grant number F49620-96-10072 awarded by the United States Air Force, and Grant number N00014-96-1-0903 awarded by the United States Navy. The government has certain rights in the invention.

BACKGROUND OF THE INVENTION

1. Field of the Invention

The invention generally relates to systems, methods, and products for watermarking of signals, and, more particularly, to computer-implemented systems, methods, and products for embedding an electronic form of a watermarking signal into an electronic form of a host signal.

2. Related Art

There is growing commercial interest in the watermarking of signals, a field more generally referred to as "steganography." Other terms that refer to this field include "hidden communication," "information hiding," "data hiding," and "digital watermarking." Much of this interest has involved deterrence of copyright infringement with respect to electronically distributed material. Generally, the purpose of known steganographic systems in this field is to embed a digital watermark signal (for example, a serial number) in a host signal (for example, a particular copy of a software product sold to a customer). Other common host signals include audio, speech, image, and video signals. A purpose of many of such digital watermarking systems is to embed the watermark signal so that it is difficult to detect, and so that it is difficult to remove without corrupting the host signal. Other purposes are to provide authentication of signals, or to detect tampering.

Often, such known systems include "coding" functions that embed the watermark signal into the host signal to generate a composite signal, and "decoding" functions that seek to extract the watermark signal from the composite signal. Such functions may also be referred to as transmitting and receiving functions, indicating that the composite signal is transmitted over a channel to the receiver. Generally, the composite signal is suitable for the functions intended with respect to the host signal. That is, the host signal has not been so corrupted by the embedding as to unduly compromise its functions, or a suitable reconstructed host signal may be derived from the composite signal.

Although prevention of copyright infringement has driven much of the current interest in steganographic systems, other applications have also been proposed. For example, digital watermarking could be used by sponsors to automate monitoring of broadcasters' compliance with advertising contracts. In this application, each commercial is watermarked, and automated detection of the watermark is used to determine the number of times and time of day that the broadcaster played the commercial. In another application, captions and extra information about the host signal could be embedded, allowing those with the appropriate receivers to recover the information.

Various known approaches to the implementation of steganographic systems and simple quantization techniques are described in the following publications, which are hereby incorporated by reference: (1) N. S. Jayant and P. Noll, Digital Coding of Waveforms: *Principles and Applications to Speech and Video.* Prentice-Hall, 1984; (2) I. J. Cox, J. Killian, T. Leighton, and T. Shamoon, "A secure, robust watermark for multimedia," in *Information Hiding. First International Workshop Proceedings*, pp.185–206, June 1996; (3) J. R. Smith and B. O. Comiskey, "Modulation and information hiding in images," in *Information Hiding. First International Workshop Proceedings,* pp.207–226, June 1996; (4) W. Bender, D. Gruhl, N. Morimoto, and A. Lu, "Techniques for data hiding," *IBM Systems Journal,* vol.35, no.3–4, pp.313–336, 1996; (5) L. Boney, A. H. Tewfik, and K. N. Hamdy, "Digital watermarks for audio signals," in *Proceedings of the International Conference on Multimedia Computing and Systems* 1996, pp.473–480, June 1996; (6) J. F. Delaigle, C. D. Vleeschouwer, and B. Macq, "Digital watermarking," in *Proceedings of SPIE, the International Society for Optical Engineering,* pp.99–110, Feb. 1996; (7) P. Davern and M. Scott, "Fractal based image steganography," in *Information Hiding. First International Workshop Proceedings*, pp.279–294, Jun. 1996; (8) R. Anderson, "Stretching the limits of steganography," in Information Hiding. First International Workshop Proceedings, pp.39–48, June 1996; (9) B. Pfitzmann, "Information hiding terminology," in *Information Hiding. First International Workshop Proceedings*, pp.347–350, June 1996; and (10) G. W. Braudaway, K. A. Magerlein, and F. Mintzer, "Protecting publicly-available images with a visible image watermark," in *Proceedings of SPIE, the International Society for Optical Engineering*, pp.126–133, Feb. 1996.

Some of such known approaches may be classified as "additive" in nature (see, for example, the publications labeled 2–6, above). That is, the watermark signal is added to the host signal to create a composite signal. In many applications in which additive approaches are used, the host signal is not known at the receiving site. Thus, the host signal is additive noise from the viewpoint of the decoder that is attempting to extract the watermark signal.

Some of such, and other, known approaches (see, for example, the publications labeled 2, 4, 5, 6, and 7, above) exploit special properties of the human visual or auditory systems in order to reduce the additive noise introduced by the host signal or to achieve other objectives. For example, it has been suggested that, in the context of visual host signals, the watermark signal be placed in a visually significant portion of the host signal so that the watermark signal is not easily removed without corrupting the host signal. Visually significant portions are identified by reference to the particularly sensitivity of the human visual system to certain spatial frequencies and characteristics, including line and corner features. (See the publication labeled 2, above.) It is evident that such approaches generally are limited to applications involving the particular human visual or auditory characteristics that are exploited.

One simple quantization technique for watermarking, commonly referred to as "low-bit coding" or "low-bit modulation," is described in the publication labeled 4, above. As described therein, the least significant bit, or bits, of a quantized version of the host signal are modified to equal the bit representation of the watermark signal that is to be embedded.

SUMMARY

The present invention includes in some embodiments a system, method, and product for (1) optionally pre-processing one or more primary signals to generate a transformed host-signal and/or a transformed watermark-signal; (2) embedding one or more watermarked signals and/or transformed watermark signals into a host signal and/or the transformed host signal, thereby generating a composite signal, (2) optionally enabling the composite signal to be transmitted over a communication channel, and (3) optionally extracting the watermark signal from the transmitted composite signal.

In one embodiment, the invention is a method for watermarking a host signal with a watermark signal. The watermark signal is made up of watermark-signal components, each having one of two or more watermark-signal values. The host signal is made up of host-signal components, each having one of two or more host-signal values. The method includes: (1) pre-processing one or more primary-signal components of at least one primary signal to generate one or more transformed host-signal components and one or more transformed watermark-signal components; (2) generating two or more embedding generators, each corresponding to a single watermark-signal value of a co-processed group of one or more transformed watermark-signal components; (3) having each embedding generator generate two or more embedding values, the total of which is referred to as an original embedding-value set such that at least one embedding value generated by one embedding generator is different than any embedding value generated by another embedding generator; and (4) setting a host-signal value of one or more selected transformed host-signal components to an embedding value of a particular embedding generator, thereby forming a composite-signal value, such that (a) the particular embedding generator corresponds to the watermark-signal value of the co-processed group of watermark-signal components, (b) the embedding value of the particular embedding generator is selected based at least in part on its proximity to the host-signal value, and (c) at least one embedding interval of one embedding generator is not the same as any embedding interval of at least one other embedding generator. In one embodiment, the embedding value of the particular embedding generator is an embedding value that is the closest of all embedding values of that embedding generator in distance to the host-signal value.

In some embodiments, the method may also include a fourth step of extracting the first watermark-signal value from the composite-signal value to form a reconstructed watermark-signal value. In some implementations, this fourth step may include the steps of (a) acquiring the composite-signal value, which may include channel noise; (b) replicating the original embedding-value set to form a replicated embedding-value set such that each embedding value of the replicated embedding-value set has the same correspondence to a single watermark-signal value as has the embedding value of the original embedding-value set from which it is replicated; (c) selecting an embedding value of the replicated embedding-value set based on its proximity to the composite-signal value; and (d) setting the reconstructed watermark-signal value to the watermark-signal values to which the selected embedding value corresponds.

In some implementations, the selection of an embedding value may be based on proximity in terms of a Euclidean measure, a weighted Euclidean measure, or by a non-Euclidean measure including, for example, a minimum-probability-of-error measure or a maximum a posteriori measure.

The present invention may also implement adaptive embedding and, in some implementations, super-rate quantization. In one such embodiment, the invention is a system that watermarks a host signal with a watermark signal, the watermark signal comprising watermark-signal components, each having one of a plurality of watermark-signal values, and the host signal comprising host-signal components, each having one of a plurality of host-signal values. The system includes an ensemble designator that designates a plurality of adaptive embedding generators, each corresponding to a single watermark-signal value of a co-processed group of one or more watermark-signal components. Also included is an adaptive embedding value generator that generates, by each adaptive embedding generator, a plurality of adaptive embedding values, the total of each plurality of embedding values comprising a first embedding-value set comprising a plurality of embedding super-groups, wherein at least one embedding value generated by a first embedding generator is not the same as any embedding value generated by a second embedding generator. Further included is a point coder that sets at least one host-signal value of one or more selected host-signal components to a first embedding value of a third embedding generator, thereby forming a composite-signal value, such that (a) the first embedding value is selected based at least in part on its being the furthest in a first embedding super-group from the host-signal value, (b) the first super-group comprises a plurality of embedding values of the third embedding generator that are each closer to the host-signal value than any other embedding value of the third embedding generator, and (c) the third embedding generator corresponds to a first watermark-signal value of the group of co-processed watermark-signal components.

In some implementations of these embodiments, the at least one embedding interval of one embedding generator is not the same as any embedding interval of at least one other embedding generator. Also, in some implementations, the first super-group includes a pre-selected number of embedding values. The first super-group may also include a pre-selected number of embedding values, each having a pre-selected value. Also, the host-signal value may be predicted based on at least one previously processed host-signal value. Alternatively, the number of embedding values in the first super-group is adaptively determined based on statistical analysis of a likely value of the host-signal value in view of at least one other host-signal value of the host signal. The other host-signal value may be determined before the first embedding value is selected.

In one embodiment, the present invention is a system that watermarks a host signal with a watermark signal. The watermark signal is made up of watermark-signal components, each having one of two or more watermark-signal values. The host signal is made up of host-signal components, each having one of two or more host-signal values. The system includes: (1) a pre-processor that operates on one or more primary-signal components of at least one primary signal to generate one or more transformed host-signal components and one or more transformed watermark-signal components; (2) an ensemble generator that generates two or more embedding generators, each corresponding to a single watermark-signal value of a co-processed group of one or more watermark-signal components; (3) an embedding value generator that provides that each embedding generator generate two or more embedding values, the total of which is referred to as an original embedding-value set such that at least one embedding value generated by one embedding generator is different than any embedding value generated by another embedding generator; and (3) a point coder that sets a host-signal value of one or more selected transformed host-signal components to an embedding value of a particular embedding generator, thereby forming a composite-signal value, such that (a) the particular embedding generator corresponds to the watermark-signal value of the co-processed group of transformed watermark-signal components, (b) the embedding value of the particular embedding generator is selected based on its proximity to the host-signal value, and (c) at least one embedding interval of one embedding generator is not the same as any embedding interval of at least one other embedding generator.

The pre-processor of this embodiment may include a first format transformer that transforms at least a first of the primary-signal components to a first format, thereby generating at least a first transformed host-signal component. The pre-processor may also include a second format transformer that transforms at least a second of the primary-signal components to a second format, thereby generating at least a first transformed watermark-signal component.

In one implementation, the at least one primary signal is an audio signal, and the first and second formats are audio formats. At least one of the first and second formats may be a digital audio format. Also, one of the first and second formats may be an analog audio format. In other implementations, the at least one primary signal is a television video signal, and the first and second formats are television video formats, either or both of which may be digital, or may be analog. In further implementations, one of the at least one primary signals is a supplemental paging signal, the second of the primary-signal components is a component of the supplemental paging signal, and the second format is a paging format, which may be digital or analog.

In some implementations, the pre-processor includes a first format transformer that transforms at least a first of the primary-signal components to a first format, thereby generating at least one first-format transformed signal component. Also included in these embodiments is a second format transformer that transforms at least a second of the primary-signal components to a second format, thereby generating at least a first transformed watermark-signal component, and a third format transformer, coupled to the first format transformer, that transforms the at least one first-format transformed signal component, thereby generating at least a first transformed host-signal component. The third format transformer may be a frequency modulator, an amplitude modulator, a digital modulator, or any other kind of modulator.

Further, in some implementations the pre-processor includes a transformer that transforms at least a first of the primary-signal components, thereby generating at least a first transformed host-signal component. The transformer may be a Fourier transformer, a Fourier-Mellin transformer, a Radon transformer. The system of these, or other, embodiments may also include a pre-transmission processor that applies domain inversion to a composite-signal component having the composite-signal value. The pre-transmission processor may apply Fourier inversion, Fourier-Mellin inversion, Radon inversion, or another type of domain inversion. Also, a transformer of this embodiment may be an encrypter, an error-correction encoder, an error-detection encoder, an interleaver, or another type of transformer.

In some implementations, the system also includes an information extractor that extracts the first watermark-signal value from the first embedding value. This information extractor may include (1) a synchronizer that acquires a composite signal including the composite-signal value; (2) an ensemble replicator that replicates the first embedding-value set to form a second embedding-value set, each embedding value of the second embedding-value set having the same correspondence to a single watermark-signal value as has the one embedding value of the first embedding-value set from which it is replicated; and (3) a point decoder that selects a second embedding value of the second embedding-value set based on its proximity to the composite-signal value, and that sets the first watermark-signal value to a one of the plurality of watermark-signal values to which the second embedding value corresponds.

In some aspects of these implementations, the synchronizer includes an edge aligner that detects an edge of the composite signal for orienting the composite signal. Also, the synchronizer may include means for registering the composite signal. The means for registering the composite signal may include resampling means employing interpolation kernels.

Also, in some implementations, the embedding value generator generates the first plurality of embedding values based on a first pre-determined relationship between each of the two or more embedding values generated by the third embedding generator. In some aspects of these implementations, the first predetermined relationship is predetermined based on trellis-coded quantization. In some aspects, the first predetermined relationship is predetermined based on lattice quantization.

In further embodiments, the present invention is a system that watermarks a host signal with a watermark signal, the watermark signal comprising watermark-signal components, each having one of a plurality of watermark-signal values, and the host signal comprising host-signal components, each having one of a plurality of host-signal values. The system includes a pre-processor that operates on one or more primary-signal components of at least one primary signal and one or more supplemental-signal components of a supplemental signal to generate one or more transformed host-signal components. Also included in the system is an ensemble designator that designates a plurality of embedding generators, each corresponding to a single watermark-signal value of a co-processed group of one or more watermark-signal components. Another element of the system is an embedding value generator that generates, by each embedding generator, a plurality of embedding values, the total of each plurality of embedding values comprising a first embedding-value set, wherein at least one embedding value generated by a first embedding generator is not the same as any embedding value generated by a second embedding generator. In addition, the system includes a point coder that sets at least one host-signal value of one or more selected transformed host-signal components to a first embedding value of a third embedding generator, thereby forming a composite-signal value, such that (a) the third embedding generator corresponds to a first watermark-signal value of the group of co-processed watermark-signal components, (b) the first embedding value is selected based at least in part on its proximity to the at least one host-signal value, and (c) at least one embedding interval of one embedding generator is not the same as any embedding interval of at least one other embedding generator. In one implementation, the pre-processor includes a conventional embedder that embeds at least one supplemental-signal component into at least one primary-signal component to generate at least one transformed host-signal component. More generally, the invention includes various multiple-embedding techniques wherein at least one of the embeddings is implemented using the embedding techniques of the present invention in conjunction with (a) one or more conventional embedding techniques and/or (b) other instances of the embedding techniques of the present invention.

BRIEF DESCRIPTION OF THE DRAWINGS

The present invention will be more clearly appreciated from the following detailed description when taken in conjunction with the accompanying drawings, in which like reference numerals indicate like structures or method steps, in which the leftmost one or two digits of a reference numeral indicate the number of the figure in which the referenced element first appears (for example, the element 456 appears first in FIG. 4, the element 1002 first appears in FIG. 10), solid lines generally indicate control flow, dotted lines generally indicate data flow, and such that.

DETAILED DESCRIPTION

Figure 1:
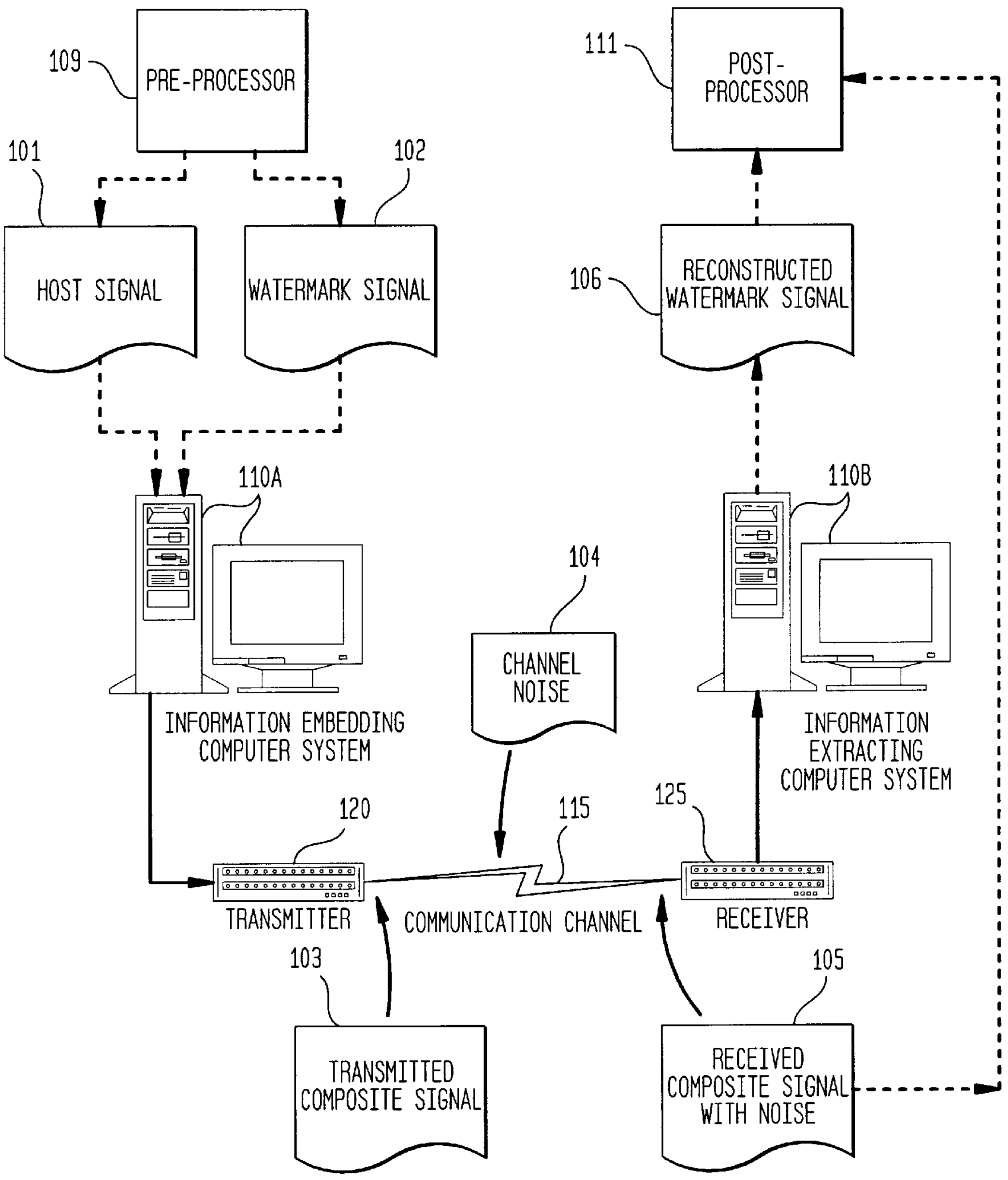
FIG. 1 is a simplified block diagram of one embodiment of a first computer system that cooperates with one embodiment of an information embedder of the present invention, one embodiment of a second computer system that cooperates with one embodiment of an information extractor of the present invention, and a communication channel coupling the two computer systems.

The attributes of the present invention and its underlying method and architecture will now be described in greater detail in reference to one embodiment of the invention, referred to as information embedder and extractor 200. Embedder-extractor 200 embeds watermark signal 102 into host signal 101 to generate composite signal 103, optionally enables composite signal 103 to be transmitted over communication channel 115 that may include channel noise 104, and optionally extracts reconstructed watermark signal 106 from the transmitted composite signal.

Following is a glossary of terms used with a particular meaning in describing the functions, elements, and processes of embedder-extractor 200. Some of such terms are defined at greater length below. This glossary is not necessarily exhaustive; i.e., other terms may be explicitly or implicitly defined below.

"Communication channel" means any medium, method, or other technique for transferring information, including transferring information to another medium or using a storage device or otherwise. The term "communication channel" thus is more broadly applied in this description of the present invention than may typically be used in other contexts. For example, "communication channel" as used herein may include electromagnetic, optical, or acoustic transmission mediums; manual or mechanical delivery of a floppy disk or other memory storage device; providing a signal to, or obtaining a signal from, a memory storage device directly or over a network; and using processes such as printing, scanning, recording, or regeneration to provide, store, or obtain a signal. Signal processing may take place in the communication channel. That is, a signal that is "transmitted" from an embedding computer system may be processed in accordance with any of a variety of known signal processing techniques before it is "received" by an extracting computer system. For example, an audio signal may be modulated in accordance with any of a variety of known techniques, such as frequency modulation, or techniques to be developed in the future. The term "transmitted" is used broadly herein to refer to any technique for providing a composite signal and the term "received" is used broadly herein to refer to any technique for obtaining the transmitted composite signal.

"Composite signal" is a signal including a host signal, and a watermark signal embedded in the host signal.

"Co-processed group of components of a watermark signal" means components of a watermark signal that are together embedded in one or more host signal components, such host signal components being used to embed such co-processed group of components, and no other components of the watermark signal. For example, a watermark signal may consist of four bits, the first two of which are together embedded (co-processed) in any number of pixels of a host signal image, and the remaining two of which are together embedded (co-processed) in any number of pixels of the host signal image.

"Dithered quantization value" means a value generated by a dithered quantizer. A dithered quantization value may be a scalar, or a vector, value.

"Dithered quantizer" means a type of embedding generator that generates one or more uniquely mapped, dithered quantization values. Further, each of the dithered quantization values generated by any one of an ensemble of two or more dithered quantizers differs by an offset value (i.e., are shifted) from corresponding dithered quantization values generated by each other dithered quantizer of the ensemble. These dithered quantization values may also be nonintersecting.

"Ensemble of embedding generators" means two or more embedding generators, each corresponding to one, and only one, of the potential watermark-signal values of a co-processed group of components of a watermark signal.

"Embedding generator" means a list, description, table, formula, function, or other generator or descriptor that generates or describes embedding values. One illustrative example of an embedding generator is a dithered quantizer.

"Embedding interval" for a particular embedding value for a particular embedding generator is the set of host-signal values for which the embedding generator selects the embedding value as the composite-signal value.

"Embedding value" means a value generated, described, or otherwise specified or indicated (hereafter, simply "generated") by an embedding generator. An embedding value may be a scalar, or a vector, value.

"Host signal" means a signal into which a watermark signal is to be embedded. In one illustrative example, a host signal is a black-and-white image having 256×256 (=65,536) pixels, each pixel having a grey scale value.

"Host-signal component" means a digital, digitized, or analog elemental component of the host signal. For example, referring to the illustrative example provided with respect to the definition of "host signal," one host-signal component is one of the 65,536 pixels of the host signal picture.

"Host-signal value" means a value of one host-signal component; for example, the grey-scale value of one of the 65,536 pixels of the illustrative host signal picture. The host-signal value may be a scalar, or a vector, value. With respect to a vector value, the host-signal value may be, for example, a vector having a length that represents the RGB (red-green-blue) value of one or more pixels of an image. Other types of values of host-signal components include color; measures of intensity other than the illustrative grey-scale; texture; amplitude; phase; frequency; real numbers; integers; imaginary numbers; text-character code; parameters in a linear or nonlinear representation of the host signal, and so on.

"Noise" means distortions or degradations that may be introduced into a signal, whatever the source or nature of the noise. Some illustrative sources of noise include processing techniques such as lossy compression (e.g., reducing the number of bits used to digitally represent information), re-sampling, under-sampling, over-sampling, format changing, imperfect copying, re-scanning, re-recording, or additive combinations of signals; channel noise due to imperfections in the communication channel such as transmission loss or distortion, geometric distortion, warping, interference, or extraneous signals entering the channel; and intentional or accidental activities to detect, remove, change, disrupt, or in any way affect the signal. The term "noise" thus is more broadly applied in this description of the present invention than may typically be used in other contexts.

"Non-intersecting embedding generator ensemble" means an ensemble of embedding generators that generate non-intersecting embedding values. One embodiment of a non-intersecting embedding generator ensemble is an ensemble of non-intersecting dithered quantizers.

"Non-intersecting embedding values" means that no two or more embedding values generated by any of an ensemble of embedding generators are the same. One embodiment of non-intersecting embedding values are non-intersecting dithered quantization values generated by dithered quantizers.

"Signal" means analog and/or digital information in any form whatsoever, including, as non-limiting examples: motion or still film; motion or still video, including, for example, high-definition television; print media; text and extended text characters; projection media; graphics; audio; modulated audio, such as frequency-modulated audio; paging signals; sonar; radar; x-ray; MRI and other medical images; database; data; identification number, value, and/or sequence; and a coded or transformed version of any of the preceding, including, for example, an encrypted version. As a further example, a signal may have any form, including spectral, temporal, or spatial forms. These forms need not be continuous. For example, rather than a continuous waveform, a signal may be a train of spikes wherein the amplitudes of and/or intervals between spikes contain information, or the signal may be a point process.

"Transmit" means to enable a signal (typically, a composite signal) to be transferred from an information embedding system to an information extracting system over a communication channel.

"Uniquely mapped dithered quantization value" is one example of a uniquely mapped embedding value that is generated by an embedding generator that is a dithered quantizer.

"Uniquely mapped embedding value" means that each embedding generator corresponds to one, and only one, watermark-signal value of any of a co-processed group of components of a watermark signal, and that no one of the embedding values generated by such embedding generators is the same as any other embedding value generated by such embedding generators.

"Watermark signal" means a signal to be embedded in a host signal. For example, an 8-bit identification number may be a watermark signal to be embedded in a host signal, such as the illustrative 256×256 pixel picture. As indicated by the definition of "signal" above, it will be understood that a watermark signal need not be an identification number or mark, but may be any type of signal whatsoever. Thus, the term "watermark" is used more broadly herein than in some other applications, in which "watermark" refers generally to identification marks. Also, a watermark signal need not be a binary, or other digital, signal. It may be an analog signal, or a mixed digital-analog signal. A watermark signal also may have been subject to error-correction, compression, transformation, or other signal processing, such as encryption. The watermark signal may also be determined, in whole or in part, based on the host signal. Such dependence may occur, for example, in an application in which watermarking provides authentication of a signal, as when a digital signature is derived from the host signal and embedded therein, and the extracted digital signature is compared to a signature that is similarly derived from the host signal.

"Watermark-signal component" means a digital, digitized, or analog elemental component of the watermark signal. For example, in the illustrative example in which the watermark signal is an 8-bit identification number, one watermark-signal component is one bit of the 8-bits.

"Watermark-signal value" means one of a set of two or more potential values of a watermark-signal component or of a co-processed group of watermark-signal components. That is, such value may be a scalar or a vector value. For example, watermark-signal values include either the value "0" or "1" of the illustrative one bit of the 8-bit watermark identification signal, or the values "00," "01" "10," or "11" of a co-processed two bits of such signal. With respect to a vector value, the watermark-signal value may be, for example, a vector having a length that represents the RGB value of one or more components of the watermark signal. Other types of values of watermark-signal components include color; intensity; texture; amplitude; phase; frequency; real numbers; other integers; imaginary numbers; text-character code; parameters of a linear or non-linear representation of the watermark signal; and so on. Although a watermark-signal component has two or more potential watermark-signal values, it will be understood that the value of such component need not vary in a particular application. For example, the first bit of the illustrative 8-bit watermark identification signal may generally, or invariably, be set to "0" in a particular application.

Embedder-extractor 200 includes information embedder 201 and information extractor 202. Information embedder 201 generates an ensemble of embedding generators that produce embedding values, each such embedding generator corresponding to a possible value of a co-processed group of components of a watermark signal. In the illustrated embodiment, the embedding generators are dithered quantizers, and the embedding values thus are dithered quantization values. Information embedder 201 also changes selected values of the host signal to certain dithered quantization values, thereby generating a composite signal. Such dithered quantization values are those generated by the particular dithered quantizer of the ensemble of dithered quantizers that corresponds to the value of the portion of the watermark signal that is to be embedded. The composite signal may be provided to a transmitter for transmission over a communication channel. In some embodiments, the dithered quantization values to which information embedder 201 changes selected values of the host signal are those that are closest to the host-signal values, thereby satisfying one or more distortion criteria.

In other embodiments, referred to herein for convenience as "super-rate" embodiments, members of a first super-group of dithered quantization values to which information embedder 201 changes selected values of the host signal in order to embed a first value of a co-processed group of components of a watermark signal are those that are furthest from members of a corresponding second super-group of dithered quantization values to which information embedder 201 changes selected values of the host signal in order to embed a second value of the co-processed group of components of the watermark signal. The first and second super-groups are those that are closest of respective ensembles of super-groups to the corresponding host-signal values, thereby satisfying one or more distortion criteria. Also, by selecting those members of corresponding first and second super-groups that are furthest from each other, the super-rate embodiments also satisfy one or more reliability criteria. As described in greater detail below, super-rate quantization is one implementation of what is referred to herein as "adaptive embedding." An adaptive embedding technique is one in which embedding values are generated, or selected, at least in part on the basis of a history of the embedding process. That is, the observed behavior of a host signal is used to predict future behavior, and this predicted future behavior is used, at least in part, to change, supplement, or replace embedding values.

Information extractor 202 receives the received composite signal with channel noise and other noise, if any. Information extractor 202 synchronizes such composite signal so that the location of particular portions of such signal may be determined. Information extractor 202 also replicates the ensemble of embedding generators and embedding values that information embedder 201 generated. Such replication may be accomplished in one embodiment by examining a portion of the received signal. In alternative embodiments, the information contained in the quantizer specifier may be available a priori to information extractor 202. The replicated embedding generators of the illustrated embodiment are dithered quantizers, and the embedding values are dithered quantization values. Further, for each co-processed group of components of the watermark signal, information extractor 202 determines the closest dithered quantization value to received values of selected components of the host signal, thereby reconstructing the watermark signal.

Embedder-extractor 200 is an illustrative embodiment that is implemented on two computer systems linked by the transmitter, communication channel, and receiver. One computer system is used with respect to embedding the watermark, and the other is used with respect to extracting the watermark. In the illustrated embodiment, embedder-extractor may be implemented in software, firmware, and/or hardware. It will be understood, however, that many other embodiments are also possible. For example, both the embedding and extracting functions may be performed on the same computer system; or either or both of such functions may be implemented in hardware without the use of a computer system. It will also be understood that the embedding function may be performed in some embodiments, but not the extracting function, or vice versa. A communication channel may not be material in some embodiments.

In this detailed description, references are made to various functional modules of embedder-extractor 200 that, as noted, may be implemented on computer systems either in software, hardware, firmware, or any combination thereof. For convenience of illustration, such functional modules generally are described in terms of software implementations. Such references therefore will be understood typically to comprise sets of software instructions that cause described functions to be performed. Similarly, in software implementations, embedder-extractor 200 as a whole may be referred to as "a set of embedder-extractor instructions."

It will be understood by those skilled in the relevant art that the functions ascribed to embedder-extractor 200 of the illustrated software implementation, or any of its functional modules, whether implemented in software, hardware, firmware, or any combination thereof, typically are performed by a processor such as a special-purpose microprocessor or digital signal processor, or by the central processing unit (CPU) of a computer system. Henceforth, the fact of such cooperation between any of such processor and the modules of the invention, whether implemented in software, hardware, firmware, or any combination thereof, may therefore not be repeated or further described, but will be understood to be implied. Moreover, the cooperative functions of an operating system, if one is present, may be omitted for clarity as they are well known to those skilled in the relevant art.

Computer Systems 110

FIG. 1 is a simplified block diagram of an illustrative embodiment of two computer systems 110A and 110B (generally and collectively referred to as computer systems 110) with respect to which an illustrative embodiment of embedder-extractor 200 is implemented. In the illustrated embodiment, information embedder 201 is implemented using computer system 110A (such computer system thus referred to for convenience as an embedding computer system), and information extractor 202 is implemented using computer system 110B (referred to for convenience as an extracting computer system). In an alternative embodiment, either or both of information embedder 201 and information extractor 202 may be implemented in a special-purpose microprocessor, a digital signal processor, or other type or processor. In the illustrated embodiment, embedding computer system 110A is coupled to transmitter 120, which transmits a signal over communication channel 115 for reception by receiver 125. Extracting computer system 110B is coupled to receiver 125. Computer systems 110 thus are coupled by transmitter 120, communication channel 115, and receiver 125. In alternative embodiments, transmitter 120 and a communication channel may couple embedding computer system 110A to many extracting computer systems. For example, such communication channel may be a network, or a portion of the electromagnetic spectrum used for television or radio transmissions, and any number of computer systems may be coupled to the channel either for transmission, reception, or both.

As noted, the term "communication channel" is used broadly herein, and may include the providing or obtaining of information to or from a floppy disk, a graphical image on paper or in electronic form, any other storage device or medium, and so on. As also noted, the providing or obtaining of information to or from the communication may include various known forms of signal processing.

Figure 2A:
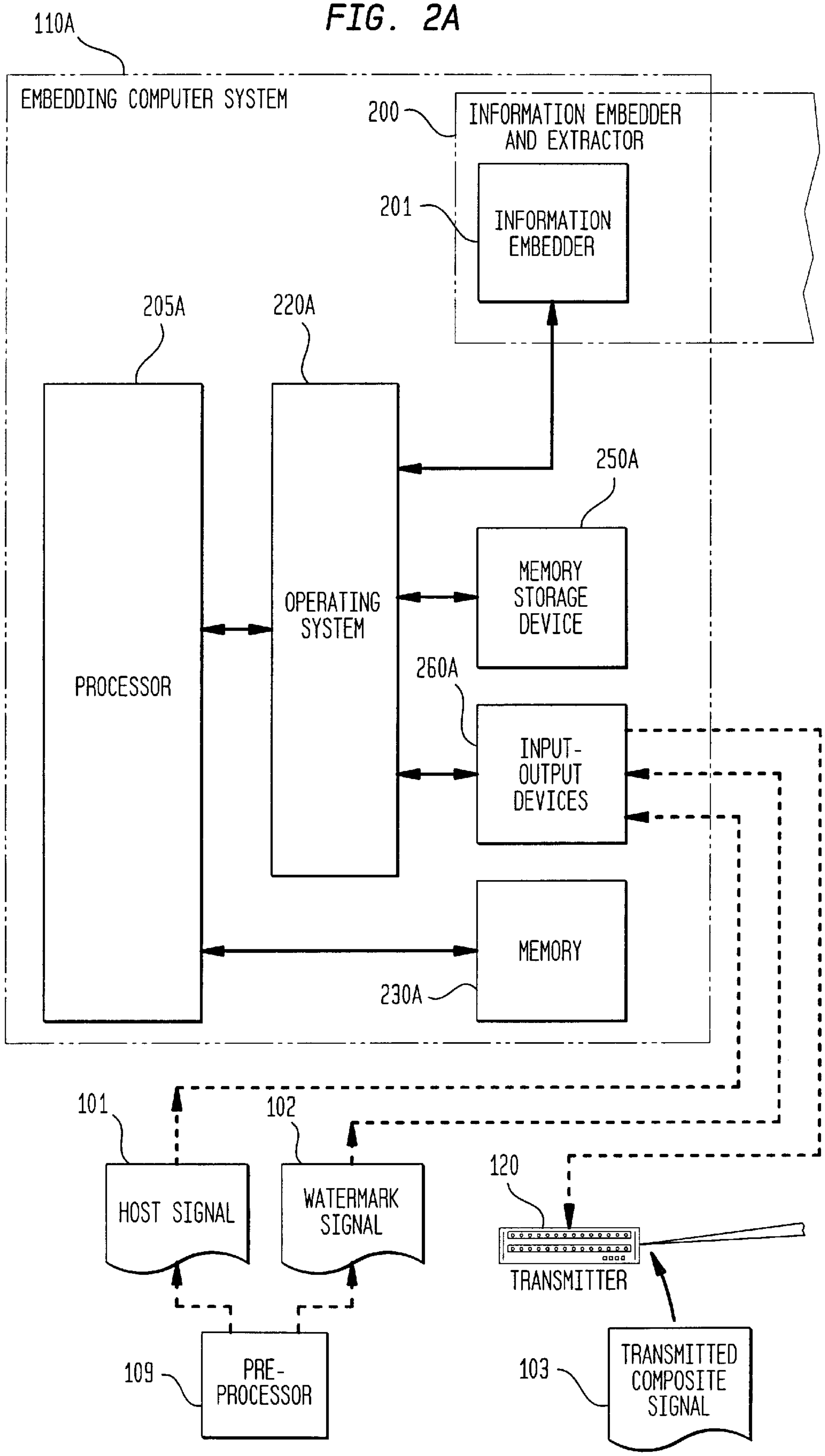
FIG. 2 is a functional block diagram of one embodiment of the first and second computer systems of FIG. 1, including one embodiment of the information embedder and information extractor of the present invention.
Figure 2B:
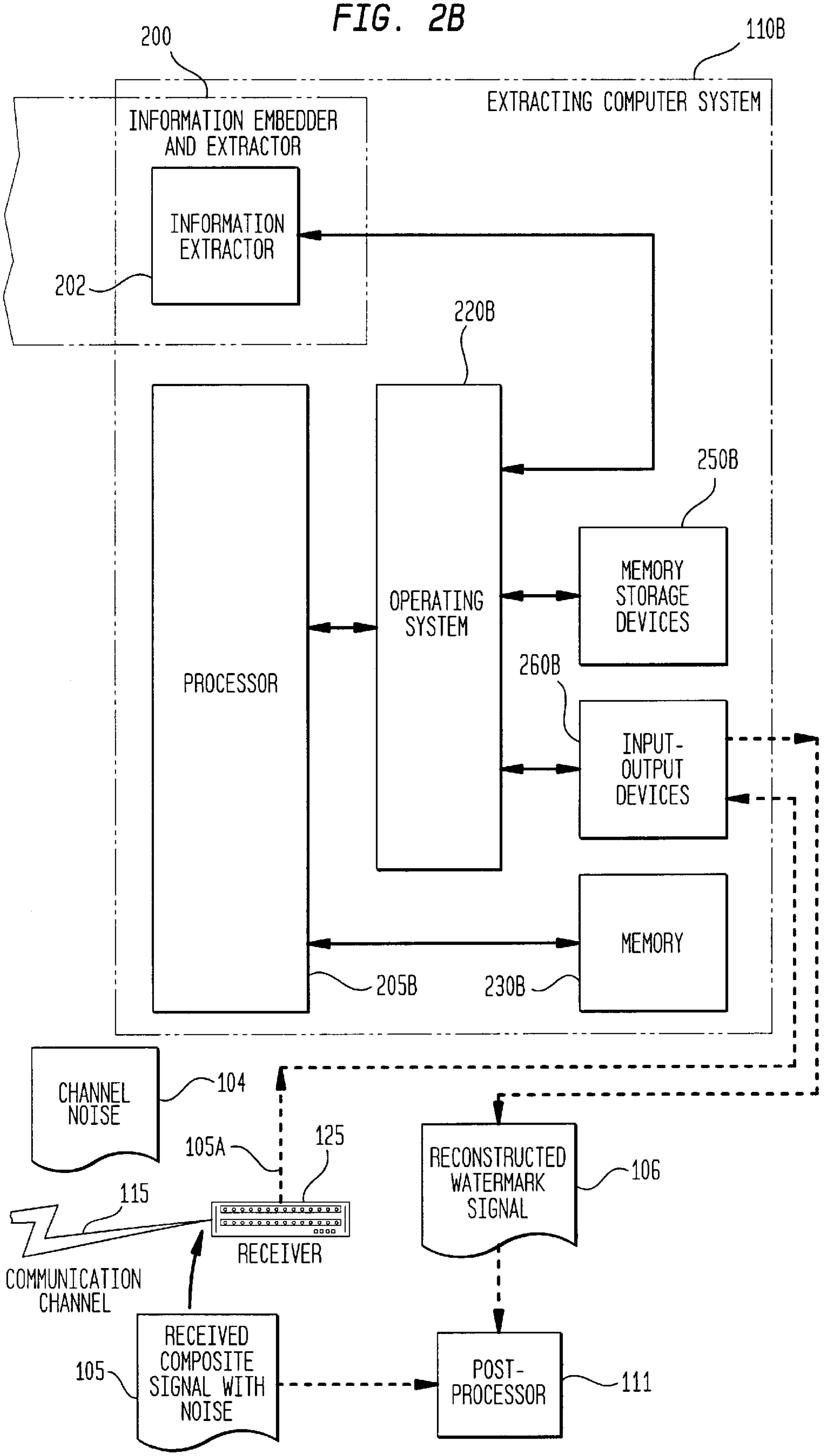

It is assumed for illustrative purposes that noise of any type, symbolically represented as channel noise 104, is introduced into channel 115 of the illustrated embodiment. It will be understood that channel noise 104, or aspects of it, may also be introduced by processing functions (not shown) implemented in, or that act in cooperation with, one or both of computer systems 110A and 110B. FIG. 2 is a simplified functional block diagram of an illustrative embodiment of computer systems 110, including embedder-extractor 200.

Each of computer systems 110 may include a personal computer, network server, workstation, or other computer platform now or later developed. Computer systems 110 may also, or alternatively, include devices specially designed and configured to support and execute the functions of embedder-extractor 200, and thus need not be general-purpose computers. Each of computer system 110A and computer system 110B may include known components such as, respectively, processors 205A and 205B, operating systems 220A and 220B, memories 230A and 230B, memory storage devices 250A and 250B, and input-output devices 260A and 260B. Such components are generally and collectively referred to as processors 205, operating systems 220, memories 230, memory storage devices 250, and input-output devices 260. It will be understood by those skilled in the relevant art that there are many possible configurations of the components of computer systems 110 and that some components that may typically be included in computer systems 110 are not shown, such as a video card, data backup unit, signal-processing card or unit, parallel processors, co-processors, and many other devices.

It will also be understood by those skilled in the relevant arts that other known devices or modules typically used with respect to transmitting or receiving signals may be included in computer systems 110, but are not so shown in the illustrated embodiment. Alternatively, or in addition, some of such known devices may be separate hardware units coupled with computer systems 110, such as those schematically represented in some of the figures as transmitter 120, receiver 125, and modulators 355B and 355C (generally and collectively referred to herein as modulators 355). Other examples of such devices or modules include other types of modulators, and demodulators; switches; multiplexers; a transmitter of electromagnetic, optical, acoustic, or other signals; or a receiver of such signals. Such transmitting or receiving devices may employ analog, digital, or mixed-signal processing of any type, including encoding/decoding, error detection/correction, encryption/decryption, other processing, or any combination thereof. Such devices may employ any of a variety of known modulation and other techniques or processes, such as amplitude modulation or frequency modulation, or various types of digital modulation such as uncoded pulse-amplitude modulation (PAM), quadrature-amplitude modulation (QAM), or phase-shift keying (PSK); coded PAM, QAM, or PSK employing block codes or convolutional codes; any combination of the preceding; or a technique or process to be developed in the future.

Also, certain devices or modules shown in the illustrated embodiments as separate units coupled with computer systems 110 may, in alternative embodiments, be included in computer systems 110. For example, pre-processors 109A–109F (generally and collectively referred to herein as pre-processors 109), and post-processor 111 may be included in computer systems 110A and 110B, respectively.

Processors 205 may be commercially available processors such as a Pentium processor made by Intel, a PA-RISC processor made by Hewlett-Packard Company, a SPARC® processor made by Sun Microsystems, a 68000 series microprocessor made by Motorola, an Alpha processor made by Digital Equipment Corporation, or they may be one of other processors that are or will become available. In other embodiments, a digital signal processor, such as a TMS320-series processor from Texas Instruments, a SHARC processor from Analog Devices, or a Trimedia processor from Phillips, may be used.

Processors 205 execute operating systems 220, which may be, for example, one of the DOS, Windows 3.1, Windows for Work Groups, Windows 95, Windows NT, or Windows 98 operating systems from the Microsoft Corporation; the System 7 or System 8 operating system from Apple Computer; the Solaris operating system from Sun Microsystems; a Unix®-type operating system available from many vendors such as Sun Microsystems, Inc., Hewlett-Packard, or AT&T; the freeware version of Unix® known as Linux; the NetWare operating system available from Novell, Inc.; another or a future operating system; or some combination thereof. Operating systems 220 interface with firmware and hardware in a well-known manner, and facilitate processors 205 in coordinating and executing the functions of the other components of computer systems 110. As noted, in alternative embodiments, either or both of operating system 220 need not be present. Either or both of computer systems 110 may also be one of a variety of known computer systems that employ multiple processors, or may be such a computer system to be developed in the future.

Memories 230 may be any of a variety of known memory storage devices or future memory devices, including, for example, any commonly available random access memory (RAM), magnetic medium such as a resident hard disk, or other memory storage device. Memory storage devices 250 may be any of a variety of known or future devices, including a compact disk drive, a tape drive, a removable hard disk drive, or a diskette drive. Such types of memory storage devices 250 typically read from, and/or write to, a program storage device (not shown) such as, respectively, a compact disk, magnetic tape, removable hard disk, or floppy diskette. Any such program storage device may be a computer program product. As will be appreciated, such program storage devices typically include a computer usable storage medium having stored therein a computer software program and/or data.

Computer software programs, also called computer control logic, typically are stored in memories 230 and/or the program storage devices used in conjunction with memory storage devices 250. Such computer software programs, when executed by processors 205, enable computer systems 110 to perform the functions of the present invention as described herein. Accordingly, such computer software programs may be referred to as controllers of computer systems 110.

In one embodiment, the present invention is directed to a computer program product comprising a computer usable medium having control logic (computer software program, including program code) stored therein. The control logic, when executed by processors 205, causes processors 205 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 260 could include any of a variety of known devices for accepting information from a user, whether a human or a machine, whether local or remote. Such devices include, for example a keyboard, mouse, touch-screen display, touch pad, microphone with a voice recognition device, network card, or modem. Output devices of input-output devices 260 could include any of a variety of known devices for presenting information to a user, whether a human or a machine, whether local or remote. Such devices include, for example, a video monitor, printer, audio speaker with a voice synthesis device, network card, or modem. Input-output devices 260 could also include any of a variety of known removable storage devices, including a compact disk drive, a tape drive, a removable hard disk drive, or a diskette drive.

As shown in FIG. 2, host signal 101 and watermark signal 102 typically are loaded into computer system 110A through one or more of the input devices of input-output devices 260A. Alternatively, signals 101 and/or 102 may be generated by an application executed on computer system 110A or another computer system (referred to herein as "computer-generated" signals). Received composite signal with noise 105 typically is acquired by receiver 125 and loaded into computer system 110B through one or more of the input devices of input-output devices 260B. Also, reconstructed watermark signal 106 typically is output from computer system 110B through one or more of the output devices of input-output devices 260B. Computer system 110A typically is coupled to transmitter 120 through one or more output devices of input-output devices 260A, and computer system 110B typically is coupled to receiver 125 through one or more input devices of input-output devices 260B. Further, in some embodiments, received composite signal with noise 105 and reconstructed watermark signal 106 may be provided to post-processor 111 for post-processing.

Embedder-extractor 200 could be implemented in the "C" or "C++" programming languages, or in an assembly language. It will be understood by those skilled in the relevant art that many other programming languages could also be used. Also, as noted, embedder-extractor 200 may be implemented in any combination of software, hardware, or firmware. For example, it may be directly implemented by micro-code embedded in a special-purpose microprocessor. If implemented in software, embedder-extractor 200 may be loaded into memory storage devices 250 through one of input-output devices 260. All or portions of embedder-extractor 200 may also reside in a read-only memory or similar device of memory storage devices 250, such devices not requiring that embedder-extractor 200 first be loaded through input-output devices 260. It will be understood by those skilled in the relevant art that embedder-extractor 200, or portions of it, may typically be loaded by processors 205 in a known manner into memories 230 as advantageous for execution.

Pre-Processor 109

As noted, information embedding computer system 110A operates upon host signal 101 and watermark signal 102.

Figure 3A:
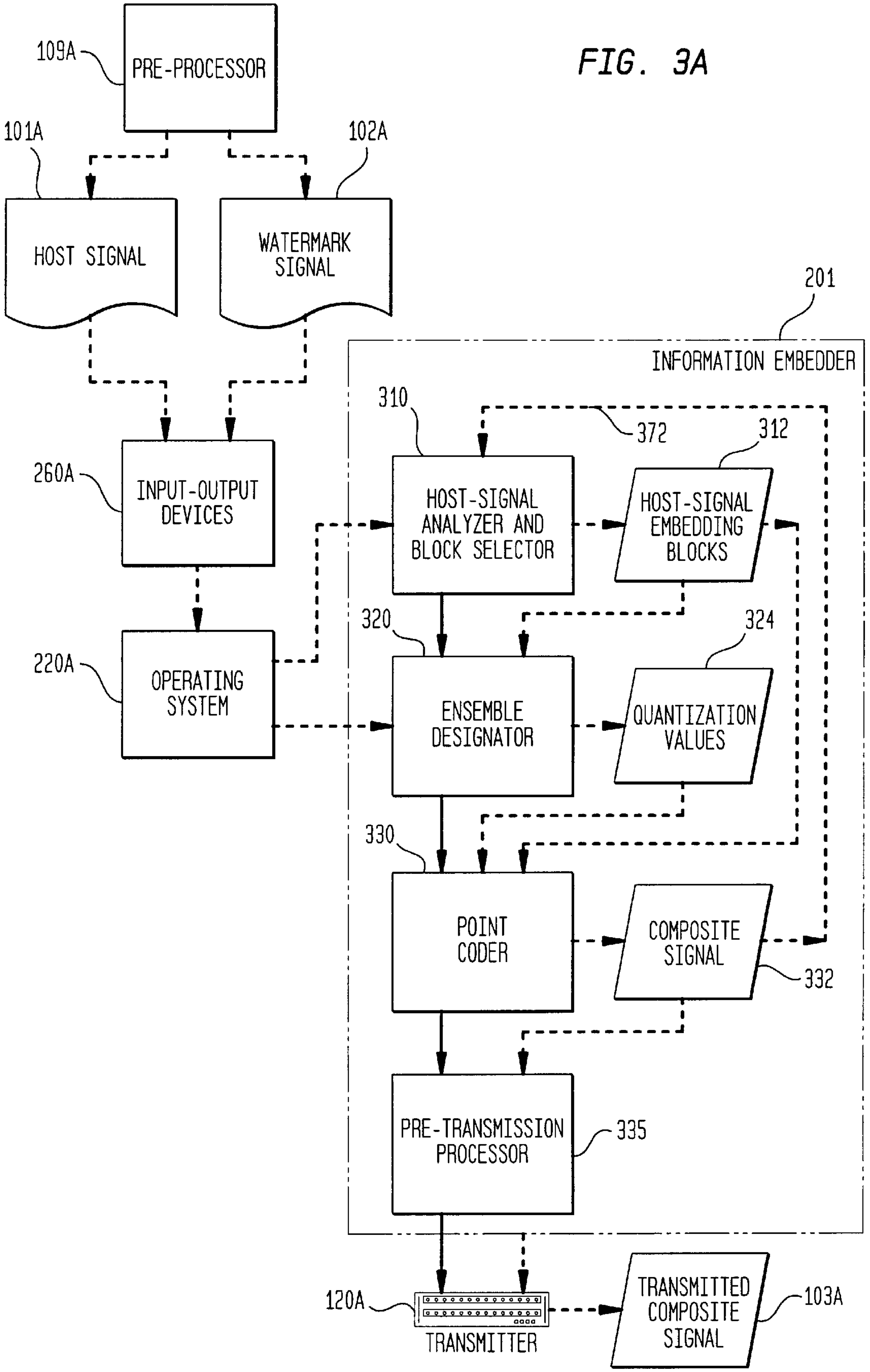
FIG. 3A is a functional block diagram of the information embedder of FIG. 2.

These signals may be pre-processed, as indicated in FIGS. 1 and 2 by pre-processor 109. More generally, computer system 110A, and information embedder 201 in particular, may operate on various embodiments of host signals and/or watermark signals resulting from various pre-processing functions, illustrative examples of which are shown in FIGS. 3B–3D, 3F, and 3G. FIG. 3E shows a related system that includes post-processing of composite signal 332 of the present invention by a conventional embedding system. (For clarity, the functional blocks of information embedder 201 are not shown in FIGS. 3B–3G, but will be understood to be present therein in the same manner as shown in FIG. 3A.) These various embodiments of a host signal, i.e., host signals 101, and 101A–101G, are generally and collectively referred to herein as host signals 101. Similarly, various illustrative embodiments of a watermark signal, i.e., watermark signals 102, and 102A–102G, are generally and collectively referred to herein as watermark signals 102.

It will be understood that the illustrated embodiments of host signals 101 and watermark signals 102 are exemplary and that many other embodiments are possible, including those not shown in FIGS. 3A–3G. Thus, host signals 101 and/or watermark signals 102 may be pre-processed in any of a variety of ways, such as being transformed, encoded, encrypted, smoothed, or interleaved. (Interleaving is a form of scrambling, as is well known to those skilled in the relevant art.) For example, a process commonly known as discrete cosine transformation may have been applied to a host signal that is an image. Other examples of transformations are Fourier, Fourier-Mellin, or Radon, transforms; JPEG or MPEG compression; wavelet transformation; or lapped orthogonal transformation. Also, conventional embedding techniques, or others to be developed in the future, may be applied to pre-process a host signal or watermark signal. Moreover, many combinations of these transformations are possible; e.g., a host signal subject to a Fourier-Mellin transform may be encrypted. Any other of many known techniques or processes, or others to be developed in the future, may have been applied by various pre-processing modules, whether or not shown in FIGS. 3A–3G, to produce host signals 101 and/or watermark signals 102. For convenience, the term "transformed" and its grammatical variants is hereafter used broadly to refer to any of these known, or later-to-be-developed, techniques or operations, or combinations thereof, by which a host signal or watermark signal is pre-processed. The terms "transformed host signal," "transformed host-signal component," "transformed watermark signal," or "transformed watermark-signal component," therefore refer respectively herein to host signals, host-signal components, watermark signals, and watermark-signal components, that have been pre-processed.

Some exemplary pre-processing operations are now described in relation to the exemplary systems shown in FIGS. 3B–3D, 3F, and 3G. The pre-processing operations are respectively carried out in these figures by pre-processors 109B–109D, 109F, and 109G, generally and collectively referred to hereafter as pre-processors 109. Pre-processors 109 operate upon exemplary audio signals 360B–360D, 360F, and 360G, generally and collectively referred to as audio signals 360.

Audio signals 360 may be, for example, music or voice from a microphone or recording-playback device (not shown), typically in the human auditory frequency range. It will be understood that many other types of signals may be pre-processed in the manners described with respect to FIGS. 3B–3G. For example, audio signals 360, in alternative embodiments, could be television video signals, paging signals, one or both signals of separate stereo audio channels, or audio signals outside the range of human hearing. Thus, audio signals 360 are also referred to herein more broadly as "primary signals" to indicate that any type of signal may be operated upon by pre-processors 109. The term "audio signal" is used for convenience with respect to some illustrated embodiments described below, rather than the broader term "primary signals," because these embodiments involve exemplary applications in which signals in the audio and FM domains are employed. Audio signals 360 may be externally selected by a user, they may be signals generated by a computer or another device, or they may be made available for processing by pre-processors 109 in accordance with any other known technique or one to be developed in the future.

Figure 3B:
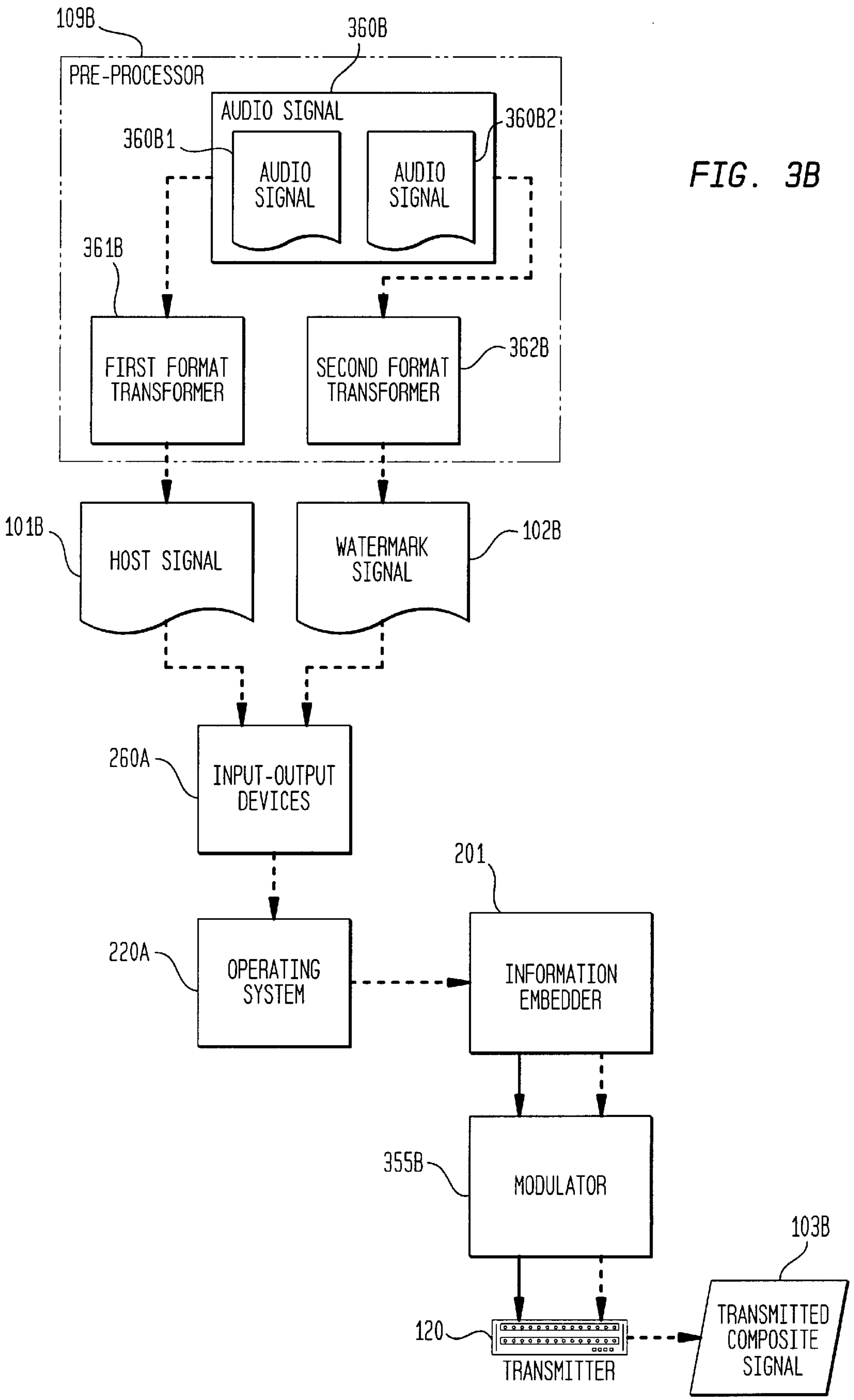
FIG. 3B is a functional block diagram of the information embedder of FIG. 2, also showing a first type of pre-processing of the host and watermark signals.

The System of FIG. 3B

FIG. 3B is a functional block diagram of information embedder 201 that operates upon host signal 101B and watermark signal 102B, as those signals are pre-processed by pre-processor 109B. The system schematically shown in FIG. 3B also includes modulator 355B. For illustrative purposes, it is sometimes assumed hereafter that modulators 355, including modulator 355B, is an FM modulator. However, it will be understood that the invention is not so limited. Rather, modulators 355 may be any type of modulator, including an amplitude modulator, a digital modulator, or any other kind of modulator whatsoever. It is illustratively assumed with respect to the embodiment of FIG. 3B that it is desirable that audio signal be available in two different formats. For example, it may be desirable that it be available in both analog and digital formats. As another example, one of the formats may itself not be a complete audio format, but may instead be used to enhance the quality of an audio signal in the other format. Thus, as is intended to be indicated by the preceding examples, the term "format" refers broadly as used hereafter in this context to any one or more criteria or technique for transforming, processing, formatting, or otherwise specifying or providing the form of a signal.

Also, either or both of host signal 101B and watermark signal 102B may be only part of a transformed version of audio signal 360B. That is, for example, watermark signal 102B may be only a part of audio signal 360B in digital format. The remainder of audio signal 360B in digital format may not be intended to be embedded in host signal 101B. Rather, it may be transmitted separately, or embedded in some other host signal in some other FM, or other, channel, or not transmitted nor embedded at all.

Furthermore, audio signal 360B (or any other of audio signals 360) may, in some implementations, be two different signals. For example, a signal 360B1 may be transformed by first format transformer 361B to generate host signal 101B, and a different signal 360B2 may be transformed by second format transformer 362B to generate watermark signal 102B. For convenience and clarity, reference is made in FIG. 3B to audio signal 360B, however, it will be understood that it is not necessary that the same signal be provided to generate both the host signal and watermark signal. (Similarly, audio signal 360C of the system of FIG. 3C need not be the same signal with respect to generating the host and watermark signals. Rather, two different signals, represented by signals 360C1 and 360C2, may be provided.) Also, either host signal 101B or watermark signal 102B need not be a transformed audio (or other type of) signal. For example, audio signal 360B1 could be transformed to generate host signal 101B, while different signal 360B2, which is not an audio signal, could be transformed to generate watermark signal 102B.

For illustrative purposes, it is assumed that first format transformer 361B transforms audio signal 360B into an analog format and that second format transformer 362B transforms it into a digital format. Arbitrarily, it is also assumed that the resulting transformed signal in analog format constitutes host signal 101B and that the resulting transformed signal in digital format constitutes watermark signal 102B, as shown in FIG. 3B. It would not materially affect the operation of the invention if the opposite were assumed; i. e., if the digital signal were the host signal and the analog signal were the watermark signal.

Information embedder 201 operates upon host signal 101B and watermark signal 102B to generate a composite signal 332, as shown in FIG. 3A and described in detail below. In some implementations, pre-transmission processor 335, such as shown in FIG. 3A, may also be used in the system of FIG. 3B or any other information embedding system in accordance with the present invention. Pre-transmission processor 335 may optionally be used to return composite signal 332 to the original domain of audio signals 360. For example, transformer 361B or transformer 362B may have been used to transform audio signals 360B by using a Fourier, Fourier-Mellin, Radon, or other transform. Pre-transmission processor 335 may advantageously be used in some implementations to return composite signal 332 to the audio domain rather than the Fourier, Fourier-Mellin, or Radon domain. This process, referred to for convenience here as a domain inversion, may be accomplished in accordance with any of a variety of known techniques such as using an inverse Fourier, inverse Fourier-Mellin, or inverse Radon transformation, respectively.

Composite signal 332 may be transmitted, such as over communication channel 115 by transmitter 120, or it may first be further processed. The illustrative embodiment of FIG. 3B includes further processing by frequency modulation of the output of information embedder 201; i.e., frequency modulation of composite signal 332 by modulator 355B. In alternative embodiments, frequency modulation could be accomplished by appropriate known circuitry included-in transmitter 120. Thus, transmitted composite signal 103B is a signal in the modulation domain that, in accordance with known techniques, may be demodulated by an appropriate demodulator (not separately shown). The demodulator may be included, for example, in receiver 125 as shown in FIGS. 1 and 2.

Thus, post-receiver signal 105A, shown in FIG. 2 (and in FIG. 9, described below with respect to the operations of information extractor 202), is a signal that has been demodulated from the modulation domain to the audio domain in this example. In accordance with the operations of information extractor 202 and the illustrative assumption that watermark signal 102B is a digital form of audio signal 360B, reconstructed watermark signal 106 is extracted from post-receiver signal 105A to provide a reconstruction of audio signal 360B in a digital format. Also, in accordance with the illustrative assumption that host signal 101B is an analog form of audio signal 360B, post-receiver signal 105A is approximately equivalent to audio signal 360B in an analog format, as distorted by the embedding process of embedder 201, described below, channel noise, and possibly other factors.

Reconstructed watermark signal 106 may thus be provided to an audio-processing device, such as an amplifier, that operates on digital audio signals. Post-receiver signal 105A may similarly be provided to an amplifier, or other audio-processing device, that operates on analog audio signals. (Both types of known devices are generally represented in FIGS. 1 and 2 by post-processor 111.) Moreover, the bandwidth of transmitted composite signal 103B generally need not be greater than the bandwidth required to transmit host signal 101B, as will be evident to those skilled in the relevant art in view of the description below of the operations of embedder 201.

This capability to transmit all, or part, of both analog and digital representations of the same audio signal, over the same communication channel and generally within the same bandwidth, is advantageously employed in various commercial situations. For example, a regulatory environment may pertain in which simultaneous, in-band, on-channel, transmission of an FM signal in an older, analog, format and also in a newer, digital, format is required. In accordance with this requirement, older FM receivers designed to process signals in the analog format will not be made obsolete, yet new FM receivers designed to process signals in the digital format will be able to operate. The same advantage may be obtained with respect to the simultaneous transmission, as a further illustrative and non-limiting example, of analog and digital television signals.

Also, it may be advantageous in some respects to utilize the system of FIG. 3B, in which frequency modulation is done by modulator 355B upon a composite signal, rather than another system in which frequency modulation is done on a host signal before the watermark signal has been embedded. The reason is that frequency modulation may protect the composite signal from channel noise in accordance with techniques and effects known to those skilled in the relevant art. In contrast, if frequency modulation is done on a host signal and embedding of a watermark signal then occurs in the FM domain, the protective effects of frequency modulation on the composite signal may not fully be realized. Also, alteration of the frequency-modulated host signal by embedding of a watermark signal may influence the ability of the FM demodulator to decode the FM signal. The system of FIG. 3B thus may reduce the need to consider the parameters of operation of the FM demodulator with respect to specifying permissible limits on distortion introduced by the embedding process.

Figure 3C:
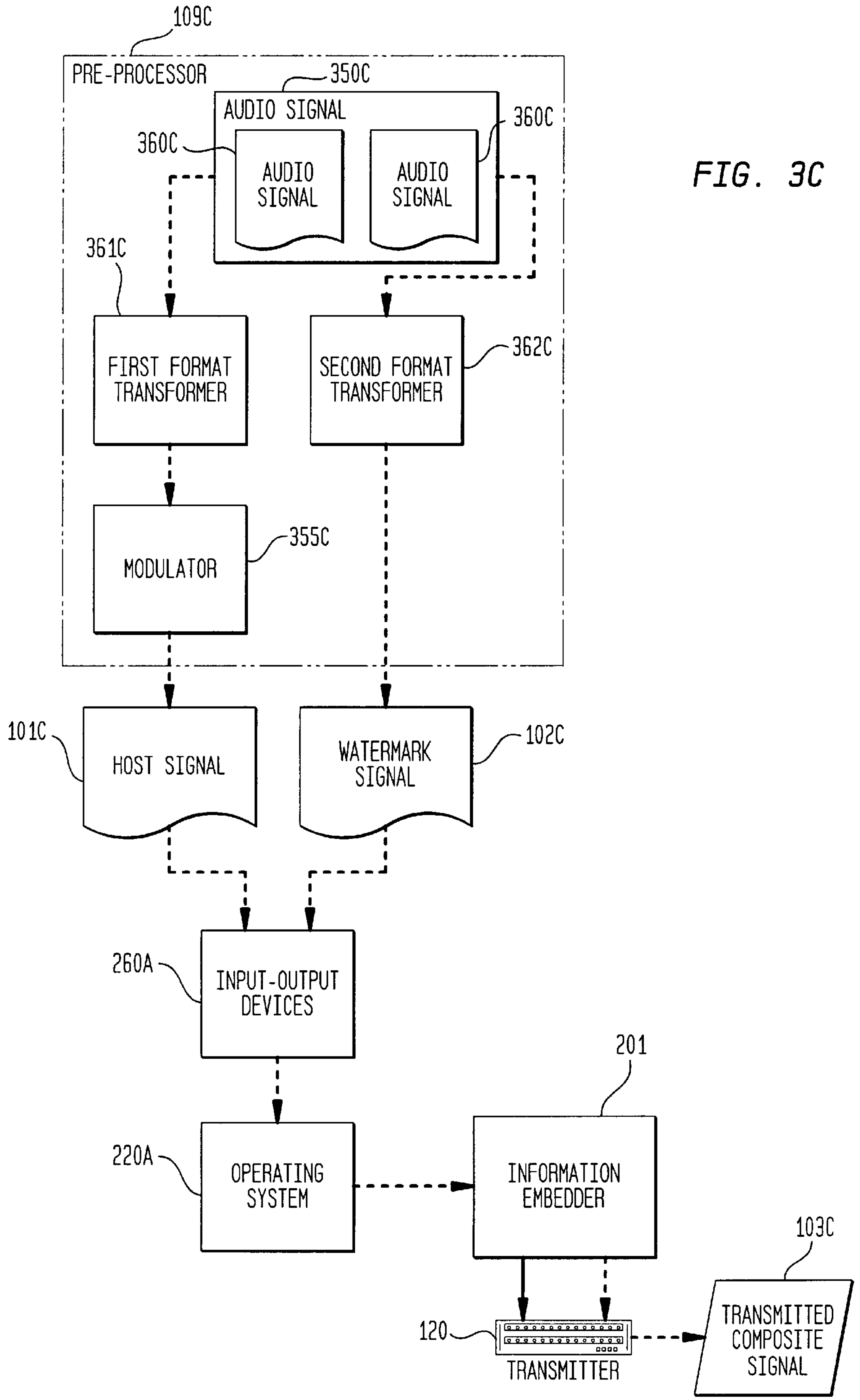
FIG. 3C is a functional block diagram of the information embedder of FIG. 2, also showing a second type of pre-processing of the host and watermark signals.

The System of FIG. 3C

FIG. 3C is a functional block diagram of information embedder 201 that operates upon host signal 101C and watermark signal 102C, as those signals are pre-processed by pre-processor 109C. As with respect to the system of FIG. 3B, it is illustratively assumed that it is desired to provide an audio signal in two different formats. In particular, it is now assumed that first format transformer 361C transforms audio signal 360C into a first format that may be, for example, an analog format. This analog signal is then FM modulated by modulator 355C to provide host signal 101C. (In an alternative embodiment, this FM-modulated signal could be provided as watermark signal 102C.) It is further illustratively assumed that second format transformer 362C transforms audio signal 360C into a second format that may be, for example, a digital format. In the exemplary embodiment of FIG. 3C, watermark signal 102C is this transformed audio signal in digital format.

Figure 9:
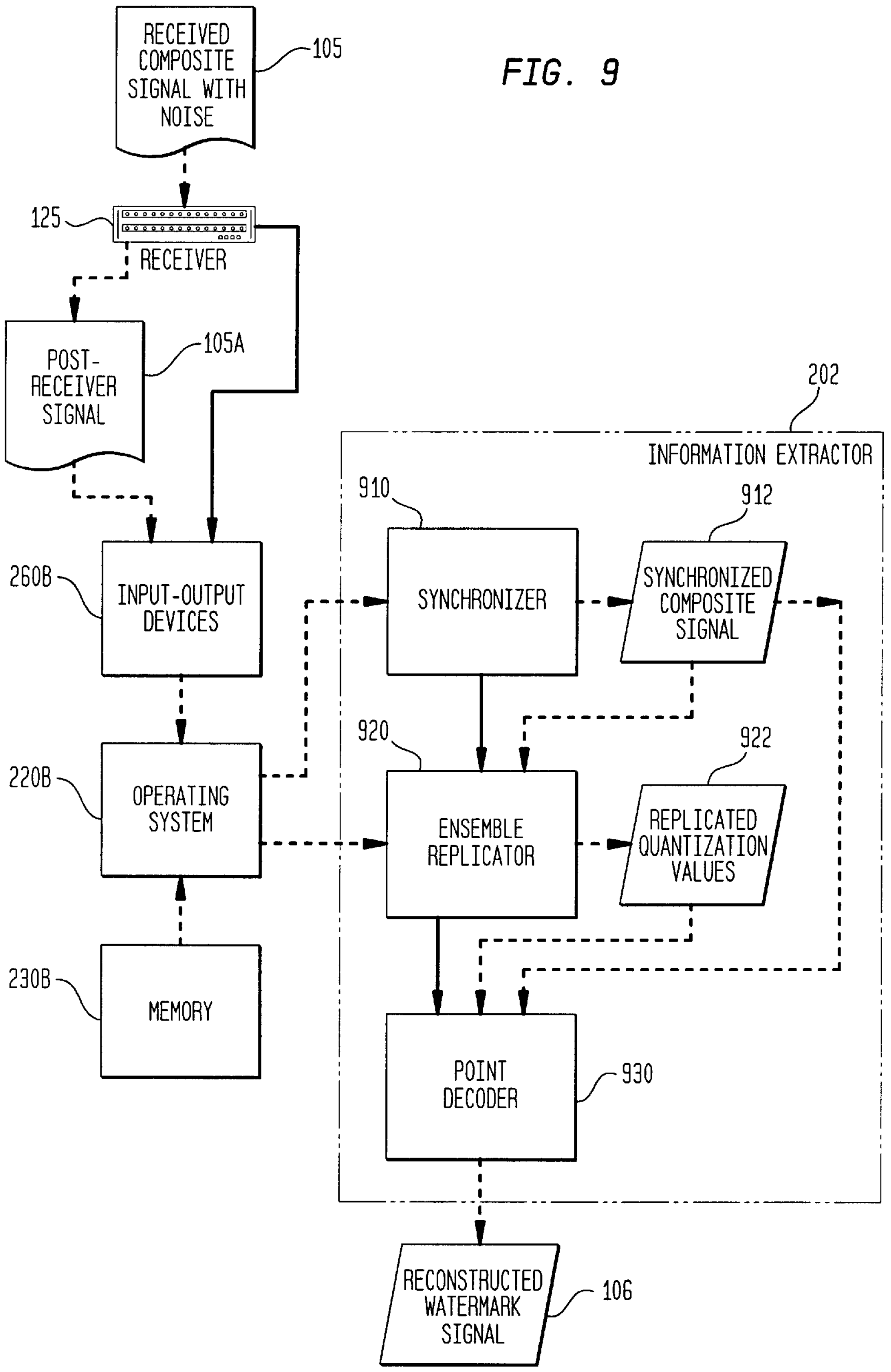
FIG. 9 is a functional block diagram of the information extractor of FIG. 2.

Watermark signal 102C is embedded into host signal 101C in accordance with the operations of embedder 201 described below. In the system of FIG. 3B described above, embedding occurred in the audio domain and frequency modulation (by modulator 355B) was applied to the resulting composite signal. In contrast, with respect to the system of FIG. 3C, embedding occurs in the modulation domain because host signal 101C is modulated by modulator 355C. As was the case with respect to transmitted composite signal 103B of FIG. 3B, transmitted composite signal 103C of the system of FIG. 3C is in the modulation domain. In the illustrated embodiment of FIG. 3C, receiver 125 typically does not include a demodulator. Rather, post-receiver signal 105A, as shown in FIG. 9, remains in the modulation domain. Post-processor 111, however, typically includes a demodulator (not separately shown) that demodulates post-receiver signal 105A to generate an approximation of audio signal 360C as transformed by first format transformer 361C (i.e., in an analog format) and as distorted by the embedding process, channel noise, and possibly other factors. In some circumstances, it may be advantageous to subject transformed audio signal 361C to frequency modulation and then demodulate post-receiver signal 105A in the FM domain, as described with respect to the system of FIG. 3C. This potential advantage is due to the fact that FM demodulation may suppress aspects of the distortion introduced by the embedding process of embedder 201, for reasons that are known to those skilled in the relevant art.

Information extractor 202 operates upon post-receiver signal 105A (which, as noted, is in the modulation domain), as described below, to generate reconstructed watermark signal 106. Because watermark signal 102C is a digital signal in the audio domain, reconstructed watermark signal 106 also is a digital signal in the audio domain. Reconstructed watermark signal 106 may thus be provided directly to a digital amplifier, or another known or to-be-developed audio-processing device that operates on digital audio signals. This audio-processing device is not separately shown, but is considered to be part of post-processor 111.

Figure 3D:
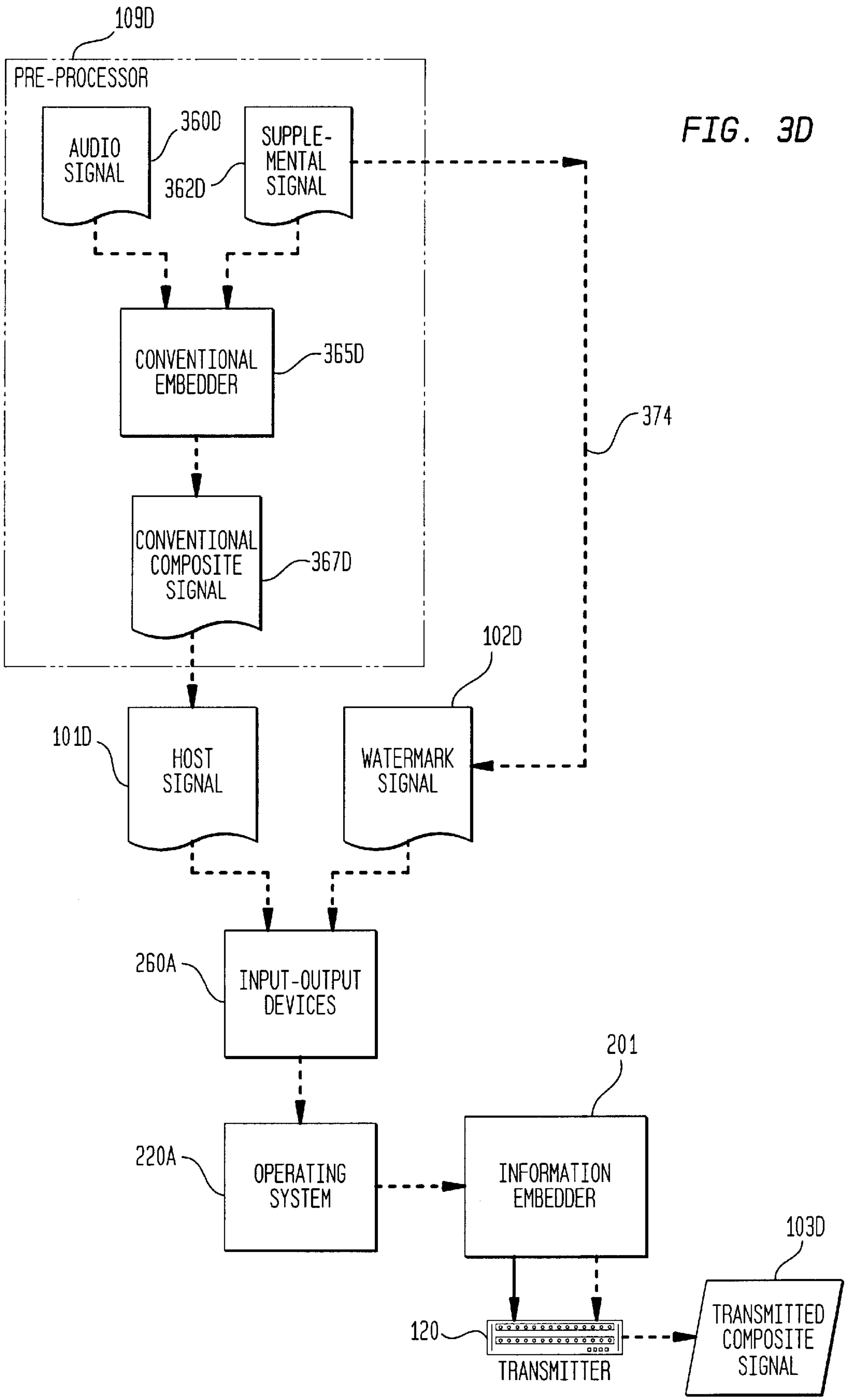
FIG. 3D is a functional block diagram of the information embedder of FIG. 2, also showing a third type of pre-processing of the host and watermark signals.
Figure 3E:
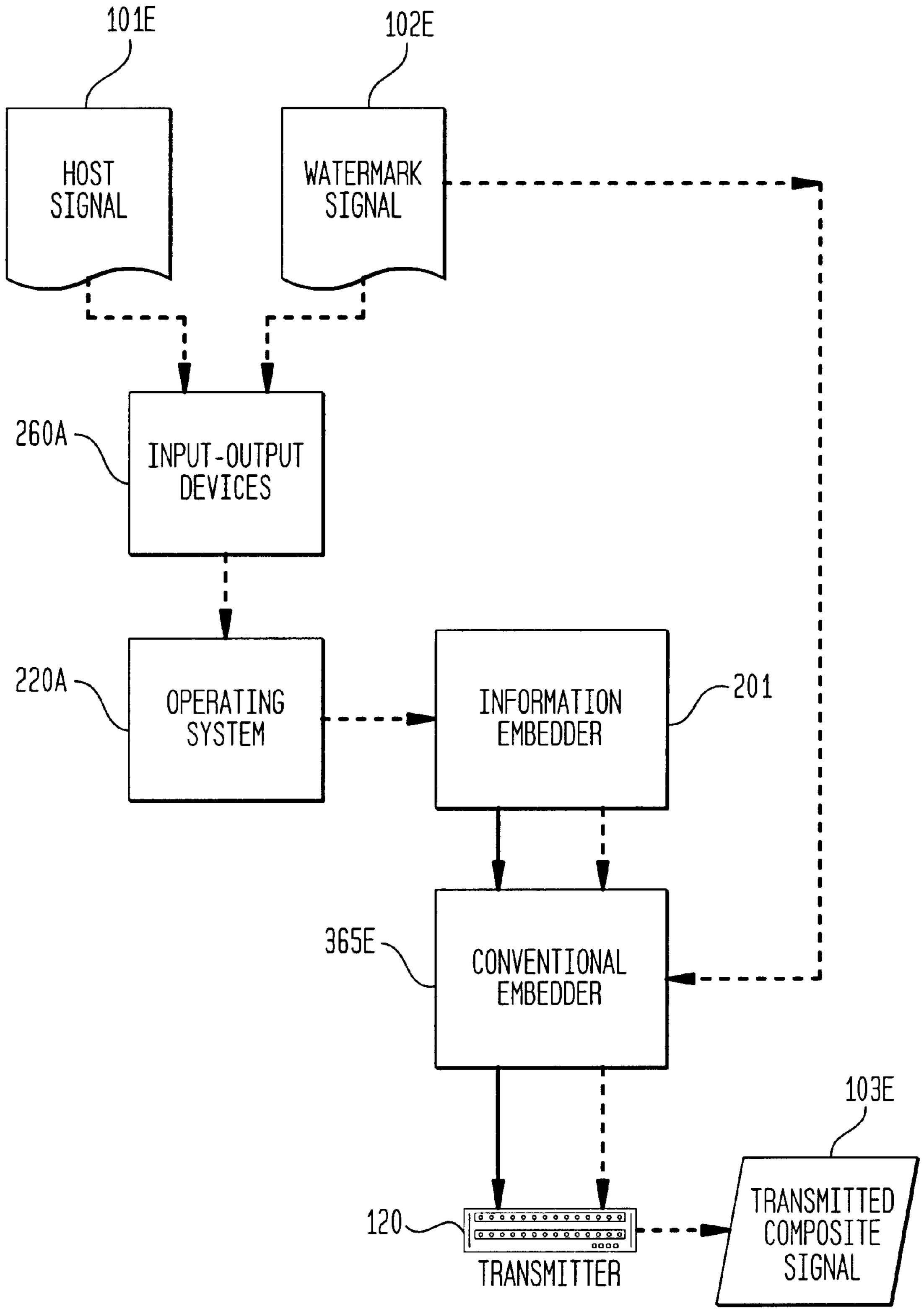
FIG. 3E is a functional block diagram of the information embedder of FIG. 2, also showing conventional embedding of a composite signal generated by the information embedder of FIG. 2.

The System of FIG. 3D

FIG. 3D is a functional block diagram of information embedder 201 that operates upon host signal 101D and watermark signal 102D, as those signals are pre-processed by pre-processor 109D. It is illustratively assumed with respect to the system of FIG. 3D that it is desired that supplementary information, represented by supplemental signal 362D, be embedded in audio signal 360D. For example, it may be desired that the call letters and frequency of a radio station be provided along with an audio signal to be transmitted by the radio station. It will be understood that the assumptions that the host signal is an audio signal and that the watermark signal is supplementary information are exemplary only. The system and method of FIG. 3D may be applied to any types of signals. For example, signal 360D may be a television video signal, and supplemental signal 372D may be captioning information. Or, signal 360D may be an image, and supplemental signal 372D may be a digital fingerprint.

It is further assumed that a conventional, or later-to-be-developed, system or method for embedding a watermark signal in a host signal is employed to embed supplemental signal 362D in audio signal 360D to generate conventional or future composite signal 367D. This system or method is represented in FIG. 3D by conventional or future embedder 365D. For convenience, the term "conventional" in these contexts will hereafter be used to refer to "conventional or future." Similarly, the application of any of a variety of known, or later-to-be-developed watermarking systems or methods is assumed in FIGS. 3E–3G, and these systems or methods are hereafter generally and collectively referred to as conventional embedders 365. Non-limiting examples of conventional embedders 365 include those described in publications 1–9 in the Background section above, and modifications or improvements thereto that now exist or may be made in the future. As will be described below in relation to FIG. 3A, and line 372 in particular, pre-processing of a host signal or watermark signal may also be accomplished using embedder 201 of the present invention in the same manner as conventional embedder 365D is employed in the system of FIG. 3D and, more generally, in the same manner as any of conventional embedders 365 are employed in the systems of FIGS. 3D–3G.

It is not material to the present invention how embedder 365D embeds supplemental signal 362D in audio signal 360D, nor is the composition of composite signal 367D material. Rather, composite signal 367D is operated upon by embedder 201 as one embodiment of host signals 101 in the same manner as described below with respect to the operations of embedder 201 with respect to host signals 101 generally. That is, host signal 101D is a signal that has been transformed by a particular technique (the embedding technique of embedder 365D) and, as noted, the fact that an embodiment of host signals 101 may have been transformed from another signal is not material to the operation of the present invention.

Thus, host signal 101D of the illustrated embodiment of FIG. 3D is composite signal 367D. It is illustratively assumed that watermark signal 102D is supplemental signal 362D, as indicated by data-flow line 374 of FIG. 3D. That is, the same signal (signal 362D) that was employed as a watermark signal by conventional embedder 365D is illustratively employed as a watermark signal with respect to the operation of embedder 201 of the present invention. It will be understood that it is not necessary, however, that the same signal be so used. Rather, watermark signal 102D may be a portion or portions of supplemental signal 362D, a transformed version of all or parts of it, or another watermark signal (as explicitly shown with respect to the system of FIG. 3F). Thus, the illustrated embodiment is intended to represent generally the use of embedder 201 to operate upon a host signal that is itself a composite signal including a watermark signal, which may be the same watermark signal operated upon by embedder 201. The illustrated embodiment is thus referred to as one example of a multiple-embedding system.

This use of the present invention, i.e., to embed a watermark signal in a host signal that includes that (or another) watermark signal as embedded by a system or technique other than that of the present invention, may have significant commercial advantages. For example, commercial equipment may be in use that implements the conventional embedding system, and the present invention may be used to supplement that existing equipment. Thus, for instance, a conventional embedding system (or one to be developed in the future) may embed supplemental information (such as call letters) into an audio signal. The present invention may be used to embed additional information into that composite signal, such as, for example, subtitles, translations, commentary, and so on. Or, the present invention may be used to re-embed all or part of the information already embedded by conventional techniques in order to provide error detection and correction, or for other purposes.

The System of FIG. 3E

Like the system of FIG. 3D, the system shown in FIG. 3E is a multiple-embedding system. However, in the system of FIG. 3E, pre-processing may be considered to be done by the present invention rather than by a conventional embedder. That is, in the embodiment of FIG. 3E, the host signal operated upon by conventional embedder 365E is the output of embedder 201 of the present invention; i.e., composite signal 332. The watermark signal operated upon by embedder 365E may be the same watermark signal operated upon by embedder 201, i.e., watermark signal 102E as shown in FIG. 3E, it may be a portion of signal 102E, or it may be another watermark signal. The system of FIG. 3E provides a commercial advantage similar to that noted with respect to the system of FIG. 3D. That is, embedder 201 may be used to supplement, replicate, verify, or otherwise augment the embedding process accomplished by conventional embedder 365E.

Figure 3F:
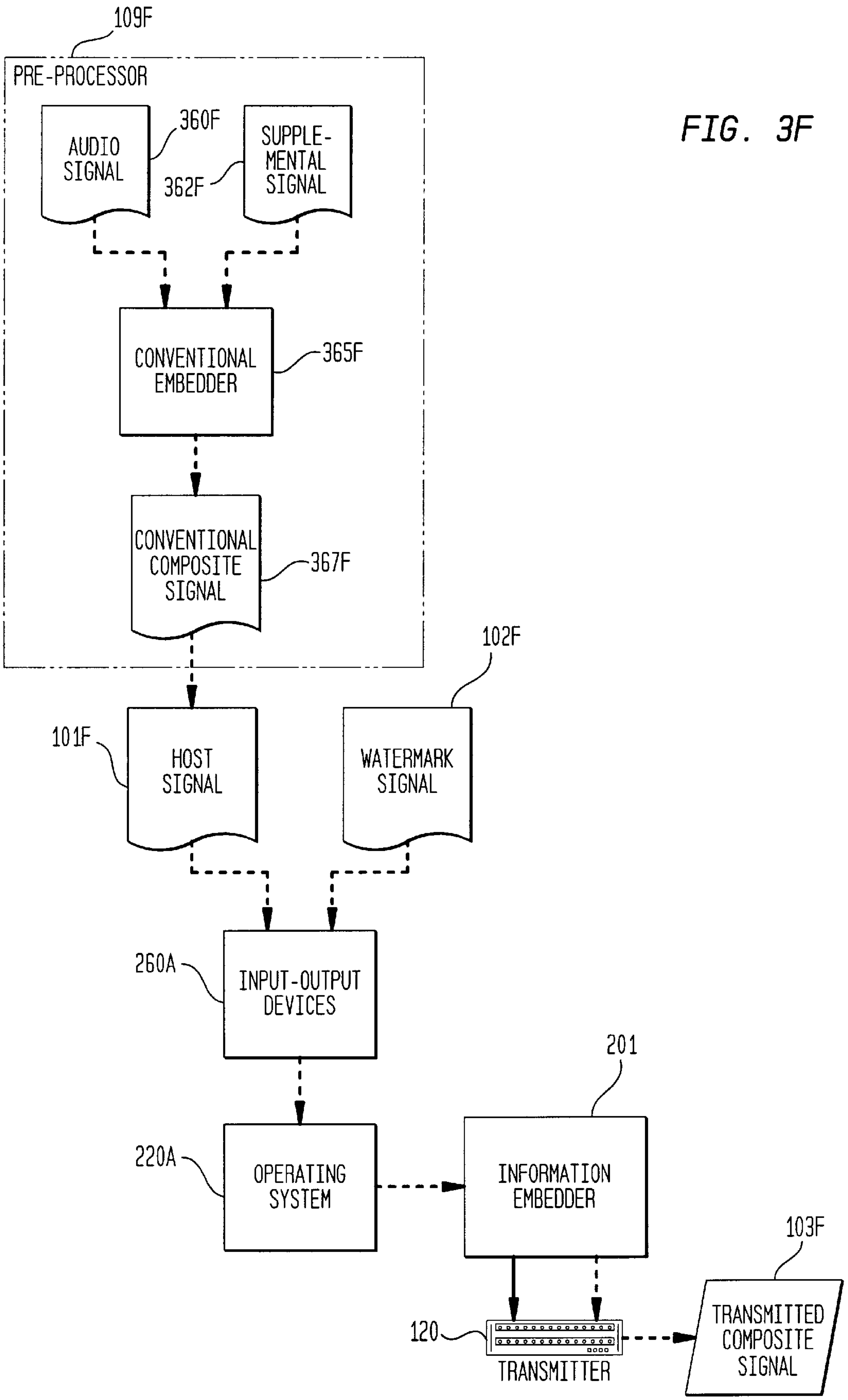
FIG. 3F is a functional block diagram of the information embedder of FIG. 2, also showing a fourth type of pre-processing of the host and watermark signals.

The System of FIG. 3F

FIG. 3F is a functional block diagram of information embedder 201 that operates upon host signal 101F and watermark signal 102F, as those signals are pre-processed by pre-processor 109F. The system of FIG. 3F is also a multiple-embedding system, and is the same as the system described with respect to FIG. 3D except that a different watermark signal is operated upon by conventional embedder 365F than is operated upon by embedder 201 of the present invention. Thus, embedder 365F embeds supplemental signal 362F in audio signal 360F, i.e., signal 362F is a watermark signal. (It will be understood that, in general, the opposite assumption might have been made such that audio signal 360F is embedded in supplemental signal 362F, depending on the nature of the two signals and the operational parameters of embedder 365F.) A different signal, watermark signal 102F, is operated upon by embedder 201 of the present invention.

There are various commercial applications in which the system of FIG. 3F may be advantageous. One example is the case in which audio signal 360F is available to both information embedding computer system 110A and information extracting computer system 110B. In such a case, as noted above, conventional embedding techniques referred to as "additive" in nature may be used without the disadvantage that the host signal (audio signal 360F) constitutes additive noise in the composite signal (signal 367F). That is, the host signal may be subtracted out, in accordance with known techniques, to remove the distortion introduced by the additive embedding technique. Thus, supplemental signal 362F may be extracted from conventional composite signal 367F by a conventional extracting system corresponding to the conventional embedding system of embedder 365F, and without the adverse effects of additive noise due to audio signal 360F. However, it may be that it is desirable that watermark signal 102F also be embedded in the composite signal to be transmitted by transmitter 120, and that a reconstructed watermark signal be extractable without knowledge of host signal 101F (which, in the system of FIG. 3F, is composite signal 367F). As described below, an advantage of embedder 201 of the present invention is that a reconstruction of watermark signal 102F may be extracted without knowledge of host signal 111F. Thus, embedder 201 may be used to embed watermark signal 102F into composite signal 367F, which, as noted, already has embedded in it supplemental signal 362F.

Figure 3G:
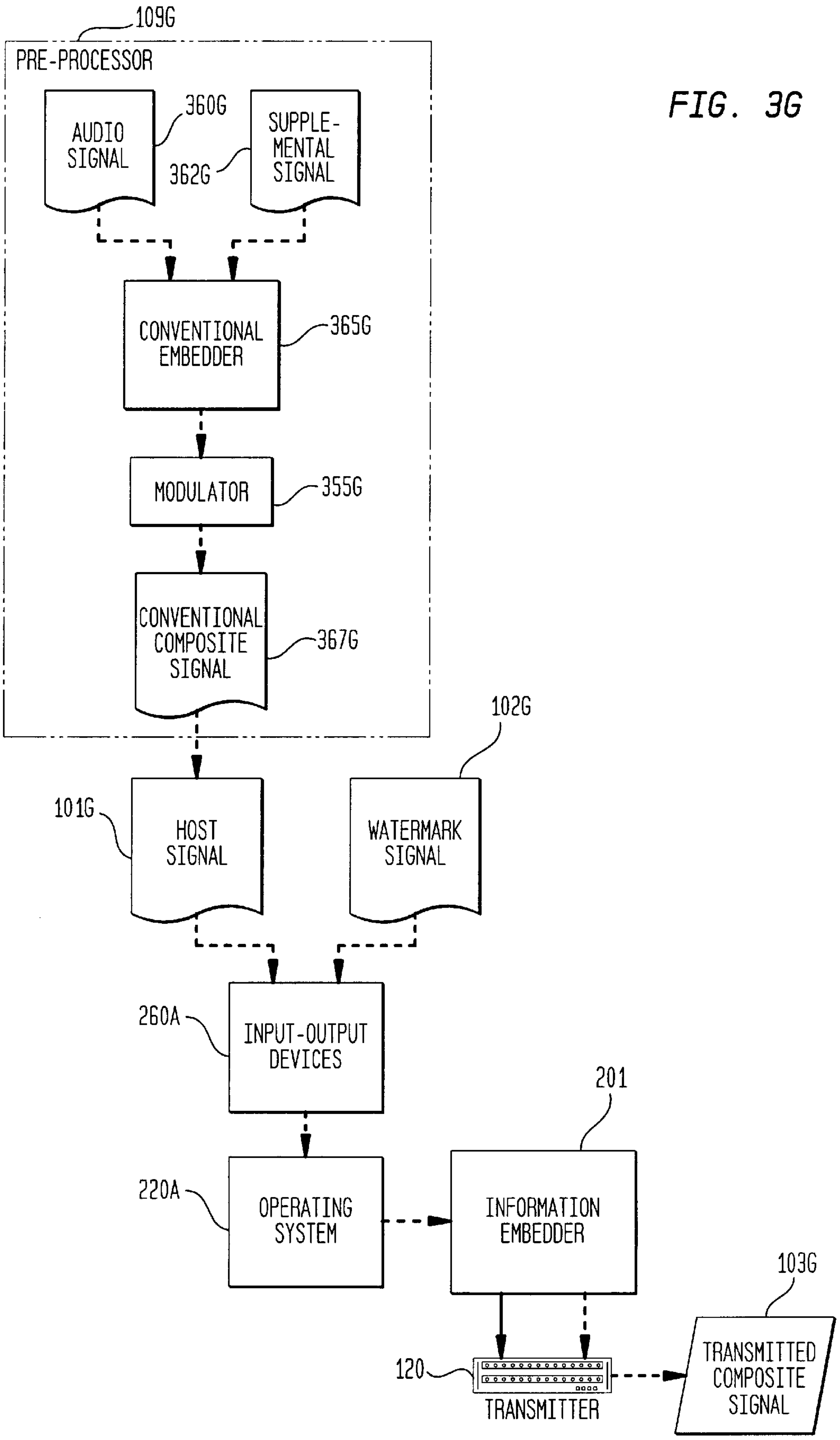
FIG. 3G is a functional block diagram of the information embedder of FIG. 2, also showing a fifth type of pre-processing of the host and watermark signals.

The System of FIG. 3G

FIG. 3G is a functional block diagram of information embedder 201 that operates upon host signal 101 G and watermark signal 102G, as those signals are pre-processed by pre-processor 109G. The system of FIG. 3G is a multiple-embedding system and is the same as the multiple-embedding system of FIG. 3F except that modulator 355G is included in pre-processor 109G. In particular, pre-processor 109G includes conventional embedder 365G that embeds supplemental signal 362G in audio signal 360G to generate a composite signal that is provided to modulator 355G. Modulator 355G transforms the composite signal to the modulation domain, as represented by conventional composite signal 367G. Composite signal 367G thus differs from composite signal 367F of FIG. 3F in that the former is in the modulation domain, whereas the latter is in the audio domain. Also, whereas embedder 201 in the system of FIG. 3G operates upon host signal 101G (which is composite signal 367G) in the modulation domain, conventional embedder 365G operates on audio signal 360G and supplemental signal 362G in the audio domain. Thus, some of the various advantages stated above of operating in the two domains, and of applying a multiple-embedding process, are combined in the system of FIG. 3G.

As is evident from the foregoing descriptions of the systems of FIGS. 3B–3G, one or more features of any one of these systems (such as operating alternatively in the FM or audio domains, or employing a multiple-embedding process) may be combined with one or more features of one or more other of these systems to provide a configuration not explicitly shown in FIGS. 3B–3G. It is intended that all such alternative configurations are to be considered included within the scope of the present invention. As one illustrative example, a type of multiple-embedding configuration is possible in which embedder 201 operates upon a composite signal generated by a conventional embedder, which operates upon a composite signal generated by embedder 201, and so on. FM modulation, or any other type of transformation, may be applied at any stage of the multiple-embedding process; e.g., to a host signal operated upon by embedder 201 or a conventional embedder, to a composite signal generated by embedder 201 or a conventional embedder, or to a watermark signal operated upon by embedder 201 or a conventional embedder.

Information Embedder 201

As noted, information embedder 201 embeds watermark signal 102 into host signal 101 to produce composite signal 103 that may be transmitted or otherwise distributed or used. Specifically, with respect to the illustrated embodiment, information embedder 201 generates an ensemble of two or more dithered quantizers that produce dithered quantization values, each such dithered quantizer corresponding to a possible value of a co-processed group of components of a watermark signal. As further noted, information embedder 201 also changes selected values of the host signal to certain dithered quantization values, thereby generating a composite signal. Such dithered quantization values are those generated by the particular dithered quantizer of the ensemble of dithered quantizers that corresponds to the value of the portion of the watermark signal that is to be embedded.

In some embodiments, other than the "super-rate" embodiments noted above, the dithered quantization values to which information embedder 201 changes selected values of the host signal are those that are closest to the host-signal values, thereby satisfying one or more distortion criteria. In super-rate embodiments, reliability criteria, as well as distortion criteria, are implemented. Thus, the dithered quantization values to which information embedder 201 changes selected values of the host signal need not be those that are closest to the host-signal values. FIG. 3A is a functional block diagram of information embedder 201 that, as shown, includes host-signal analyzer and block selector 310, ensemble designator 320, and point coder 330. In some implementations, embedder 201 may also include pre-transmission processor 335 that implements domain inversions.

Host-signal analyzer and block selector 310 analyzes host signal 101 to select host-signal embedding blocks in which watermark signal 102 is to be embedded. Ensemble designator 320 designates two or more dithered quantizers, one for each possible value of a co-processed group of components of watermark signal 102A. Each dithered quantizer generates non-intersecting dithered quantization values. The dithered quantizers designated by ensemble designator 320 generate dithered quantization values selected in accordance with the maximum allowable watermark-induced distortion level, expected channel-induced distortion level, a desired intensity of a selected portion of the watermark signal in the host-signal embedding blocks, and/or, in the case of super-rate quantization, desired reliability criteria. Point coder 330 codes host-signal values of the host-signal components of the selected portions of the host signal in the embedding blocks. Such coding is done in the illustrated embodiment by changing such host-signal values to the closest dithered quantization value.

Host-Signal Analyzer and Block Selector 310

As noted, host-signal analyzer and block selector (hereafter, simply "selector") 310 operates on host signals 101. It will be understood that the illustrated embodiments of host signals 101 are exemplary and that many other embodiments are possible. For illustrative purposes, it is assumed that host signals 101 are digital signals, which may be digitized versions of analog signals. In alternative embodiments, host signals 101 may be analog signals, or combination analog and digital signals. Host signals 101 may be pre-processed by pre-processors 109, may be externally selected by a user and made available for processing by computer system 110A in accordance with known techniques, or may be a computer-generated signal. Also, selector 310 may select host signals 101 by, for example, consulting a look-up table (not shown) of host signals into which watermark signals are to be embedded, or using other techniques.

Figure 4A:
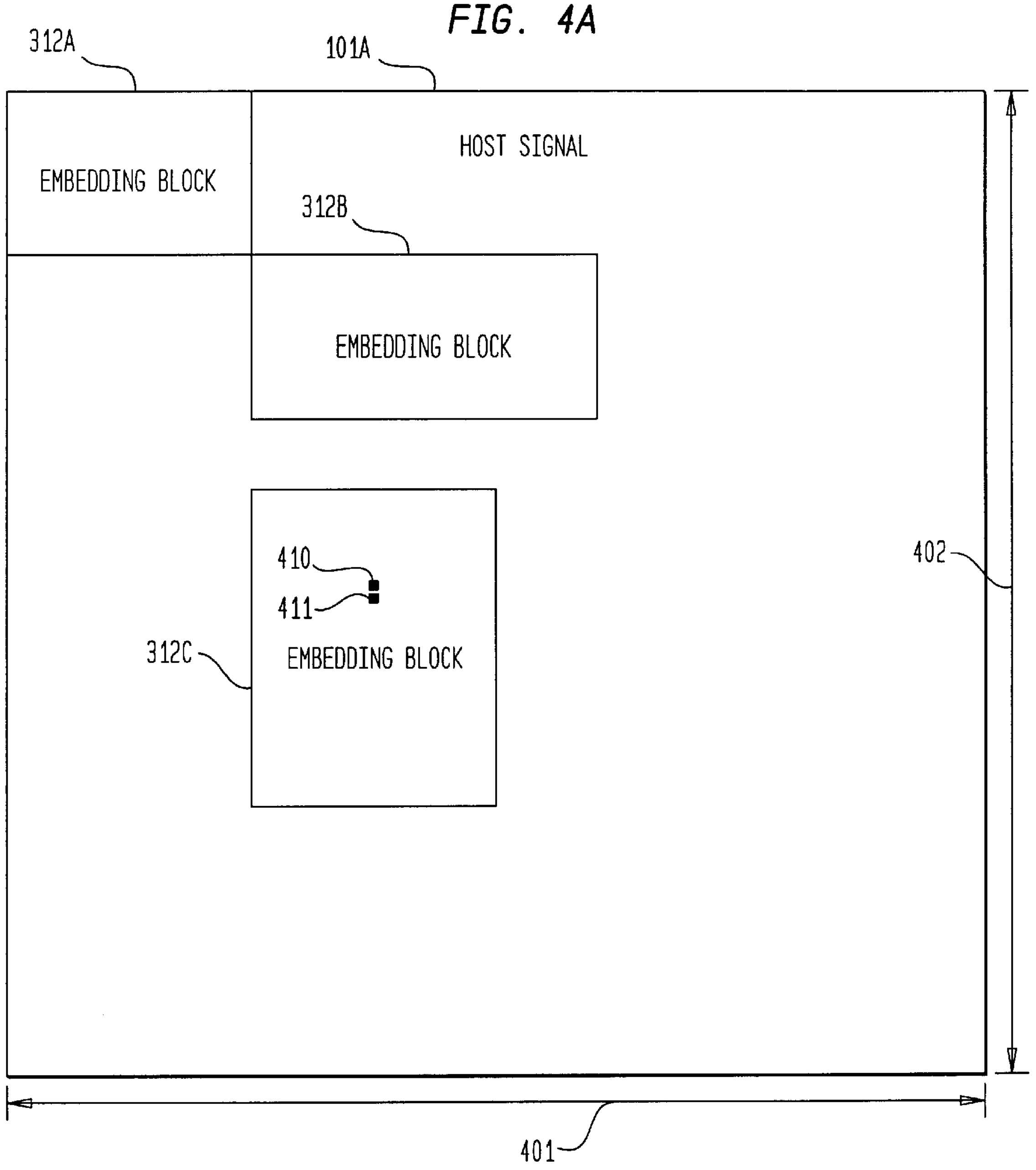
FIG. 4A is a graphical representation of an illustrative example of a host signal into which a watermark signal is to be embedded by the information embedder of FIGS. 2 and 3.

Selector 310 optionally selects one or more blocks, generally and collectively referred to as host-signal embedding blocks 312, from host signal 101. For illustrative purposes, it is assumed that host signal 101A is a black and white image, a simplified graphical representation of which is shown in FIG. 4A. It is also so assumed that dimensions 401 and 402 of host signal 101 are each 256 pixels long, i.e., the image of host signal 101 consists of 65,536 pixels. Each of such pixels has a grey-scale value that, in the illustrative example, is a real number. It will be understood that, in other illustrative examples, such grey-scale values may be otherwise represented.

As noted, the described functions of selector 310 are illustrated with respect to pixels of an image, but embedder-extractor 200 is not so limited. In particular, a pixel is an illustrative example of what is referred to herein more generally as a host-signal component. The grey-scale value of a pixel similarly is an illustrative example of what is referred to herein more generally as a host-signal value. Other examples of host-signal values and host-signal components include the RGB (red-green-blue) value of a pixel, the luminance and chrominance values of a pixel, the amplitude or linear predictive coefficient of a speech sample, and so on.

In the illustrative example of FIG. 4A, selector 310 selects blocks of pixels of host signal 101 that are graphically represented by embedding blocks 312A–C. Selector 310 may employ any of a variety of factors in making such selection, some of which factors may depend on the embedding application. For example, the application may be one in which an identification number is to be embedded in a particular copy of a copyrighted image so that the identification number may not be removed without compromising the image. In such an application, selector 310 may employ any of a variety of known, or to-be-developed, techniques to determine which regions of host signal 101 contain significant, or significant amounts of, information. The reason for selecting such high-information areas is that unauthorized attempts to manipulate them to extract the watermark signal are more likely to be noticed. Thus, the watermarks may be said to be "tamper-resistant." For example, one such technique would be to identify areas in which there is a greater amount of diversity in the grey-scale values of pixels than in other areas.

In other applications, tamper resistance may not be an important factor. Rather, it may be desirable to embed the watermark in portions of the host signal that are less important than others, or that may be distorted with less important consequences, even though tampering may thus be made easier. For example, with reference to the systems of FIGS. 3B and 3C, it typically is desirable to embed the digitally formatted audio signal (watermark signals 102B or 102C, respectively) in the analog formatted audio signal (in the audio and modulation domains, respectively) in a way that minimizes the effects of any distortion that occurs due to the embedding. It is known that the human ear and auditory system of the brain are susceptible to various masking phenomena. One example is temporal masking, in which a person may be less sensitive to sounds that occur just after, or before, a loud sound. Thus, it may be desirable to select these portions of the host signal (i.e., before or after loud sounds) for embedding because the distortion will be masked. Also, the human auditory system is susceptible to spectral masking so that portions of the host signal having certain frequency characteristics may be selected for their masking properties. Similarly, selection with respect to video signals may be made to take advantage of various known masking phenomena associated with the human visual system. Also, as noted, selection may advantageously be made of portions of a host signal that are relatively less important than others in a particular application. An example is the selection of FM side bands. More generally, many areas of the electromagnetic spectrum may be relatively less important in certain applications with respect to carrying information, and thus serve as favorable host signals. Some examples may include ultra-violet or infra-red frequencies. Other examples in an audio context are certain sounds, e.g., animal sounds, thunder, highway noise, etc., the distortion of which may not readily be noticed.

More generally, factors typically employed by selector 310 in selecting portions of host signal 101 for embedding include the amount of information to be embedded; the availability of various resources of computer system 110A, such as the amount of available memory in memories 230 or the speed of processors 205; the desirability of embedding a watermark signal in a location in the host signal that is likely to be subject to tampering (in relation to other locations in the host signal); and the desirability of embedding a watermark signal in a location that is relatively less likely to result in distortion to the host signal or is relatively easier to extract. The relevance of such factors is described below with respect to the functions of dimensionality determiner 710 of FIG. 7.

For illustrative purposes, it is assumed that, in a particular implementation, selector 310 selects embedding block 312C. As described below, selector 310 may select any number of embedding blocks between 1 and 65,536 in the illustrative example; that is, all of host signal 101 may be an embedding block, or each pixel of host signal 101 may be an embedding block. Also, the embedding block may be continuing; that is, for example, host signal 101 may include a continuing signal stream into which a watermark signal is embedded at various points in the stream. Further, embedding blocks may have any configuration, e.g., they need not be rectangles as shown in FIG. 4, and they need not be contiguous. In accordance with any of a variety of known, or to-be-developed, techniques, selector 310 identifies those pixels included in embedding block 312C by determining its boundaries, or other indicator of placement within host signal 101, such as offset from the beginning of host signal 101. As described below with respect to the operations of information extractor 202, and synchronizer 910 in particular, such block identification may be used in a known manner to synchronize received composite signal with noise 105 with transmitted composite signal 103. Such synchronization enables information extractor 202 to identify a block of pixels corresponding to embedding block 312C even if a portion of transmitted composite signal 103 has not been received or is distorted.

Ensemble Designator 320

As noted, ensemble designator 320 of the illustrated embodiment designates two or more dithered quantizers, one for each possible value of a co-processed group of components of watermark signal 102. Also as noted, a dithered quantizer is a type of embedding generator. In alternative embodiments, ensemble designator 320 may designate embedding generators that are not dithered quantizers.

Figure 4B:
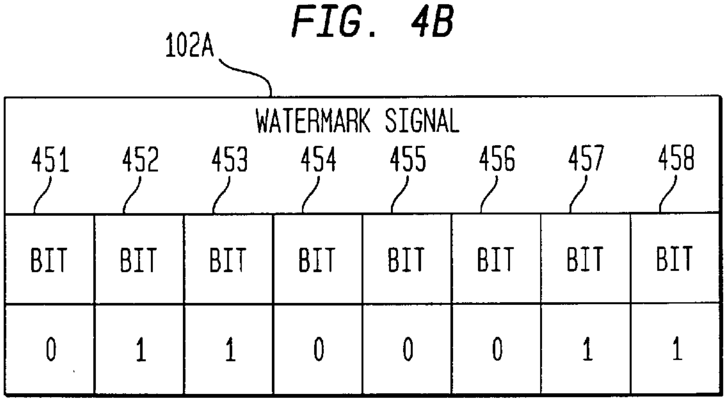
FIG. 4B is a graphical representation of an illustrative example of a watermark signal to be embedded in the host signal of FIG. 4A by the information embedder of FIGS. 2 and 3.

FIG. 4B is one illustrative embodiment of watermark signal 102 that is an eight-bit message; for example, a binary serial number. There are thus 256 possible serial numbers. As is evident, such illustrative serial numbers may be the binary numbers themselves, or the binary numbers may represent numbers, text, or other representations contained in a look-up table, or other data structure, indexed by the binary numbers or related pointers. In FIG. 4B, the bits of the illustrative serial number are labeled 451–458, with bit 451 being the most significant bit (or "high" bit), and bit 458 being the least significant bit (or "low" bit). Each of bits 451–458 is a component of watermark signal 102. In the illustrative example of such binary components, each component may thus have one of two watermark-signal values, typically 0 or 1.

Watermark signal 102 may be a transformed, coded, encrypted, or otherwise processed, version of an original watermark signal (not shown). For example, one or more of bits 451–458 of exemplary watermark signal 102 of FIG. 4B may constitute parity bits, or other error-detection bits, that have been added to an original watermark signal by an error-detection/error-correction device (not shown). Also, as noted, watermark signal 102 in alternative examples need not be a binary, or other digital, signal. It may be an analog signal, or a mixed digital-analog signal.

Each dithered quantizer generates non-intersecting and uniquely mapped dithered quantization values. One "one-dimensional" implementation of the generation of such dithered quantization values is shown in FIG. 5C. The term "one-dimensional" means in this context that a watermark-signal component, or group of co-processed watermark-signal components, is embedded in one host-signal component, i.e., one pixel in the illustrated embodiment. The term "two-dimensional" is used herein, for example with respect to FIGS. 8A and 8B, to mean that a watermark-signal component, or group of co-processed watermark-signal components, is embedded in two host-signal components, i.e., two pixels in the illustrated embodiment.

More generally, the number of dimensions may be any integer up to the number of host signal components in the host-signal embedding block (or in the host signal, if there is only one such block constituting the entire host signal). Thus, any one (or any combination, as noted below) of bits 451–458 may be embedded in one, two, or any integer up to 65,536, pixel(s) of host signal 101 of FIG. 4A. As described below with respect to dimensionality determiner 710 of FIG. 7, more than one watermark-signal component (i.e., more than one bit in the illustrative example) may be embedded in one or more host signal components. For example, two bits may be embedded in two pixels. Watermark-signal components thus embedded together in one or more host signal components are referred to as a group of co-processed watermark-signal components.

Figure 5A:
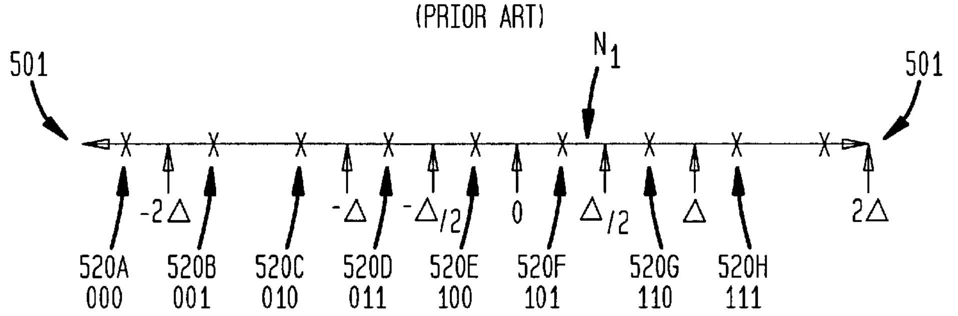
FIG. 5A (PRIOR ART)
FIG. 5A is a graphical representation of a real-number line with respect to which a known technique for simple quantization may be applied.
Figure 5B:
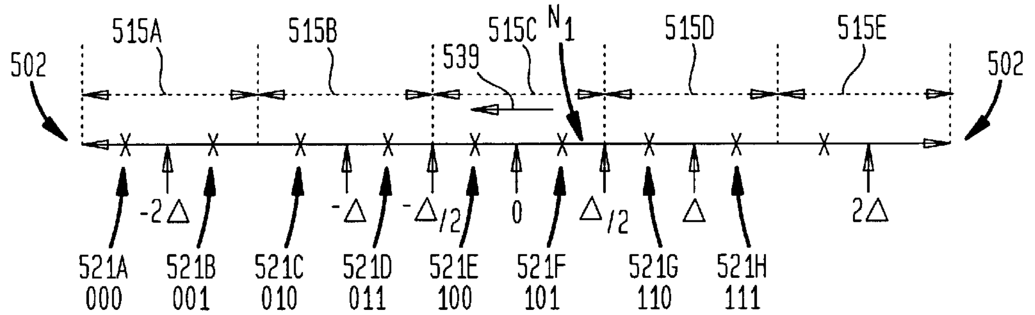
FIG. 5B (PRIOR ART)
FIG. 5B is a graphical representation of a real-number line with respect to which a known technique for low-bit modulation may be applied.
Figure 5C:
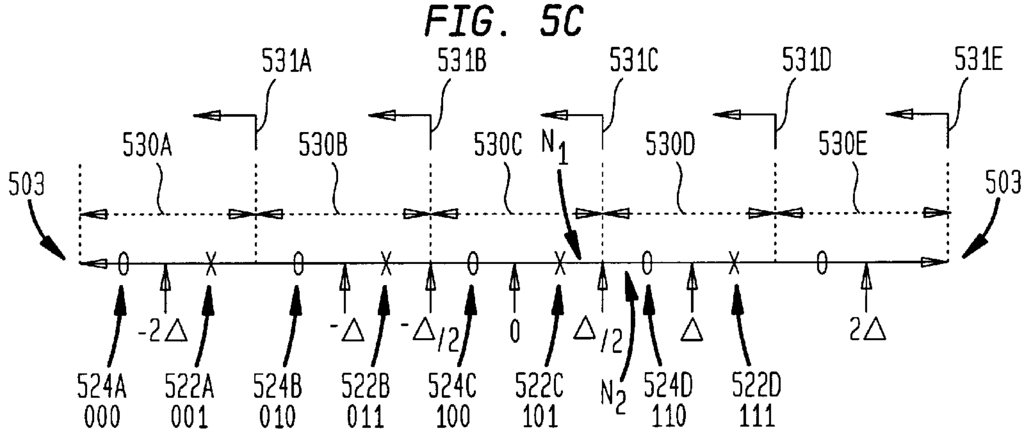
FIG. 5C is a graphical representation of a real-number line with respect to which a first embodiment of an ensemble of two dithered quantizers generates one embodiment of dithered quantization values in accordance with the operations of one embodiment of a quantizer ensemble designator of the information embedder of FIG. 3A.
Figure 5D:
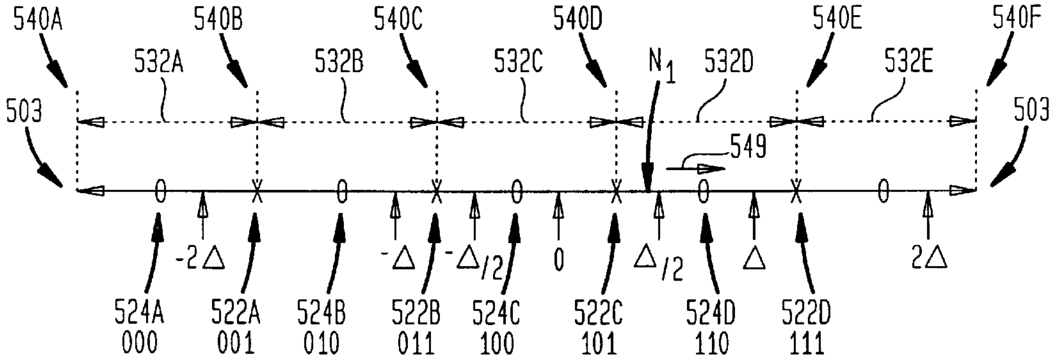
FIG. 5D is an alternative graphical representation of the real-number line of FIG. 5C.
Figure 6A:
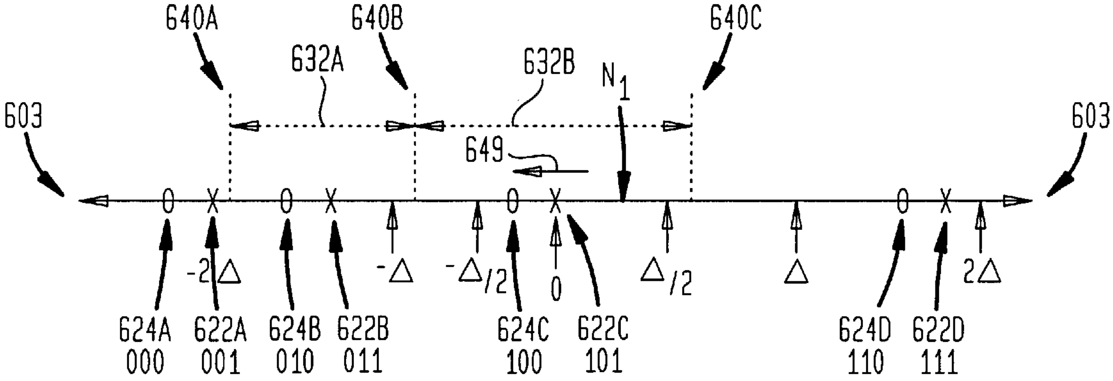
FIG. 6A is a graphical representation of a real-number line with respect to which a second embodiment of an ensemble of two dithered quantizers has generated one embodiment of dithered quantization values in accordance with the operations of one embodiment of a quantizer ensemble designator of the information embedder of FIG. 3A.
Figure 6B:
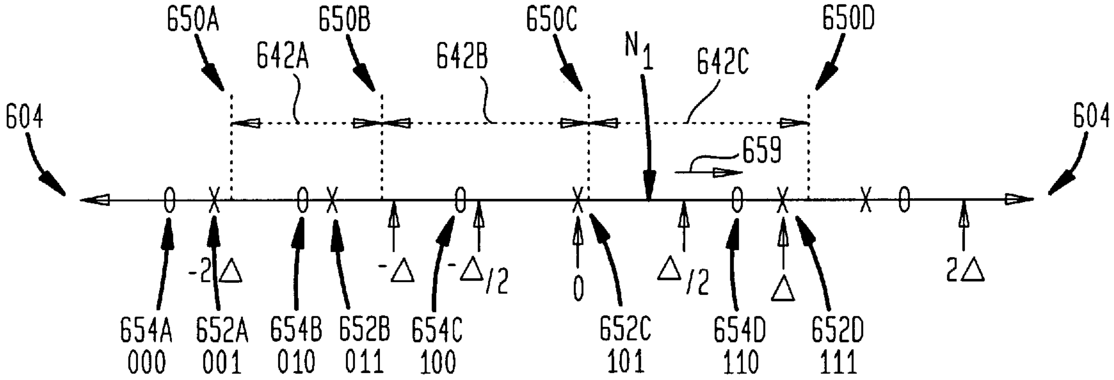
FIG. 6B is a graphical representation of a real-number line with respect to which one embodiment of an ensemble of two embedding generators, which are not dithered quantizers, have generated one embodiment of embedding values in accordance with the operations of one embodiment of a quantizer ensemble designator of the information embedder of FIG. 3A.
Figure 6C:
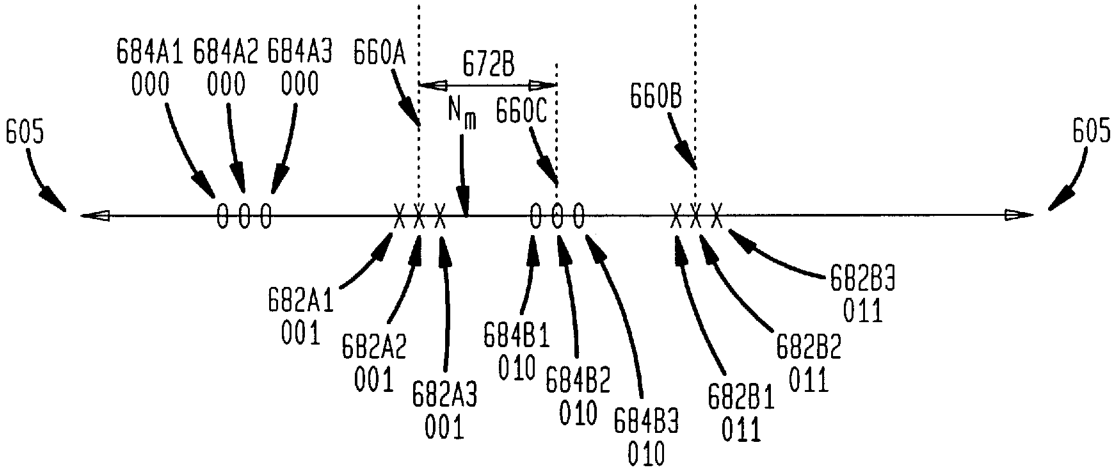
FIG. 6C is a graphical representation of a real-number line with respect to which one embodiment of an ensemble of two embedding generators, which are super-rate quantizers, have generated one embodiment of embedding values in accordance with the operations of one embodiment of a quantizer ensemble designator of the information embedder of FIG. 3A; shows one embodiment in which an embedding generator generates embedding values based on a super-rate quantization technique.

Reference is now made to FIGS. 5A–D and FIGS. 6A and 6B that show illustrative examples of quantization (FIG. 5A), quantization and low-bit modulation (FIG. 5B), the generation of quantization values using dithered quantization (FIGS. 5C, 5D, and 6A), the generation of embedding values using an embedding generator that is not a dithered quantizer (FIG. 6B), and super-rate quantization (FIG. 6C). More specifically, FIG. 5A is a graphical representation of real-number line 501 with respect to which is illustrated the simple quantization of a real number using a known technique. FIG. 5B is a graphical representation of real-number line 502 upon which is illustrated the quantization and modulation of a real number using the known technique of low-bit modulation. FIG. 5C is a graphical representation of real-number line 503 upon which is illustrated the dithered quantization of a host-signal value, i.e., the embedding of a watermark-signal component using one embodiment in which a pair of dithered quantizers are employed in accordance with the present invention. FIG. 5D is an alternative graphical representation of real-number line 503 of FIG. 5C. FIG. 6A similarly shows the operations of a pair of dithered quantizers in accordance with the present invention, except that whereas the quantization values generated by each of the dithered quantizers of FIGS. 5C and 5D are regularly and evenly spaced, such regularity is not present with respect to the quantization values of FIG. 6A. FIG. 6B shows the operations of a pair of embedding generators in accordance with the present invention that are not dithered quantizers.

The Simple Quantizer of FIG. 5A

The simple quantization technique illustrated in FIG. 5A is used to quantize a real number to an integer so that, for example, it may be represented by a binary number. Such quantization and binary representation commonly are done to facilitate digital storage, manipulation, or other processing of the host signal that requires, or benefits from, the use of binary numbers rather than real numbers. Such simple quantization is not a watermarking technique because it does not embed a watermark signal in a host signal. However, some of the terms applicable to watermarking techniques may usefully be illustrated by reference to FIG. 5A.

For purposes of illustration, it is assumed that the real number to be quantized is the real number $N_1$ on real-number line 501 of FIG. 5A. Points to the right of "0" on line 501 are positive, and points to the left are negative. According to one known simple quantizing technique, the real number $N_1$ is quantized by changing it to the nearest of a series of quantization values. Such values are indicated by the points on axis 501 labeled with the symbol "X," such as points 520A–H, generally and collectively referred to as quantization values 520.

Typically, but not necessarily, quantization values 520 are regularly and evenly spaced. In the illustrated example, quantization values 520 are spaced a distance Δ/2 apart; that is, the simple quantizer of FIG. 5A has a "step size" of Δ/2. It is assumed for illustrative purposes that the first positive quantization value, labeled 520F, is located at a point Δ/4 on line 501. Thus, the next positive quantization value 520G is located one step size distant at point 3/4 Δ, and so on. In the illustrated example, and following a common implementation, each of quantization values 520 is represented by a binary number. As shown in FIG. 5A, the binary representations for the exemplary quantization values are: "000" for value 520A, "001" for value 520B, "010" for value 520C, "011" for value 520D, "100" for value 520E, "101" for value 520F, "110" for value 520G, and "111" for value 520H. It will be understood by those skilled in the relevant art that many other binary representations, and other representational schemes, may be used.

In this illustrative example, the host-signal value $N_1$, located at 3/8Δ, is changed to quantization value 520F, which is the quantization value that is closest in value to $N_1$. As will be evident to those skilled in the relevant art, the distortion introduced by the quantization of host-signal value $N_1$ is related to some measure of distance, e.g., differences in value, between the values of $N_1$ and 520F.

The Low-Bit Modulation Technique of FIG. 5B

As noted, FIG. 5B is a graphical representation of real-number line 502 upon which is illustrated the known quantization technique for watermarking commonly referred to as low-bit modulation. It is assumed for illustrative purposes that real number $N_1$, located at 3/8Δ on real-number line 502, is to be so quantized. In accordance with this known technique, three steps typically are performed.

First, quantization values typically are generated by a single quantizer (referred to herein as the "LBM quantizer"). The quantization values so generated typically are regularly and evenly spaced. For convenience of illustration and comparison, it is assumed that such quantization values are located and spaced as described above with respect to the quantization values of FIG. 5A. It is also assumed that the quantization values of the low-bit modulation technique of FIG. 5B are represented by binary numbers in the same manner as described above with respect to the simple quantization technique of FIG. 5A. The quantization values generated by the LBM quantizer of FIG. 5B are quantization values 521A–H, generally and collectively referred to as quantization values 521.

The second step typically performed is to quantize $N_1$ in the same manner as described above with respect to the simple quantization technique of FIG. 5A. That is, $N_1$ tentatively is quantized to the closest quantization value; i.e., to the closest of quantization values 521 (referred to herein as the "tentative LBM quantization value"). Thus, $N_1$ is tentatively quantized to quantization value 521F, which, in the illustrated example, is represented by the binary number "101."

The third step typically performed is to modulate $N_1$ either by adopting the tentative LBM quantization value as the final value, or by changing the tentative LBM quantization value to the one other of quantization values 521 that differs from the tentative LBM quantization value only in the low bit. That is, the final quantization value of $N_1$ either is the tentative LBM quantization value, or it is the tentative LBM quantization value with its low bit changed. In the illustrative example, $N_1$ thus would be quantized either to "101" (521F), or to "100" (521E), depending on the value of the modulating signal.

For illustrative and comparative purposes, the intervals in which the binary representations of LBM quantization values 521 differ only in the low bit are shown in FIG. 5B as quantization intervals 515A–E, generally and collectively referred to as quantization intervals 515. The value to be quantized according to the LBM technique thus is quantized to one of a pair of quantization values 521 falling within the same quantization interval as is located the value to be quantized. In the illustrative example, $N_1$ thus is quantized to one of the two quantization values 521 located in quantization interval 515C, the selection of the value being dependent upon the value of the modulating signal. For purposes of illustration, it is assumed that the modulating signal is a bit having a value of "0," and that the modulation of such value is implemented by selecting as the final quantization value the value that differs from the tentative LBM quantization value by the low bit. Thus, the final quantization value is quantization value 521E, which differs from the nearest quantization value (521F) only in the low bit. The amount of distortion introduced by the quantization of $N_1$ to quantization value 521E is represented in FIG. 5B by the length of distortion line 539. Significantly, the amount of such distortion is greater than would have been introduced by quantizing $N_1$ to quantization value 521G, which is closer to $N_1$ but differs from quantization value 521F in two bits rather than in just the low bit.

The One-Dimensional, Dithered, Quantization Technique of FIGS. 5C, 5D, and FIG. 6A FIG. 5C is a graphical representation of real-number line 503 upon which is illustrated a one-dimensional dithered quantization of a host-signal value, $N_1$, in accordance with the present invention. Quantization values 522 and 524, represented by "X's" and "O's," respectively, are generated by two dithered quantizers generated by ensemble designator 320. Two dithered quantizers are generated in the illustrative example because one bit of a watermark signal is to be embedded in the host signal. That is, because a single bit may have one of two values, typically "0" or "1," one dithered quantizer is generated so that it may generate one or more quantization values corresponding to one of such bit values, and the second dithered quantizer is generated to generate quantization values corresponding to the other of such bit values.

In the illustrated embodiment, one dithered quantizer generates quantization values 522A–D, and the other dithered quantizer generates quantization values 524A–D, generally and collectively referred to as quantization values 522 and 524, respectively. In particular, for illustrative purposes, it is assumed that one of such dithered quantizers, referred to as the "X quantizer," generates quantization values 522 corresponding to a watermark signal bit of value "1" and shown in FIG. 5C by the "X" symbol on real-number line 503. Similarly, the second dithered quantizer, referred to as the "O quantizer," generates quantization values 524 corresponding to a watermark signal bit of value "0" and shown by the symbol "O." In the embodiment shown in FIGS. 5C and 5D, quantization values 522 and quantization values 524 are regularly and evenly spaced for illustrative purposes although, as noted, it need not be so.

It is further assumed for illustrative and comparative purposes that $N_1$ is located at 3/8Δ, that the two quantizers with quantization values 522 and 524 have a step size Δ, that the quantization values 522 and 524 are offset from each other by a distance Δ/2, and that the first positive quantization value (522C) is located at a point Δ/4 on real-number line 503. Although, in contrast to low-bit modulation, it is unnecessary to assign binary representations to quantization values in order to use the illustrated technique, they are shown in FIG. 5C (and FIGS. 5D, and 6A–6C) for convenience and purposes of comparison. As shown in FIG. 5C, the binary representations for the exemplary quantization values are: "000" for value 524A, "001" for value 522A, "010" for value 524B, "011" for value 522B, "100" for value 524C, "101" for value 522C, "110" for value 524D, and "111" for value 522D. It will be understood by those skilled in the relevant art that many other binary representations, and other representational schemes, may be used, and that the exemplary values of $N_1$, quantization values 522, and quantization values 524, are chosen for illustrative purposes and that many other such values may be chosen.

In contrast to the implementation of the low-bit modulation technique described above, the dithered quantization technique has the property that at least one embedding interval of one embedding generator is not the same as any embedding interval of at least one other embedding generator in an ensemble of embedding generators. This property is shown in FIG. 5C in which a dither value is added or subtracted from the value of $N_1$ before quantization (thus moving $N_1$ to the right or left, respectively, on real-number line 503). This property follows from the fact that the quantization interval in which $N_1$ is located (the "$N_1$ interval") is shifted by the dither value, but in the direction opposite to that in which $N_1$ may be shifted. That is, a shift of $N_1$ to the right is equivalent to a shift of the $N_1$ interval to the left, and vice versa.

The dither value is the real-number value that will result in an interval boundary nearest to $N_1$ being located at a midpoint between two quantization values generated by the dithered quantizer that corresponds to the watermark-signal value that is to be embedded. In particular, one of the two values is the closest quantization value to $N_1$, and the other quantization value is on the opposite side of $N_1$ from such closest quantization value. For convenience of reference, such closest quantization value is referred to herein as the "close-value boundary determiner" and such other quantization value is referred to as the "far-value boundary determiner."

For example, with reference to FIGS. 5C and 5D, it is assumed for illustrative purposes that the watermark-signal value to be embedded is "0." Thus, $N_1$ is to be mapped to the closest one of quantization values 524 generated by the O quantizer; that is, to the closest of the "O" symbols on real-number line 503. The closest value to $N_1$ generated by the O quantizer is quantization value 524D, which is thus the close-value boundary determiner. The quantization value generated by the O quantizer that is on the opposite side of $N_1$ is quantization value 524C, and is thus the far-value boundary determiner. The $N_1$-interval boundary closest to $N_1$ therefore is located at the midpoint between quantization values 524C (located at −Δ/4) and 524D (located at ¾Δ), as shown by boundary line 540D of FIG. 5D (located at Δ/4). Such placement of boundary line 540D is achieved by choosing the dither value, in the illustrative example, to be the real number Δ/4. Alternatively described in terms of FIG. 5C, a dither value of Δ/4 is added to $N_1$ thereby generating a real number representing the dithered value of the host-signal value, shown as $N_2$.

As shown in FIG. 5D, boundary line 540D is one of boundary lines 540 that also include boundary lines 540A–C, and 540 E–F. All of boundary lines 540 are similarly located at mid-points between adjacent quantization values 524. Such location of boundary lines 540 of FIG. 5D may be described as a shift of Δ/4 to the left of quantization intervals 530 of FIG. 5C, as indicated by shift lines 531A–E of FIG. 5C. FIG. 5D is therefore an alternative representation of real-number line 503 after such interval shift is implemented. If the watermark-signal value to be embedded had been assumed to be "1," then $N_1$ would be mapped to the closest one of quantization values 522 generated by the X quantizer of FIGS. 5C and 5D, and boundary lines at mid-points between adjacent quantization values 522 would have been employed in determining the dither value.

The distortion introduced by the dithered quantization of FIG. 5D is represented by the distance between the value $N_1$ and the one of quantization values 524 that is located in the same quantization interval as $N_1$, i.e., quantization value 524D. Such distortion is represented by the distance of distortion line 549. Significantly, and in contrast to the low-bit modulation technique described above, dithered quantization provides that the host-signal value is quantized to the closest quantization value corresponding to the watermark-signal value to be embedded.

The designation of boundaries defining quantization intervals typically enables efficient, and/or quick, processing by computer systems 110A and 110B. In particular, it generally is more efficient and faster to map a host-signal value to a quantization value by identifying the interval in which the host-signal value is located, rather than by calculating the distances from the host-signal value to various quantization values and determining which is the closest. Mapping by reference to quantization intervals may be accomplished, for example, by the use of a look-up table (not shown) stored in memory 230A by ensemble designator 320 to correlate the location of the host-signal value with a quantization interval and with the quantization value that falls within that interval. In alternative embodiments, any other of a variety of known techniques for associating data may be used.

Such a look-up table may include, in one implementation, a column of real-number entries identifying the starting values of quantization intervals (such as Δ/4 for interval 532D of FIG. 5D) and another column of real-number entries identifying the ending values of such quantization intervals (such as 5/4Δ for interval 532D). Each row (hereafter referred to as a record) in such implementation therefore provides the starting and ending real numbers of a quantization interval. In accordance with the illustrative techniques described above with respect to FIGS. 5C, 5D, 6A, and 6B, each quantization interval includes within its boundaries only one quantization value corresponding to the watermark-signal value to be embedded. Thus, each record of the look-up table may further include a third column having entries that identify the particular quantization value associated with the quantization interval of that record. Quantizing $N_1$, for example, may thus be accomplished by using any of a variety of known search and compare techniques to scan the entries in the first and second columns of the look-up table to find the record having start and end values that encompass the real-number value of $N_1$. The value of $N_1$ may then be quantized to the value of the entry in the third column of that record.

The use of dithered quantizers is advantageous because dithered quantization values generated by one dithered quantizer may be used to generate dithered quantization values for any other dithered quantizer simply by adding or subtracting an offset value. That is, as noted, each of the dithered quantization values generated by any one of an ensemble of dithered quantizers differs by an offset value (i.e., are shifted) from corresponding dithered quantization values generated by each other dithered quantizer of the ensemble. Thus, for example, if there are at least three dithered quantizers in the ensemble, and the first generates the dithered quantization values $V_1$, $V_2$, and $V_3$, then the second dithered quantizer generates dithered quantization values $V_1$+A, $V_2$+A, and $V_3$+A, where A is an offset value that may be a real number. The third dithered quantizer generates dithered quantization values $V_1$+B, $V_2$+B, and $V_3$+B, where B is an offset value that is not equal to A, and so on with respect to all of the dithered quantizers. For convenience, quantization values $V_1$, $V_1$+A, and $V_1$+B, are referred to herein as "corresponding" dithered quantization values.

Although the distance between any two corresponding dithered quantization values generated by two dithered quantizers is thus always constant, the distance between two dithered quantization values generated by any one dithered quantizer generally need not be constant. That is, for example, the distance between $V_1$ and $V_2$ may be different than the distance between $V_2$ and $V_3$. FIG. 6A shows an implementation of dithered quantization in which dithered quantization values 624A–D generated by the O dithered quantizer are not regularly and evenly spaced, as they are in FIGS. 5C and 5D. Similarly, dithered quantization values 622A–D generated by the X dithered quantizer are not regularly and evenly spaced. However, the distance between X's and O's is constant because they differ by a constant offset value.

With respect to FIG. 6A, it is again assumed for illustrative and comparative purposes that the watermark-signal value is "0," corresponding to the O dithered quantizer. Therefore, as with respect to boundary lines 540 of FIG. 5D, boundary lines 640 (lines 640A–C) of FIG. 6A are located at the midpoints between adjacent O's , thereby defining quantization intervals 632A–B. If the watermark-signal value to be embedded had been "1," boundary lines would be located at the midpoints between adjacent X's . A watermark-signal component having the watermark-signal value "0" is embedded in host-signal value $N_1$ by quantizing $N_1$ to the closest of embedding values 624; e.g., by quantizing $N_1$ to the dithered quantization value that is within the $N_1$ interval. In the illustrative example of FIG. 6A, $N_1$ is located in quantization interval 632B that is defined by boundary lines 640B and 640C. The dithered quantization value within this interval is dithered quantization value 624C; thus, it is the closest quantization value to $N_1$. The distortion introduced by such dithered quantization is represented by the length of distortion line 649. It is provided that such distortion is less than would be introduced by choosing any other quantization value 624 because quantization value 624C is the closest of such values to $N_1$. Alternatively stated, such least distortion is provided because both $N_1$ and dithered quantization value 624C are located within the same quantization interval, and because the boundaries of quantization intervals are set by locating them at the midpoint between adjacent dithered quantization values in the manner described above.

The One-Dimensional Quantization Technique of FIG. 6B

As noted, ensemble designator 320 is not limited to embodiments implementing dithered quantization techniques. FIG. 6B shows one alternative embodiment in which embedding generators that are not dithered quantizers generate embedding values that are not dithered quantization values. That is, embedding values 654A–D generated by the O embedding generator are not regularly and evenly spaced, embedding values 652A–D generated by the X embedding generator are not regularly and evenly spaced, and the distance between X's and O's is not constant; i.e., they do not differ by a constant offset value as would be the case for a dithered quantizer. It will be understood that FIG. 6B is illustrative of one embodiment only, and, in alternative non-dithered quantizer embodiments (i.e., there is not a constant offset value), the embedding values generated by any one or more embedding generators may be regularly and/or evenly spaced.

With respect to FIG. 6B, it is assumed for illustrative and comparative purposes that the watermark-signal value is "0," corresponding to the O embedding generator. Therefore, boundary lines 650A–D are located at the midpoints between adjacent O's , thereby defining quantization intervals 642A–C. If the watermark-signal value to be embedded had been "1," boundary lines would be located at the midpoints between adjacent X's . Host-signal value $N_1$ is embedded in the watermark-signal component (which has the watermark-signal value "0") by quantizing $N_1$ to the embedding value of embedding values 654 that is within the $N_1$ interval, i.e., within the quantization interval defined by the boundary lines within which $N_1$ is located. In the illustrative example of FIG. 6B, $N_1$ is located in quantization interval 642C that is defined by boundary lines 650C and 650D. The embedding value within this interval is embedding value 654D. The distortion introduced by such quantization is represented by the length of distortion line 659. It is provided that such distortion is less than would be introduced by choosing any other embedding value 654 because embedding value 654D is the closest of such values to $N_1$.

The Super-Rate Quantization Technique of FIG. 6C

FIG. 6C is a graphical representation of real-number line 605 upon which is illustrated a one-dimensional, super-rate quantization of a host-signal value, $N_m$, in accordance with the present invention. It will be understood that the one-dimensional example is provided for convenience only, and that any number of dimensions may be used. Quantization values 682A1–682A3 are generally and collectively referred to as a "super-group of quantization values," or simply "super-group" 682A. Similar conventions are used with respect to quantization values 682B1–682B3 (super-group 682B), 684A1–684A3 (super-group 684A), and 684B1–684B3 (super-group 684B). Super-groups 682A and 682B (generally and collectively referred to as groups 682) are represented by "X's ." Super-groups of quantization values 684A and 684B (generally and collectively groups 684) are represented by "O's."

Groups 682 and 684 are respectively generated by two super-rate quantizers designated by ensemble designator 320. As in the previous examples, two quantizers are designated because one bit (i.e., two values) of a watermark-signal component is to be embedded in the host signal. It is arbitrarily assumed, as in the examples above, that the X quantization values (groups 682) represent a "0" bit and that O quantization values (groups 684) represent a "1" bit. It will be understood that the watermark-component values need not be binary.

In the embodiment shown in FIG. 6C, groups 682 and 684 are shown for illustrative purposes as being regularly and evenly spaced with respect to each other, and with respect to the super-groups within them. It will be understood that it need not be so in alternative embodiments. It further will be understood that, although three quantization values are shown in each X or O super-group in FIG. 6C, the super-rate technique is not so limited. Rather, a super-group may consist of any number of quantization values, and it is not required that each super-group have the same number. In particular, the number and spacing of quantization values in a super-group is determined so that tolerable distortion is introduced irrespective of which quantization value in the super-group is selected to be an embedding value.

It is assumed for illustrative purposes that $N_m$ is a real number to be quantized, and that $N_m$ is the m'th real number to be quantized in any type of sequence or collection $N_1$, $N_2$, $N_3$, and so on. In accordance with the super-rate quantization of the present invention, it is assumed that a statistical or other technique (hereafter, for convenience, simply "statistical" technique) is available for concluding that $N_m$ has a value on number line 605 in the interval 672B between and including the values of quantization value 682A2 and quantization value 684B2. That is, it is assumed in accordance with super-rate quantization, that any known, or later-to-be-developed, technique is available for analyzing, characterizing, simulating, modeling, or otherwise processing sequences or collections; that this "statistical" technique is applied to all or part of the sequence or collection $N_1$, $N_2$, $N_3$, and so on; and that the value of $N_m$ on number line 605 consequently may be predicted within a range sufficient to determine that the value of $N_m$ lies in the interval 672B. This statistical technique can be applied by information extractor 202. This determination need not be to a certainty, but may be to any degree of uncertainty deemed acceptable in view of the possibility for, and consequences of, an erroneous reconstruction of an embedded watermark component.

For all points in the interval 672B, the closest X quantization value to each of those points is in super-group 682A, and not in super-group 682B (or any other X super-group). Similarly, the closest O quantization value to each of those points is in super-group 684B, and not in super-group 684A (or any other O super-group).

Under the assumption that the distortion introduced by embedding $N_m$ into any quantization value of super-groups 682A or 684B is tolerable, $N_m$ is quantized to the one quantization value of either the X super-group or the O super-group (as appropriate in view of the value of the bit to be embedded) that provides the greatest reliability. The term "reliability" is used in this context to mean that the possibility of error in decoding typically is minimized. Reliability is achieved by choosing to quantize $N_m$ to the one quantization value of the closest appropriate-value super-group that is furthest from the closest non-appropriate-value super-group. For example, if it is illustratively assumed that $N_m$ is to be quantized so that it embeds a watermark-signal component value of "0," then the appropriate-value super-group is an X super-group and the non-appropriate-value super-group is a O super-group. The closest appropriate-value super-group is therefore super-group 682A. The closest non-appropriate-value super-group is super-group 684B. The one quantization value of super-group 682A that is furthest from super-group 684B is quantization value 682A1. On the basis of reliability within a range of tolerable distortion, $N_m$ therefore is quantized to quantization value 682A1. Similarly, if it were assumed that $N_m$ were to be quantized so that it embeded a watermark-signal component value of "1," then the appropriate-value super-group is a O super-group and the non-appropriate-value super-group would be an X super-group. The closest appropriate-value super-group would therefore be super-group 684B. The closest non-appropriate-value super-group would be super-group 682A. The one quantization value of super-group 684B that is furthest from super-group 682A is quantization value 684B3. $N_1$ therefore would be quantized to quantization value 684B3.

As is evident from the preceding description, super-rate quantization typically involves the generation of a greater number of quantization values than would typically be used in schemes that are not adaptive, i.e., not based on previously processed values of host-signal components. That is, if past history is not to be exploited, a single quantization value would be used rather than the multiple number of quantization values in a super group. However, as noted, the generation of greater numbers of quantization values provides greater reliability when the past can be exploited since the distance between alternative embedding values is increased in comparison to other schemes.

For example, it is illustratively assumed that, instead of generating three quantization values for each super-group, only one were generated. For example, it is assumed that only quantization values 684A2 and 684A2 are available for representing an embedding value of and only quantization values 682A2 and 682B2 are available for representing an embedding value of "0." It is further assumed that $N_m$ is to be quantized to the value "0," i.e., to the nearest X. Thus, $N_m$ is quantized to quantization value 682A2. If, in transmission, $N_m$ is distorted so that it is closer to 684B2 than to 682A2, then an error will occur because $N_m$ will be extracted as a "1" rather than a "0." However, using super-rate quantization in which the illustrative three quantization values are generated for each super-group, $N_m$ is quantized to quantization value 682A1, rather than 682A2. The distance between quantization values 682A1 and 684B3 (the alternative embedding value if $N_m$ had been quantized to embed a "1" rather than a "0") is greater than the distance between quantization values 682A2 and 684B2. As will be evident to those skilled in the relevant art, greater reliability is directly related to greater distance between these alternatives. Thus, the greater distance achieved with super-rate quantization typically results in greater reliability. Moreover, as will be evident from the preceding description, reliability generally is increased as the number of quantization values in each super group is increased, although distortion typically is also increased. Super-rate quantization thus, among other things, may be used to provide flexibility to trade-off greater distortion for greater reliability. This capability may be particularly advantageous in an application in which channel noise is expected to be high, reliability is important, and greater distortion may be tolerated.

As noted, super-rate quantization is one technique for implementing adaptive embedding. In other implementations, any of a variety of other techniques may be employed that adapt the generation or selection of quantization values based, at least in part, on the history of the host signal and the embedding process. These adaptive embedding techniques may, but need not, be implemented by analyzing the embedding process as applied to previously processed embedding blocks and adapting the process for current and future embedding blocks. For example, embedding block 312A of FIG. 4A may be statistically analyzed so that the likely value of host-signal components to be received in block 312B is predicted. (It is illustratively assumed that block 312A is processed prior to processing block 312B.) Quantization values may then be generated that maximize reliability; e.g., quantization values may be generated so that there is a maximum distance between embedding values for embedding alternative watermark-signal component values. Thus, for each successively processed block (or portion of a block), quantization values may be adapted as more, or different, information is obtained so that the prediction of host-signal component values is changed.

For convenience, predetermined, finite, sets of quantizers (such as the three quantizers in each super-group of the super-rate quantization process described above) may be selected. In some applications, pre-selection of a finite number of quantizers in each group may be advantageous. For example, because information extractor 202 applies similar predictions of future composite-signal component values based on a history of composite-signal components, and various distortions (including quantization distortion) change these values as compared to the values of host-signal components, a finite selection that anticipates the possible range of such distortions may be advantageous. However, in other embodiments, it may be desirable not to pre-limit the number of quantizers in the super group. Rather, a potentially unlimited number of quantizers may be generated for each super group in view of the statistical analysis of the host signal. For example, the previously processed values of host signal components may be used to calculate, rather than select, the quantizers for the currently processed host-signal component.

Figure 7:
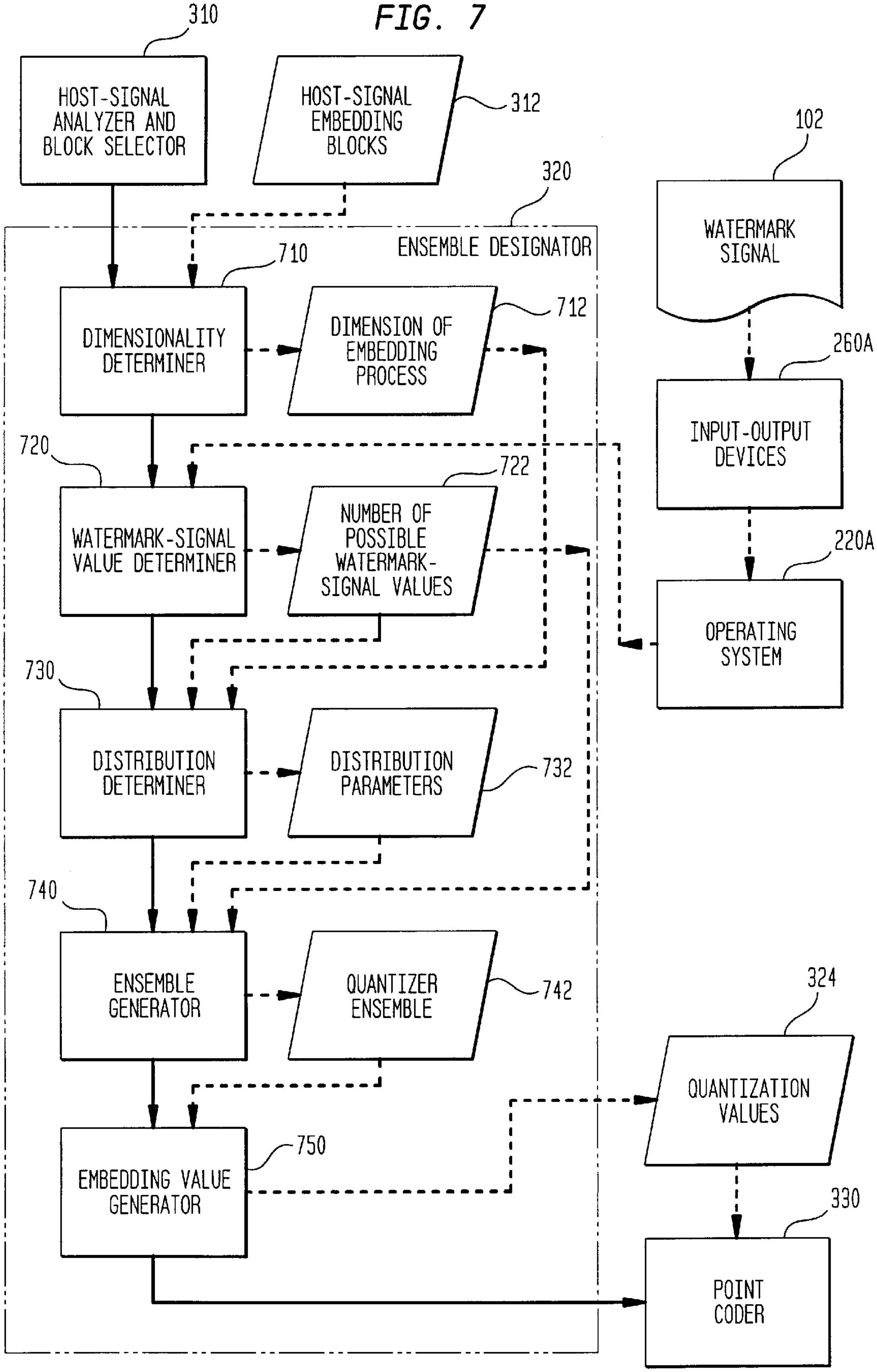
FIG. 7 is a functional block diagram of one embodiment of a quantizer ensemble designator of the information embedder of FIG. 3.

The operations of ensemble designator 320 are now further described in reference to FIG. 7, which is a functional block diagram of designator 320. As shown in FIG. 7, designator 320 includes dimensionality determiner 710 that determines the number of co-processed host-signal components into which one or more watermark-signal values are to be embedded. Designator 320 also includes watermark-signal value determiner 720 that determines how many watermark-signal components to embed in such co-processed host-signal components, and the number of possible values of each co-processed watermark-signal component. Designator 320 further includes distribution determiner 730 that determines parameters governing the distribution of quantization values. Also included in designator 320 is ensemble generator 740 that generates an ensemble of quantizers capable of generating non-intersecting and uniquely mapped quantization values. Designator 320 further includes embedding value generator 750 that generates the non-intersecting and uniquely mapped quantization values determined by the quantizers generated by ensemble generator 740.

Dimensionality Determiner 710

Host-signal analyzer and block selector 310 provides to dimensionality determiner 710 an identification of host-signal embedding blocks 312. Dimensionality determiner 710 determines the number of co-processed host-signal components of blocks 312 into which one or more watermark-signal values are to be embedded. Such number is referred to herein as the dimension of the embedding process, shown with respect to the illustrated embodiment as dimension of embedding process 712. As noted, the number of dimensions may be any integer up to the number of host signal components in the host-signal embedding block. For convenience, the relative terms "low-dimensional" and "high-dimensional" will be used to refer to the co-processing of relatively small numbers of host signal components as contrasted with the co-processing of relatively large numbers of host signal components, respectively.

Dimensionality determiner 710 determines dimension 712 by considering any one or more of a variety of factors, including the amount of available memory in memory 230A or the speed of processor 205A. For example, a high-dimensional embedding process may require that greater amounts of information regarding the location of embedding values be stored in memory 230A than may be required with respect to a low-dimensional embedding process. Such greater memory resource usage may pertain, for example, if the locations of embedding values are stored in look-up tables, rather than, for example, being computed from formulas.

Moreover, if the embedding values are generated by the use of formulas rather than accessing the contents of look-up tables, the speed at which processor 205A is capable of calculating the locations in a high-dimensional embedding process may be slower than the speed at which it could calculate locations in a low-dimensional embedding process. Thus, the embedding process may not be acceptably quick if high-dimensional embedding is undertaken. In some embodiments, designator 320 may similarly take into account the available memory and processor speed in the information extracting computer system 110B, i.e., the capabilities of memory 230B and processor 205B. The availability of such resources may be relevant because extracting a watermark signal may require similar look-up tables consuming memory space, or make similar demands on processor speed with respect to the calculation of formulas.

However, a choice of a low-dimensional embedding process may impose similar strains on computer resources. For example, although the time required to calculate the locations of embedding values using a processor 205 of a particular speed may be greater for high-dimensional processing than for low-dimensional processing, such cost may be offset by other considerations. For instance, it may be faster to co-process two host-signal components together than to process them separately. It will be understood by those skilled in the relevant art that the balancing of such considerations may be influenced by the computer-system architecture, the processor architecture, the programming languages involved, and other factors. As another, non-limiting, example, it may be desirable to employ a high-dimensional embedding process to provide relatively less quantization-induced distortion as compared to a low-dimensional process using the same number of quantization values per dimension.

Multiple embedding may be a strategy for obtaining the advantages of both high-dimensional and low-dimensional embedding. A first embedding of a watermark signal may be done at a high dimension to generate a composite signal, and a second embedding of the same watermark signal may be done at a low dimension to generate a new composite signal that is then transmitted. The advantage is that, if the communication channel is not noisy, i.e., there is little channel-induced distortion (which may be determined, for example, by an error-detector), the extracting process may be done to extract the watermark signal embedded at low dimension. Otherwise, the watermark signal embedded at high dimension may be extracted. This use of multiple embedding thus generally is directed at a different purpose than multiple embedding of different watermark signals. In that case, the same host signal is used for embedding different watermark signals that may, but need not, be embedded at different dimensionalities. The former use of multiple embedding may be referred to as multiple embedding for reliability, and the latter as multiple embedding for transmitting different watermark signals. In some implementations, both purposes may be served, for example by multiple embedding of different watermark signals, some or each at different dimensionalities.

Watermark-Signal Value Determiner 720

In accordance with known techniques, operating system 220A provides watermark signal 102 to watermark-signal value determiner 720. As noted, watermark-signal value determiner 720 determines how many watermark-signal components to embed in the co-processed host-signal components. Such number is represented in FIG. 7 as number of possible watermark-signal values 722.

Figure 8A:
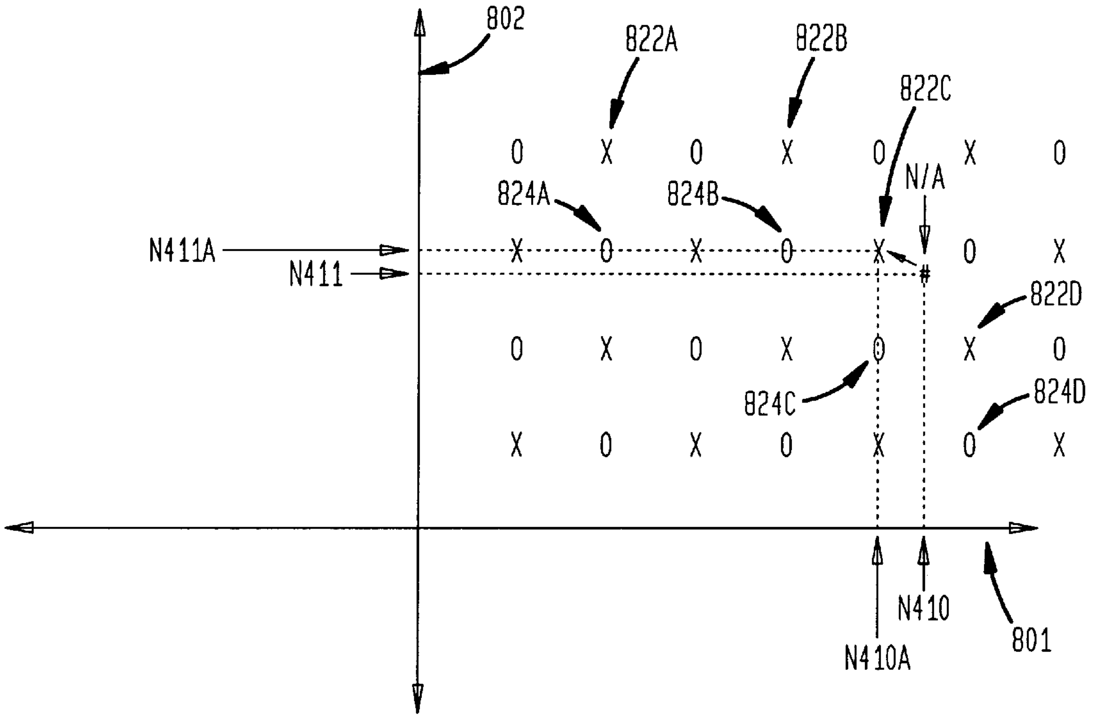
FIG. 8A is a graphical representation of one illustrative example of two-dimensional watermarking of an exemplary host signal with an exemplary watermark signal in accordance with the operations of one embodiment of a quantizer ensemble designator of the information embedder of FIG. 3A.

For example, in FIG. 8A it is determined that one watermark-signal component is to be embedded in the number of co-processed host-signal components determined by dimensionality determiner 710. For illustrative purposes, it is assumed that the watermark signal is watermark signal 102 of FIG. 4B, and that the host signal is host signal 101 of FIG. 4A. Thus, with respect to FIG. 8A, one bit is to be embedded in two pixels. In the alternative example of FIG. 8B, watermark-signal value determiner 720 determines that two watermark-signal components are to be embedded in two pixels. More generally, determiner 720 may determine that any one, or any combination of, watermark-signal components are to be co-processed. For example, with respect to FIG. 4B, bits 451 and 453 may be co-processed together, bits 452 and 454 may be co-processed together, and so on. As another example, bit 451 may be co-processed by itself, bit 452 may be processed by itself, bits 453 and 454 may be co-processed together, and so on.

The determination of the number of co-processed watermark-signal components may be based on a variety of factors. One factor is the amount of channel noise 104 that is anticipated. Generally, as the amount of anticipated noise increases, the number of watermark-signal components that may desirably be co-processed decreases. This relationship follows because the greater the number of co-processed watermark-signal components, the greater the number of quantizers, and thus the greater the number of quantization values, that are employed. For example, the co-processing of one bit employs two quantizers, two bits employs four quantizers, three bits employs eight quantizers, and so on. Thus, for a given average quantization-induced distortion, as the number of co-processed watermark-signal components increases, the distance between quantization values of different quantizers decreases.

This relationship may be seen by referring to FIGS. 5C (one co-processed bit). The distance between X and O quantization values is $\Delta/2$. However, if it were desired to add a Y quantizer, the distance between X and Y quantization values, or between O and Y quantization values, would necessarily be less than $\Delta/2$. Thus, for a fixed amount of channel noise 104, it is more likely that such noise will result in a decoding error. Therefore, if channel noise distortion is anticipated to be high, it is less desirable to co-process larger numbers of watermark-signal values.

Another factor in determining the number of co-processed watermark-signal components is the length of the watermark signal. As the number of bits in a watermark signal increases, for example, the desirability of increasing the number of co-processed watermark-signal components may increase. This relationship generally pertains because, for a given number of total host-signal components, the average number of watermark bits per host-signal component increases with the total number of watermark bits. Yet another factor is the dimensionality determined by dimensionality determiner 710. Generally, the larger the dimensionality, the larger the number of co-processed watermark-signal components that may be employed without increasing the likelihood of decoding error. This relationship pertains because, for the same minimum distance between quantization values of different quantizers, more quantizers can be employed if there are more dimensions.

In alternative embodiments, the number of watermark-signal components to embed in each co-processed group of host-signal components may be predetermined. Also in some embodiments, such number may be user-selected by employing any of a variety of known techniques such as a graphical user interface.

As also noted, watermark-signal value determiner 720 determines the number of possible values of each co-processed watermark-signal component. Such determination is made in accordance with any of a variety of known techniques, such as using a look-up table (not shown). For example, with respect to watermark signal 102 of FIG. 4B, it is assumed for illustrative purposes that there is stored in memory 230A a look-up table that includes both watermark signal 102 and an indicator that indicates that the components of such signal are binary values; i.e., that each such component may have two possible values: "0" and "1." Such indicator may be predetermined; that is, all watermark signals, or watermark signals of any predetermined group, may be indicated to be hexadecimal. In alternative embodiments, the number of possible watermark-signal values may be user-determined by employing any of a variety of known techniques such as a graphical user interface.

Distribution Determiner 730

Distribution determiner 730 determines distribution parameters 732 that govern the distribution of quantization values. Distribution parameters 732 may be contained in a table or any other known data structure. Distribution parameters 732 typically include the determined density of quantization values (i.e., how closely they are located to each other); a specifier of the shape of the quantization intervals; and other parameters. The shape of the quantization intervals may be a factor because quantization-induced distortion may vary depending on such shape. For example, in two-dimensional space, a hexagonal shape may be more desirable than a rectangular shape, assuming that the same number of quantization values occupy each such shape (i.e., the shapes have the same area). In particular, the average quantization-induced distortion is less for the hexagonal shape than for the rectangular shape because the average square distance to the center is less for a hexagon than for a rectangle of the same area.

One known technique for providing highly regularized shapes of quantization intervals is referred to as "trellis coded quantization," one description of which is provided in M. Marcellin and T. Fischer, "Trellis Coded Quantization of Memoryless and Gauss-Markov Sources," in *IEEE Transactions on Communications,* vol. 38, no. 1, January 1990, at pp. 82–93. As will be appreciated by those skilled in the relevant art, an advantage of applying trellis coded quantization is that this technique achieves efficient packing, facilitates computation of the ensemble of quantizers and of the embedding values, and facilitates computations involved in extracting the watermark signal from the composite signal.

Another known technique that is particularly well suited for use with dithered quantizers is commonly referred to as "lattice quantization," a description of which is provided in R. Zamir and M. Feder, "On Lattice Quantization Noise," in *IEEE Transactions on Information Theory*, vol. 42, no. 4, July 1996, at pp. 1152–1159. As is known by those skilled in the relevant art, a lattice quantizer is generated according to this technique by repeatedly and regularly translating a core group of quantization values arranged in a particular geometric shape. For example, the core group of quantization values could be arranged in a cube that is repeatedly and regularly translated in three dimensions to form the quantization values of the lattice quantizer. Higher dimensions may also be used. When dithered quantization is applied to this technique, advantageous computational effects may be realized. In addition, the quantization error may have advantageous perceptual properties. For example, the quantization error typically is independent of the host signal.

The density of quantization values may vary among the quantization values corresponding to a possible watermark-signal value. For example, the density may be high for some O quantization values corresponding to a "0" watermark-signal value and low for other O quantization values. Also, in embodiments in which dithered quantization is not employed, such density may vary between quantization values corresponding to one watermark-signal value and quantization values corresponding to another watermark-signal value. For example, the density may be high for O quantization values and low for X quantization values.

In reference to FIGS. 5C and 5D, it is assumed for illustrative purposes that distribution determiner 730 determines that the quantization values generated by the O quantizer are evenly spaced over real-number line 503. In contrast, with reference to FIG. 6A, it is determined that the quantization values generated by the O quantizer are unevenly spaced over real-number line 603. For example, quantization values 624A and 624B are more closely distributed with respect to each other than are quantization values 624B and 624C. Such uneven distribution may be advantageous, for example, if host-signal values are more likely to be concentrated in some areas of real-number line 603 than in other areas. In general, the distribution of larger numbers of quantization values in areas of higher concentration provides less distortion due to quantization than would be the case if the distribution had been more sparse.

It generally is advantageous, from the point of view of reducing quantization-induced distortion, to more densely distribute the quantization values irrespective of the anticipated relative concentration of host-signal values. Thus, from this perspective, even if the quantization values are to be evenly spaced (because host-signal values are not more likely to be concentrated in some areas), denser distribution is desirable. However, denser distribution of quantization values also generally increases the possibility that other noise sources, such as, for example, channel noise 104 of FIGS. 1 and 2, will result in an erroneous decoding of the watermark signal.

For example, with respect to FIG. 5D, channel noise 104 may result in received-composite-signal-with-noise 105 having a composite signal component that is distorted to a position on real-number line 503 that is closer to the X quantization value 522D than to the O quantization value 524D. In such a case, as described in greater detail below with respect to point decoder 930, the composite signal component generally is erroneously interpreted as representing the watermark-signal value represented by the X quantization values, even though the corresponding component of transmitted composite signal 103 had been quantized to an O quantization value. The likelihood of such an error occurring generally decreases as the X and O quantization values are more spread apart. As an illustrative example, it is assumed that $N_1$ is quantized to the O quantization value 524D (located at 3/4Δ) and that channel noise 104 results in the corresponding component of received signal 105 being displaced to the value 3/8Δ on real-number line 503 (i.e., a displacement of 3/8Δ to the left). Point decoder 930 may then erroneously decode such component as representing the embedding of the watermark-signal value corresponding to the X quantization values. Such error may occur because 3/8Δ is closer to quantization value 522C (located at Δ/4) than to quantization value 524D (located at 3/4Δ). If the X and O quantization values had been more spread apart, for instance at a distance Δ from each other, rather than Δ/2 as in FIG. 5D, then the same noise displacement of 3/8Δ to the left would not have resulted in an erroneous decoding since the value of the composite-signal component with noise would have remained closer to quantization value 524D than to quantization value 522C.

Thus, an additional factor that may be considered by distribution determiner 730 is the amount of expected channel noise 104, and, more particularly, its expected magnitude range and/or frequency of occurrence. Other factors that may be so considered include the total number of quantization values generated by all of the quantizers. A higher number of total quantization values generally provides that quantization-induced distortion will be decreased because the distance is likely to be less from the host-signal value(s) to the closest quantization value corresponding to the watermark-signal value to be embedded. Also, the bandwidth of communication channel 115, the instruction word architecture and other architectural aspects of computer system 110A, and the capacities of memory 230A, may be additional factors. The greater the total number of quantization values, the larger the size of the binary representations, for example, required to identify each quantization value. The length of such binary representation may exceed the allowed instruction word size. Also, the amount of space in memory 230A may not be sufficient to store the larger amounts of information related to the generation of larger numbers of quantization values. As the amount of such information to be transmitted over communication channel 115 increases, bandwidth limitations of the channel may require an increasing of the transmission time.

Combinations of such factors may also be considered by distribution determiner 730. For example, determiner 730 may determine distribution parameters 732 so that they specify quantizers that are capable of generating dithered quantization values selected in accordance with a balance between or among the maximum allowable watermark-induced distortion level, expected channel-induced distortion level, a desired intensity of a selected portion of the watermark signal in the host-signal embedding blocks, and/or other factors. For example, with respect to the maximum allowable watermark-induced distortion level, the possibility of decoding errors generally decreases as the distance between adjacent quantization values increases, as previously noted. However, the watermark-induced distortion increases as such distance increases. Therefore, such distance may be limited by the maximum distortion that is acceptable to a user, or that is predetermined to be a maximum allowable distortion. The factor of channel-induced distortion may be related to such determination, since it may be desirable to minimize the likelihood of decoding errors.

Super-rate quantization, described above, is one technique for minimizing the likelihood of decoding errors. In accordance with this technique, as noted with respect to the illustrative example of FIG. 6C, a first ensemble of super-groups of quantization values are provided for embedding a first value of a co-processed group of watermark-signal components. A second ensemble of super-groups of quantization values are provided for embedding a second value of the co-processed group of watermark-signal components. (More generally, an ensemble of super-groups of quantization values is provided for each possible value of the co-processed group of watermark-signal components.) Specific first and second super-groups of the ensembles of first and second super-groups are selected that are the closest of their respective ensembles to the value of the host-signal component in which the watermark-signal value is to be embedded, thereby reducing distortion. Also, by quantizing to those members of the specific first and second super-groups that are furthest from each other, reliability is increased.

The balance between minimizing decoding errors and increasing watermark-induced distortion typically varies depending upon the application. For example, it may be anticipated that channel noise 104 will be small or essentially non-existent. Such condition typically pertains, for instance, if communication channel 115 is a short length of fiber optic cable, as compared to a long-distance radio channel. As another non-limiting example, small or non-existent channel noise may be anticipated if composite signal 332 is to be stored directly (i.e., without the use of a lossy compression technique or other distortion-inducing signal processing) on a floppy disk and the communication channel consists simply of accessing such signal from the disk. Many other examples of direct signal processing will be evident to those skilled in the relevant art. Also, anticipated noise in a communication channel may effectively be nullified by application of any of a variety of known error-detection/correction techniques. In any such case of small anticipated channel noise, the distance between adjacent quantization values may be made small, thereby minimizing watermark-induced distortion while not providing a significant likelihood of erroneous decoding.

As noted, the desired intensity of a selected portion of the watermark signal in a host-signal embedding block may also be a factor in determining distribution parameters 732. In one application, for example, an embedding block may be present that contains essential information, without which the host signal is not recognizable, or otherwise useful for its intended purpose. Placing the watermark signal in such an embedding block may be desirable because deletion or other alteration of the watermark signal might require elimination of such essential host-signal information. Therefore, it may be desirable or necessary, in order to embed the watermark signal in such block, to increase the dimensionality of the embedding process.

As noted, the distribution of quantization values may occur in one, two, or other number of dimensions. In the illustrated embodiment, dimension 712 is thus provided by dimensionality determiner 710 to distribution determiner 730. As described below in relation to point coder 330, such distributions may occur in accordance with Euclidean, or non-Euclidean, geometries. In one alternative embodiment, the distribution of quantization values may be user-selectable by use of a graphical user interface or other known or to-be-developed technique.

Ensemble Generator 740

Employing distribution parameters 732, ensemble generator 740 generates an ensemble (two or more) of dithered quantizers, referred to as quantizer ensemble 742. Quantizer ensemble 742 includes a dithered quantizer for each possible value of a co-processed group of components of watermark signal 102. The number of such possible values, and thus the number of dithered quantizers, is provided to generator 740 by watermark-signal value determiner 720 (i.e., by providing number-of-possible-watermark-signal values 722). Each such dithered quantizer is capable of generating non-intersecting and uniquely mapped quantization values.

As noted, a dithered quantizer is a type of embedding generator. In alternative embodiments, ensemble generator 740 may generate embedding generators that are not dithered quantizers. Each of such quantizers may be a list, description, table, formula, function, other generator or descriptor that generates or describes quantization values, or any combination thereof.

For example, with respect to FIG. 5D, it is assumed for illustrative purposes that distribution parameters 732 specify that the O and X quantization values are both to be regularly and evenly spaced. The O quantizer may thus be a list of locations on real-number line 503 at which the O quantization values are to be situated (e.g., $3/4\Delta$; $7/4\Delta$; and so on). The entries in such list may be calculated, predetermined, user-selected, or any combination thereof. Also, the Oquantizer, according to the illustrative example, may be a formula specifying that each O quantization value is located at a distance $\Delta/4$ to the left of integer multiples of $\Delta$. By way of further illustration, the X quantizer may be a formula that specifies that the X quantization values are calculated by adding a value ($\Delta/2$ in the example of FIG. 5D) to each of the O quantization values.

Embedding Value Generator 750

Embedding value generator 750 generates the quantization values 324 determined by the quantizers of quantizer ensemble 742. Quantization values 324 are non-intersecting and uniquely mapped. Embedding value generator 750 may, but need not, employ all of such quantizers. For example, if the possible number of watermark signal values is three (e.g., "0," "1," and "2"), and the watermark signal to be embedded includes only the values "0" and "1," then only the dithered quantizers corresponding to values "0" and "1" typically need be employed by embedding value generator 750.

Embedding value generator 750 may employ any of a variety of known or to-be-developed techniques for generating quantization values as specified by the quantizers of quantizer ensemble 742. For example, if the quantizers of quantizer ensemble 742 are, for example, lists, then generating quantization values is accomplished by accessing the list entries, i.e., the locations of the quantization values. As another example, if the quantizers of quantizer ensemble 742 include a formula, then generating quantization values is accomplished by calculating the location results specified by the formula. Quantization values 324 are provided by embedding value generator 750 to point coder 330.

Point Coder 330

Point coder 330 embeds watermark-signal components into one or more host-signal components. Such embedding is done in the illustrated embodiment by changing the host-signal values of such host-signal components to the closest dithered quantization value. More generally, i.e. in alternative embodiments that do not exclusively employ dithered quantizers, point coder 330 may change the host-signal values to embedding values that are not dithered quantization values.

In the exemplary illustrations of FIGS. 5C, 5D, 6A, and 6B, a Euclidean geometry is represented. Thus, the measure of how close one value is to another (i.e., the distance or distortion between the values) may be measured by the square root of the sums of squares of differences in coordinates in an orthogonal coordinate system. Other measures may also be used in a Euclidean geometry. For example, in an alternative embodiment, a weighted distance may be employed. That is, a distance along one coordinate, or in one dimension, may be weighted differently than a distance along another coordinate or in another dimension. Also, non-Euclidean geometries may be used in alternative embodiments. For example, distance may be measured by third, fourth, or other powers, rather than by squares. Thus, in such alternative embodiments, a quantization interval with respect to a quantization value Q may be defined as the set of all points that are closer (as measured by such alternative geometry) to quantization value Q than they are to other quantization values generated by the same quantizer that generated quantization value Q. In some such embodiments, quantization intervals need not be contiguous regions.

Figure 8B:
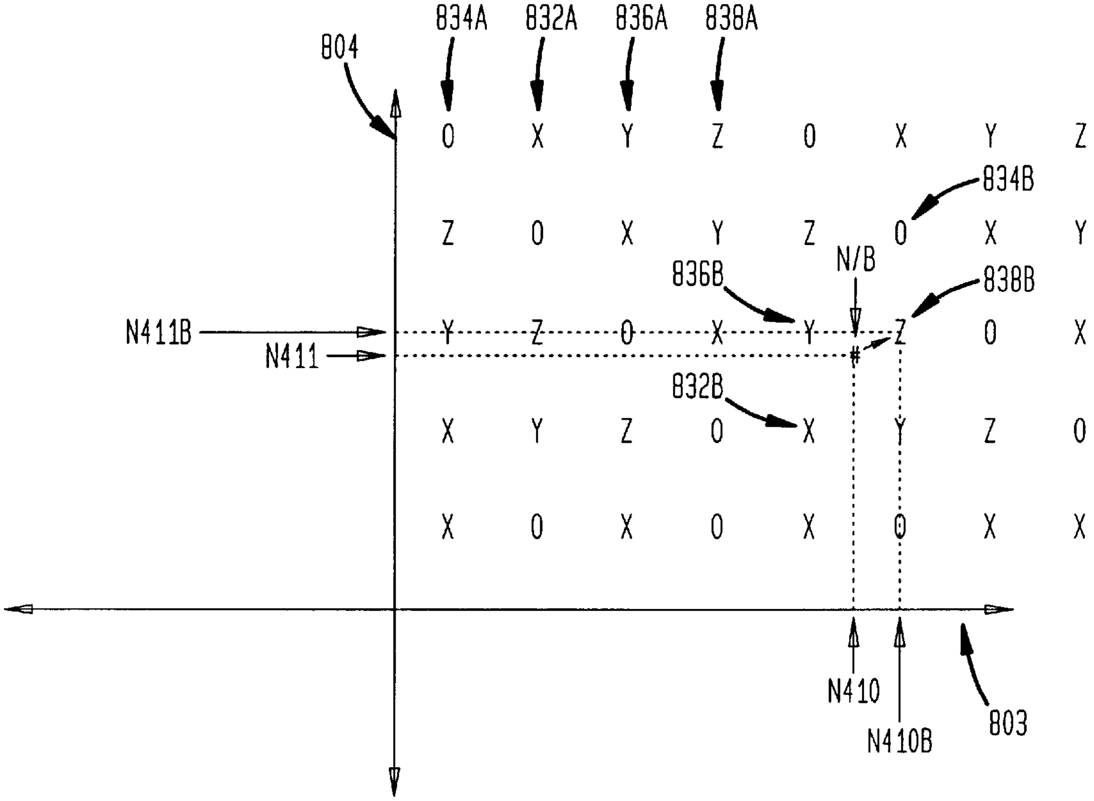
FIG. 8B is a graphical representation of another illustrative example of two-dimensional watermarking of an exemplary host signal with an exemplary watermark signal in accordance with the operations of one embodiment of a quantizer ensemble designator of the information embedder of FIG. 3A.

The operations of point coder 330 are now further described with reference to FIGS. 8A and 8B. FIG. 8A is a graphical representation of one illustrative example of a two-dimensional embedding process in which one bit of watermark signal 102 of FIG. 4B is embedded in two pixels, pixels 410 and 411, of host signal 101 of FIG. 4A. FIG. 8B is a graphical representation of another illustrative example of a two-dimensional embedding process in which two bits of watermark signal 102 of FIG. 4B are embedded in pixels 410 and 411. More generally, in both FIGS. 8A and 8B, a watermark-signal value is embedded in two host-signal values. The illustrative example of FIG. 8A is an extension to two dimensions of the one-dimensional dithered quantizer, the implementation of which is described above with reference to FIGS. 5C and 5D. That is, it is assumed for illustrative purposes that dimension 712 determined by dimensionality determiner 710 is two. FIG. 8B shows quantization values generated by an embedding generator that is not a dithered quantizer, as the distribution of Y quantization values is not related by a constant offset from the O quantization values, for example.

With reference to FIG. 8A, it is assumed for illustrative purposes that the one bit of watermark signal 102 that is to be embedded in pixels 410 and 411 is the low bit; i.e., bit 458 of FIG. 4B. Thus, the number of co-processed watermark-signal components is one (one bit) and number-of-possible-watermark-signal values 722 determined by watermark-signal value determiner 720 is two (illustratively, "0" and "1").

It is assumed for illustrative purposes that distribution determiner 730 determines distribution parameters 732 such that the quantization values for the two possible watermark-signal values are regularly and evenly distributed in both dimensions. In alternative embodiments, one or both of such sets of quantization values may be regularly and evenly distributed in one dimension, but neither regularly nor evenly distributed in the other dimension, or any combination thereof. It is assumed, as in the previous examples, that the values "0" and "1" correspond respectively with O quantization values generated by an O dithered quantizer and X quantization values generated by an X dithered quantizer. The O and X quantizers, each corresponding to one possible watermark-signal value of the co-processed group of watermark-signal components, thus constitute quantizer ensemble 742 in this illustrative example. Embedding value generator 750 accordingly generates quantization values 324 that are shown in FIG. 8A by the symbols "O" and "X."

Representative X quantization values are labeled 822A–D, and representative O quantization values are labeled 824A–D in FIG. 8A. It is assumed that the host-signal value corresponding to one of the co-processed host-signal components is represented by a point on real-number line 801, and that the host-signal value corresponding to the other co-processed host-signal component is represented by a point on real-number line 802. In particular, it is illustratively assumed that real number N410 on line 801 is the grey-scale value of pixel 410, and that real number N411 on line 802 is the grey-scale value of pixel 411. The point in the two-dimensional space defined by real-number lines 801 and 802 (which are illustratively assumed to be orthogonal, but it need not be so) thus represents the grey-scale values of pixels 410 and 411. This point is represented by the symbol "#" in FIG. 8A, and is referred to as real number pair NA.

Point coder 330, which is assumed to be a dithered quantizer in the illustrated embodiment, embeds bit 458 into pixels 410 and 411. Such embedding is accomplished essentially in the same manner as described above with respect to the one-dimensional embedding of FIGS. 5C, 5D, and 6A, except that a two-dimensional embedding process is illustrated in FIG. 8A. That is, a dither value is added or subtracted from the value of NA before quantization (thus moving NA to the right or left, respectively, with respect to real-number line 801, and moving NA up or down, respectively, with respect to real-number line 802). The dither value need not be the same in each dimension. In FIG. 8A, for example, X quantization value 822C is shown to be offset from O quantization value 824C by a distance in reference to real number line 802, but is not offset with respect to real number line 801.

Alternatively stated, the two-dimensional quantization interval in which NA is located (the "NA two-dimensional interval") is shifted by the dither value, but in the two-dimensional direction opposite to that in which NA may be shifted. That is, a shift of NA to the right and up is equivalent to a shift of the NA interval to the left and down, and vice versa. As noted with respect to the embodiment illustrated in FIGS. 5C and 5D, the dither value is the real-number value that will result in an interval boundary nearest to NA being located at a midpoint between two quantization values generated by the dithered quantizer that corresponds to the watermark-signal value that is to be embedded. For clarity, the interval boundaries are not shown in FIG. 8A.

The value of bit 458 of the illustrative watermark signal 102 is "1." Thus, NA is to be mapped to the closest quantization value generated by the X quantizer; that is, in the illustrative example, to the closest of the "X" symbols in the two-dimensional space defined by real-number lines 801 and 802. As noted, point coder 330 may employ any of a variety of known measures of distance in determining which is the closest of the X quantization values. For example, such measures may be in reference to a Euclidean geometry, a weighted Euclidean geometry, or a non-Euclidean geometry. In the illustrative example of FIG. 8A, such closest value to NA generated by the X quantizer is quantization value 822C. Therefore, NA is mapped to quantization value 822C. That is, the grey-scale value of pixel 410 is changed from the real number N410 to the real number N410A. Similarly, the grey-scale value of pixel 411 is changed from the real number N411 to the real number N411A. The watermark-induced distortion is thus represented by the two-dimensional distance from NA to quantization value 822C.

FIG. 8B, as noted, illustrates one embodiment of a two-dimensional embedding process in which two bits of watermark signal 102 of FIG. 4B are embedded in pixels 410 and 411. Thus, the number of co-processed watermark-signal components is two (two bits) and number-of-possible-watermark-signal values 722 determined by watermark-signal value determiner 720 is four (illustratively, "00," "01," "10," and "11"). In the illustrative example, distribution determiner 730 determines distribution parameters 732 such that the quantization values for the four possible watermark-signal values are not regularly or evenly distributed in both dimensions, although it need not be so in alternative examples. In alternative embodiments, one or more of such sets of quantization values may be regularly and evenly distributed in one dimension, but neither regularly nor evenly distributed in the other dimension, or any combination thereof.

It is illustratively assumed that the values "00," "01," "10," and "11" correspond respectively with O quantization values generated by an O dithered quantizer, X quantization values generated by an X dithered quantizer, Y quantization values generated by a Y dithered quantizer and Z quantization values generated by a Z dithered quantizer. The O, X, Y, and Z quantizers, each corresponding to one possible watermark-signal value of the co-processed group of watermark-signal components, thus constitute quantizer ensemble 742 in this illustrative example.

Embedding value generator 750 accordingly generates quantization values 324 that are shown in FIG. 8B by the symbols "O," "X," "Y," and "Z," representative examples of which are respectively labeled 834A–B, 832A–B, 836A–B, and 838A–B. It is illustratively assumed that real number N410 on real-number line 803 is the grey-scale value of pixel 410, and that real number N411 on real-number line 804 is the grey-scale value of pixel 411. The point in the two-dimensional space defined by real-number lines 803 and 804 (which are illustratively assumed to be orthogonal, but it need not be so) thus represents the grey-scale values of pixels 410 and 411. This point is represented by the symbol "#" in FIG. 8B, and is referred to as real number pair NB.

Point coder 330 embeds two bits into pixels 410 and 411 essentially in the same manner as described above with respect to the embedding of one bit as shown in FIG. 8A. It is assumed for illustrative purposes that the two bits to be embedded are bits 457 and 458 of watermark signal 102 of FIG. 4B. The value of bits 457 and 458 is "11." Thus, NA is to be mapped to the closest quantization value generated by the Z quantizer; that is, in the illustrative example, to the closest of the "Z" symbols in the two-dimensional space defined by real-number lines 803 and 804. Therefore, NB is mapped to quantization value 838B. That is, the grey-scale value of pixel 410 is changed from the real number N410 to the real number N410B. Similarly, the grey-scale value of pixel 410 is changed from the real number N411 to the real number N411B. The watermark-induced distortion is thus represented by the two-dimensional distance from NB to quantization value 838B.

Point coder 330 may similarly embed any number of watermark-signal components in any number of host-signal components using high-dimensional quantizers. In addition, any number of watermark-signal components may be embedded in any number of host-signal components using a sequence of low-dimensional quantizers. For example, one bit may be embedded in 10 pixels using 10, one-dimensional, quantizers. To accomplish such embedding in an illustrative example of dithered quantization, ensemble generator 740 identifies 10 dither values corresponding to the possible "0" value of the bit. Similarly, ensemble generator 740 identifies 10 dither values corresponding to the possible "1" value of the bit. At least one of the dither values of the "0" dither set is different than the corresponding dither value of the "1" dither set. To embed, for example, a watermark-signal component having a value of "0," point coder 330 applies the first dither value of the "0" dither set to the first pixel, the second dither value of the "0" dither set to the second pixel, and so on. Similarly, to embed a watermark-signal component having a value of "1," point coder 330 applies the first dither value of the "1" dither set to the first pixel, the second dither value of the "1" dither set to the second pixel, and so on.

In the illustrated examples, the operations of point coder 330 were described in relation to the embedding of watermark-signal components in one group of co-processed host-signal components. Typically, such operations would also be conducted with respect to other groups of co-processed host-signal components. For example, with respect to watermark signal 102 of FIG. 4B, co-processed bits 457 and 458 may be embedded as described with respect to FIGS. 8A or 8B, co-processed bits 455 and 456 may be so embedded, and so on. Generally, therefore, point coder 330 operates upon one or more groups of co-processed host-signal components, and such operation may be sequential, parallel, or both. Also, the determinations made by determiners 710, 720, and 730 may vary with respect to each group of co-processed host-signal components. For example, dimension 712 may be two for one such group and five for another such group. The number of co-processed watermark-signal components may vary from group to group, and thus number 722 may so vary. Also, the distribution parameters 732 applied to each such group may vary, and thus the quantizers employed with respect to each such group may vary.

Typically, point coder 330 operates upon all co-processed host-signal components; i.e., the entire watermark signal is embedded in one or more selected embedding blocks of the host signal. A host signal so embedded with a watermark signal is referred to herein as a composite signal. Thus, point coder 330 of the illustrated embodiment generates composite signal 332, as shown in FIG. 3A. Typically, the composite signal is provided to a transmitter for transmission over a communication channel. Thus, composite signal 332 of the illustrated embodiment is provided to transmitter 120, and transmitted composite signal 103 is transmitted over communication channel 115, as shown in FIG. 2. However, in alternative embodiments, composite signal 332 need not be so provided to a transmitter. For example, composite signal 332 may be stored in memory 230A for future use.

In addition, multiple-embedding may be implemented in some embodiments by providing that embedder 201 embeds a watermark signal into composite signal 332. This option is indicated by line 372 of FIG. 3A and will be understood to be implicit in FIGS. 3B–3G. In those embodiments in which this option is implemented, composite signal 332 is operated upon by host-signal analyzer and block selector 310 in the same manner as selector 310 is described above as operating upon host signal 101A. This process may be repeated for as many iterations as desired; that is, embedder 201 may embed watermark signal 102A (or any other watermark signal or signals) into a composite signal 332 that it generated as the result of a previous iteration, and this process may be repeated any number of times.

Moreover, the operations of any functional element of embedder 201 may differ among iterations. For example, during a first iteration, block selector 310 may select block 312A for embedding, in a second iteration select block 312C, and in a subsequent iteration again select block 312A. As another example, dimensionality determiner 710 may determine in one iteration that two watermark-signal components are to be embedded in two host-signal components, and determine that two watermark-signal components are to be embedded in five host-signal components in another iteration. Similarly, watermark-signal value determiner 720 may determine that two watermark-signal components are to embedded in two co-processed host-signal components in one iteration, and that ten watermark-signal components are to embedded in two co-processed host-signal components in another iteration. Also, determiner 720 may vary for any iteration the number of possible values of each co-processed watermark-signal component.

A reason to thus vary the operations of embedder 201 from one iteration to the next, even if the same watermark signal is employed in each iteration, is that each combination of operational parameters of embedder 201 generally provides distinct advantages and disadvantages, some of which are noted above. For example, a selection of high dimensionality in one iteration may provide relatively less quantization-induced distortion as compared to a low-dimensional process using the same number of quantization values per dimension. However, a selection of low dimensionality in another iteration may enable information extracting computer system 110B to extract a watermark more quickly than is possible with respect to the same watermark embedded at a higher-dimension. Thus, by employing multiple embedding, computer system 110B may selectively operate upon one or the other of the instances of multiple embedding of the watermark, depending on the need for low distortion versus more rapid execution.

Similarly, extracting computer system 110B may select a low-dimensionality instance of the embedding of a watermark signal if channel noise 104 is relatively low, and a high-dimensionality instance if channel noise 104 is relatively high. The reason is that a higher density of information generally may be sent in the low-dimensionality instance than in the higher, but at the cost of greater susceptibility to channel noise 104. Extracting computer system 110B may thus select the instance that best fits the conditions of communication channel 115 at a particular time. One application in which such considerations may pertain is the transmission of watermarked images over a network, such as the Internet, where it may not be known a priori how many times the image has been replicated or transmitted, and to what extent it has been affected by noise from various sources. It will be understood that these examples are merely illustrative, and that many other advantages may be obtained by multiple embedding of the same, or different, watermarks under various embedding conditions.

Information Extractor 202

FIG. 9 is a functional block diagram of information extractor 202 of FIG. 2. In the illustrated embodiment, information extractor 202 receives from receiver 125 (via an input device of input-output devices 260B and operating system 220B) post-receiver signal 105A. As shown in FIG. 9, information extractor 202 includes synchronizer 910 that synchronizes signal 105A so that the location of particular portions of such signal, corresponding to portions of transmitted composite signal 103, may be determined. Information extractor 202 also includes ensemble replicator 920 that replicates the ensemble of embedding generators and embedding values that information embedder 201 generated. As noted, such replication may be accomplished in one embodiment by examining a portion of the received signal. In alternative embodiments, the information contained in the quantizer specifier may be available a priori to information extractor 202. The replicated embedding generators of the illustrated embodiment are dithered quantizers, and the embedding values are dithered quantization values. Information extractor 202 further includes point decoder 930 that, for each co-processed group of components of the watermark signal, determines the closest dithered quantization value to selected values of the host signal, thereby reconstructing the watermark signal.

Synchronizer 910

Synchronizer 910 of the illustrated embodiment may be any of a variety of known devices for synchronizing transmitted and corresponding received signals. In particular, synchronizer 910 provides that components of post-receiver signal 105A may be identified and associated with components of composite signal 332. For example, in the illustrated embodiment in which watermark signal 102 is embedded in embedding block 312C, including pixels 410 and 411, synchronizer 910 provides that the beginning of embedding block 312C may accurately be identified.

One known group of techniques that may usefully be applied by synchronizer 910 in some embodiments, particularly with respect to host signals that are images, is referred to as "edge alignment." As is known by those skilled in the relevant art, various types of edge-detection algorithms may be employed to detect the edge of an image in a received composite signal. These algorithms typically involve statistical, or other, techniques for filtering or segmenting information.

Having detected an edge, synchronizer 910 may further process the received image in accordance with known means to realign it vertically and horizontally, reproportion it, and/or resample it so that the received composite signal more closely resembles the transmitted composite signal. For convenience, synchronizer 910 is thus said to include, in some embodiments, one or more elements for "registering" the transmitted composite signal. (Although the term "registering" is sometimes used specifically with respect to images, it is used in a broad sense herein to apply to all types of signals.) For example, a host signal consisting of an original photographic image is illustratively assumed that has dimensions of 512 pixels by 512 pixels, into which a watermark signal is embedded. In transmission, the image may have been rotated so that its vertical and horizontal alignments are altered. Sampling may also have occurred in transmission. For instance, the transmission channel may include the scanning of the composite image generated by embedder 201 so that the scanned image has a resolution of 1000 pixels by 800 pixels. Advantageously, any of a variety of known, or to-be-developed, resampling techniques may be employed by synchronizer 910 to correct the rotation, reproportioning, and/or change in resolution introduced by the transmission channel. For example, synchronizer 910 may employ a resampling technique using interpolation kernels in accordance with known means.

Also, any of a variety of known error-detection algorithms may be used to assist in the registering of the received composite signal by rotation, translation, re-scaling, and so on. That is, error-detection code may be included in the watermark signal for embedding in the host signal. When the error-detection code, along with the rest of the watermark signal, is extracted from the composite signal, it may be examined to determine if there has been an error. If an error has occurred, then the composite signal may be re-processed by synchronizer 910 using different parameters for the registering operations. For example, if an error occurs when the received composite signal has been rotated by ten degrees, synchronizer 910 may apply a twenty-degree rotation. This process may be iterative, with any desired degree of resolution, until extraction of the error-detection code indicates that an error has not occurred.

In some implementations, application of various transformations by pre-processor 109 may augment, or render unnecessary, these correcting processes employed by synchronizer 910. For example, for reasons known to those skilled in the relevant art, application of a Fourier-Mellin transform to pre-process a host-signal image typically reduces or eliminates the need to attempt corrections due to rotation or scaling (i.e., proportional shrinking or stretching of an image). Thus, the Fourier-Mellin transform is said to provide rotational and scaling invariance. Application of a Radon transformation also typically reduces or eliminates the need to attempt corrections due to rotation or scaling. Also, these and other transformations may be applied in combination to provide additional advantages, such as translation (movement of the image in the image space) invariance. For example, a Radon transformation, which, as noted, provides rotation and scaling invariance, may be combined with a Fourier transform to provide translation invariance. As is also known to those skilled in the relevant art, the combination of a Fourier-Mellin transform with a Fourier transform also provides translation invariance.

In one known implementation, a synchronization code is added by transmitter 120, or by information embedding computer system 110A, to composite signal 332. Such code includes, for example, special patterns that identify the start, alignment, and/or orientation of composite signal 332 and the start, alignment, and/or orientation of embedding blocks within composite signal 332. In accordance with any of a variety of known techniques, synchronizer 910 finds the synchronization codes and thus determines the start, alignment, and/or orientation of embedding blocks. Thus, for example, if a portion of transmitted composite signal 103 is lost or distorted in transmission, synchronizer 910 may nonetheless identify the start of embedding block 312C (unless, typically, the transmission of such block is also lost or distorted). Synchronizer 910 similarly identifies other portions of post-receiver signal 105A, such as the quantizer specifier described below.

A particular type of synchronization code is referred to herein as a "training sequence." A training sequence is inserted by transmitter 120 or computer system 110A into predetermined locations in composite signal 332, such as the beginning of the signal, or at a location in which it is masked. A training sequence may include any predetermined data in a predetermined sequence. Synchronizer 910 may employ a training sequence not only to determine the start of embedding blocks, but also to facilitate the operations of registering the composite signal, as described above. For example, by comparing the received training sequence with the predetermined training sequence, synchronizer 910 may determine that the received training sequence has been reproportioned, re-scaled, rotated, and/or translated. This information may then advantageously be applied by synchronizer 910 to register the received signal as a whole; i.e., to compensate for the types and extents of changes observed with respect to the training sequence. Synchronizer 910 thus operates upon post-receiver signal 105A to generate synchronized composite signal 912.

Ensemble Replicator 920

As noted, ensemble replicator 920 replicates the ensemble of dithered quantizers and dithered quantization values that information embedder 201 generated. In one embodiment, replicator 920 may perform this function by examining a portion of received signal 105A that is referred to for convenience as the "quantizer specifier" (not shown). The quantizer specifier typically includes information related to dimension 712 applied by dimensionality determiner 710 to each group of co-processed host-signal components, and to distribution parameters 732 determined by distribution determiner 730 with respect to each group of co-processed host-signal components. For example, the quantizer specifier may include the information that, for each group of co-processed host-signal components: dimension 712 is "2"; two dithered quantizers are employed; the dither value is $\Delta/4$; and so on, such that the distribution of dithered quantization values shown in FIG. 5D are described.

Alternatively, memory 230B may include a look-up table (not shown) in which various distributions of dithered quantization values are correlated with an index number. For example, the distribution shown in FIG. 5D may be correlated with a value "1" of the index number, the distribution shown in FIG. 8A may be correlated with a value "2," and so on. In such alternative implementation, the quantizer specifier may include such index value.

In yet another implementation, there need not be a transmitted quantizer specifier. Rather, a default, or standard, description of the distribution of quantization values may be stored in accordance with known techniques in memory 230A to be accessed by ensemble designator 320, and stored in memory 230B to be accessed by replicator 920. For example, a single standard distribution of quantization values may be employed both by information embedder 201 and information extractor 202. That is, for example, it is predetermined that the dimensionality is always "2," the delta value is always $\Delta/4$; and so on. Also, a set of such standard distributions may be used, depending on the characteristics of the host signal; for example, a standard distribution S1 is used for black and white images and standard distribution S2 for color images, a standard distribution S3 is used for images greater than a predetermined size, and so on. Other factors not related to the characteristics of the host signal may also be used, for example, the date, time of day, or any other factor that may be independently ascertainable both by computer system 110A and by computer system 110B may be used. Thus, standard distribution S4 may be used on Mondays, S5 on Tuesdays, and so on.

In accordance with any of such techniques for replicating the quantizer ensemble, replicator 930 generates replicated quantization values 922. Replicator 930 provides values 922 to point decoder 930 for decoding each watermark-signal component embedded in each co-processed group of host-signal components.

Point Decoder 930

Figure 10:
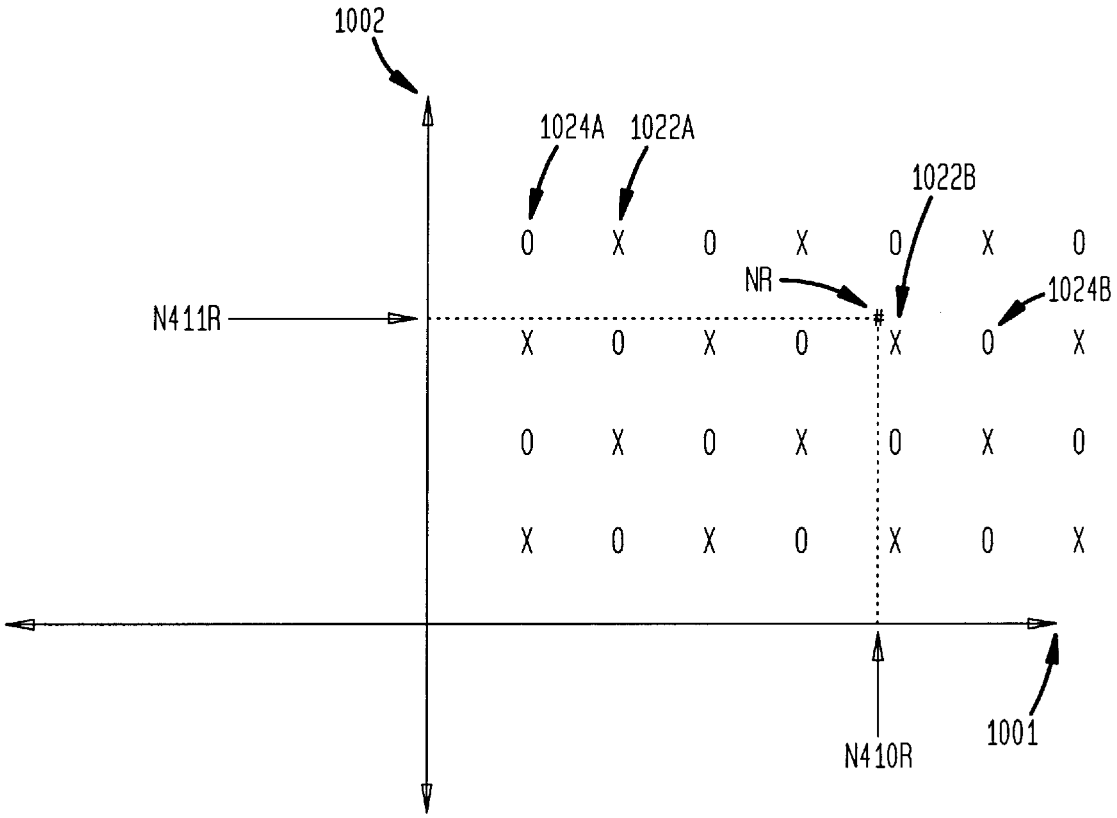
FIG. 10 is a graphical representation of one illustrative example of two-dimensional extracting of an exemplary watermark signal from an exemplary host signal in accordance with the operations of one embodiment of a point decoder of the information extractor of FIG. 9.

FIG. 10 is a graphical representation of one illustrative example of two-dimensional extracting of an exemplary watermark signal from an exemplary host signal in accordance with the operations of point decoder 930. In particular, FIG. 10 shows replicated quantization values 922, and a component of post-receiver signal 105A, corresponding to the quantization values and host-signal component illustrated in FIG. 8A. A representative portion of replicated quantization values 922 are shown by the symbols "0" and "X" in FIG. 10 and are generally and collectively referred to as quantization values 1024 and 1022, respectively. Representative of such quantization values are quantization values 1024A–B and 1022 A–B, respectively. Quantization values 1024 and 1022 thus correspond, in this illustrative example, to quantization values 824 and 822, respectively, of FIG. 8.

It is further assumed for illustrative purposes that real numbers N410R and N411R of FIG. 10 represent the grey-scale values of the two received-composite-signal-with-noise components corresponding to the host-signal components in which the watermark-signal component of FIG. 8A was embedded. That is, N410R on real-number line 1001 represents the grey-scale value of pixel 410 as received in post-receiver signal 105A, and N411R on real-number line 1002 represents the grey-scale value of pixel 411 as received in signal 105A. As noted with respect to FIG. 8A, the watermark-signal embedded in pixels 410 and 411 is the value of bit 458 of watermark signal 102. Such value is "1," which, in the illustrated example, corresponds to the X quantization values. Thus, the grey-scale values of pixels 410 and 411 are changed to the values N410A and N411A as shown in FIG. 8A. If there is no channel noise 104, then the received grey-scale values of pixels 410 and 411 is the same as the values N410A and N411A. However, it is assumed for illustrative purposes in FIG. 10 that there is channel noise 104. Thus, it is illustratively assumed, the grey-scale values of pixels 410 and 411 as received in signal 105A are distorted due to such noise. The grey-scale values N410R and N411R of FIG. 10, collectively represented in two-dimensional space by the point labeled NR, illustratively represent such distorted grey-scale values of pixels 410 and 411, respectively.

Point decoder 930 determines the closest of quantization values 1024 and 1022 to the point NR. Such determination of proximity may vary depending, for example, an the types of noise most likely to be encountered. For example, the determination may be based on the probability distribution of the noise. As described above, such determination of proximity may also vary depending, for example, on the type of geometry employed which may be specified in the quantizer specifier described with respect to replicator 920, may be a default type, or may otherwise be determined. Furthermore, the determination of closeness need not be the same as that used with respect to the operations of information embedder 201.

Various known, or later-to-be-developed, techniques and approaches may be used to determine closeness. For example, in addition to employing any known minimum-distance technique, other applicable known techniques include minimum-probability-of-error and maximum a posteriori techniques. In some embodiments, point decoder 930 includes any one or more of a variety of known error-detection elements. These elements may be employed to determine which of these, or other, techniques for determining closeness is most effective as measured by reliability in avoiding errors. For example, if one such technique is used and an error is detected, then another technique may be attempted, and so on, and the technique that results in the fewest errors may be adopted for the remainder of the operation of point decoder 930.

In the illustrative example of FIG. 10, the closest quantization value to point NR is X quantization value 1022B. Point decoder 930 therefore determines that the watermark-signal value embedded in pixels 410 and 411 is the value corresponding to the X quantization values 1022, which is the value "1." Point decoder similarly typically processes each other group of co-processed host-signal components as received in signal 105A. Thus, the values of all embedded watermark-signal components are extracted from signal 105A. Such extracted watermark values are represented in FIGS. 1, 2, and 9 as reconstructed watermark signal 106.

As noted above with respect to FIG. 6C and the implementation of super-rate quantization, point decoder 930 optionally includes means for predicting the value of a composite-signal component based on a sequence or collection of other composite-signal components. For convenience, these means are referred to as "statistical predicting means," but this term is intended to be understood broadly to include any known, or later-to-be-developed, technique for analyzing, characterizing, simulating, modeling, or otherwise processing sequences or collections in order to make this prediction, whether or not statistical in whole or in part.

Having now described one embodiment of the present invention, it should be apparent to those skilled in the relevant art that the foregoing is illustrative only and not limiting, having been presented by way of example only. Many other schemes for distributing functions among the various functional modules of the illustrated embodiment are possible in accordance with the present invention. The functions of any module may be carried out in various ways in alternative embodiments. In particular, but without limitation, numerous variations are contemplated in accordance with the present invention with respect to identifying host-signal embedding blocks, determining dimensionality, determining distribution parameters, synchronizing a received composite signal, and replicating quantization values.

In addition, it will be understood by those skilled in the relevant art that control and data flows between and among functional modules of the invention and various data structures (such as, for example, data structures 712, 722, 732, and 742) may vary in many ways from the control and data flows described above. More particularly, intermediary functional modules (not shown) may direct control or data flows; the functions of various modules may be combined, divided, or otherwise rearranged to allow parallel processing or for other reasons; intermediate data structures may be used; various data structures may be combined; the sequencing of functions or portions of functions generally may be altered; and so on. Numerous other embodiments, and modifications thereof, are contemplated as falling within the scope of the present invention as defined by appended claims and equivalents thereto.

What is claimed is:

1. A system that watermarks a host signal with a watermark signal, the watermark signal comprising watermark-signal components, each having one of a plurality of watermark-signal values, and the host signal comprising host-signal components, each having one of a plurality of host-signal values, the system comprising:

a pre-processor that operates on one or more primary-signal components of at least one primary signal to generate one or more transformed host-signal components and one or more transformed watermark-signal components;

an ensemble designator that designates a plurality of embedding generators, each corresponding to a single watermark-signal value of a co-processed group of one or more transformed watermark-signal components;

an embedding value generator that generates, by each embedding generator, a plurality of embedding values, the total of each plurality of embedding values comprising a first embedding-value set, wherein at least one embedding value generated by a first embedding generator is not the same as any embedding value generated by a second embedding generator; and a point coder that sets at least one host-signal value of one or more selected transformed host-signal components to a first embedding value of a third embedding generator, thereby forming a composite-signal value, wherein the third embedding generator corresponds to a first watermark-signal value of the group of co-processed transformed watermark-signal components, and wherein the first embedding value is selected based at least in part on its proximity to the at least one host-signal value, and wherein at least one embedding interval of one embedding generator is not the same as any embedding interval of at least one other embedding generator.

2. The system of claim 1, wherein:

the pre-processor comprises a first format transformer that transforms at least a first of the primary-signal components to a first format, thereby generating at least a first transformed host-signal component, and a second format transformer that transforms at least a second of the primary-signal components to a second format, thereby generating at least a first transformed watermark-signal component.

3. The system of claim 2, wherein:

the at least one primary signal is an audio signal, and the first and second formats are audio formats.

4. The system of claim 3, wherein:

at least one of the first and second formats is a digital audio format.

5. The system of claim 4, wherein:

one of the first and second formats is an analog audio format.

6. The system of claim 2, wherein:

the at least one primary signal is a television video signal, and the first and second formats are television video formats.

7. The system of claim 6, wherein:

at least one of the first and second formats is a digital television video format.

8. The system of claim 7, wherein:

one of the first and second formats is an analog television video format.

9. The system of claim 2, wherein:

one of the at least one primary signals is a supplemental paging signal;

the second of the primary-signal components is a component of the supplemental paging signal, and the second form at is a paging format.

10. The system of claim 9, wherein:

the second format is a digital paging format.

11. The system of claim 9, wherein:

the second format is an analog paging format.

12. The system of claim 2, wherein:

the first format transformer comprises an encrypter.

13. The system of claim 2, wherein:

the second format transformer comprises an encrypter.

14. The system of claim 2, wherein:

the second format transformer comprises an error-correction encoder.

15. The system of claim 2, wherein:

the second format transformer comprises an error-detection encoder.

16. The system of claim 2, wherein:

the second format transformer comprises an interleaver.

17. The system of claim 1, wherein:

the pre-processor comprises a first format transformer that transforms at least a first of the primary-signal components to a first format, thereby generating at least one first-format transformed signal component, a second format transformer that transforms at least a second of the primary-signal components to a second format, thereby generating at least a first transformed watermark-signal component, and a third format transformer, coupled to the first format transformer, that transforms the at least one first-format transformed signal component, thereby generating at least a first transformed host-signal component.

18. The system of claim 17, wherein:

the third format transformer is a frequency modulator.

19. The system of claim 17, wherein:

the third format transformer is an amplitude modulator.

20. The system of claim 17, wherein:

the third format transformer is a digital modulator.

21. The system of claim 17, wherein:

the at least one primary signal is an audio signal, the first and second formats are audio formats, and the third format transformer is a frequency modulator.

22. The system of claim 21, wherein:

at least one of the first and second formats is a digital audio format.

23. The system of claim 22, wherein:

one of the first and second formats is an analog audio format.

24. The system of claim 1, wherein:

the first embedding value is selected based on its proximity to the at least one host-signal value.

25. The system of claim 1, wherein:

the pre-processor comprises a transformer that transforms at least a first of the primary-signal components, thereby generating at least a first transformed host-signal component.

26. The system of claim 25, wherein:

the transformer comprises a Fourier transformer.

27. The system of claim 25, wherein:

the transformer comprises a Fourier-Mellin transformer.

28. The system of claim 25, wherein:

the transformer comprises a Radon transformer.

29. The system of claim 25, further comprising:

a pre-transmission processor that applies domain inversion to a composite-signal component having the composite-signal value.

30. The system of claim 25, wherein:

the transformer comprises an encrypter.

31. The system of claim 26, further comprising:

a pre-transmission processor that applies Fourier inversion to a composite-signal component having the composite-signal value.

32. The system of claim 26, further comprising:

a pre-transmission processor that applies Fourier-Mellin inversion to a composite-signal component having the composite-signal value.

33. The system of claim 26, further comprising:

a pre-transmission processor that applies Radon inversion to a composite-signal component having the composite-signal value.

34. The system of claim 1, further comprising:

an information extractor that extracts the first watermark-signal value from the first embedding value.

35. The system of claim 34, wherein the information extractor comprises:

a synchronizer that acquires a composite signal including the composite-signal value;

an ensemble replicator that replicates the first embedding-value set to form a second embedding-value set, each embedding value of the second embedding-value set having the same correspondence to a single watermark-signal value as has the one embedding value of the first embedding-value set from which it is replicated;

a point decoder that selects a second embedding value of the second embedding-value set based on its proximity to the composite-signal value, and that sets the first watermark-signal value to a one of the plurality of watermark-signal values to which the second embedding value corresponds.

36. The system of claim 35, wherein:

the synchronizer comprises an edge aligner that detects an edge of the composite signal for orienting the composite signal.

37. The system of claim 36, wherein:

the synchronizer comprises means for registering the composite signal.

38. The system of claim 37, wherein:

the means for registering the composite signal comprises resampling means employing interpolation kernels.

39. The system of claim 37, wherein:

the pre-processor comprises a transformer that transforms at least a first of the primary-signal components, thereby generating at least a first transformed host-signal component, and the transformer comprises any one or more transform selected from the group consisting of a Fourier transform, a Fourier-Mellin transform, and a Radon transform.

40. The system of claim 36, wherein:

the composite signal comprises a synchronization code, and the synchronizer comprises means for detecting the synchronization code.

41. The system of claim 36, wherein:

the synchronization code comprises a predetermined training sequence.

42. The system of claim 1, wherein:

the embedding value generator generates the first plurality of embedding values based on a first pre-determined relationship between each of the two or more embedding values generated by the third embedding generator.

43. The system of claim 42, wherein:

the first predetermined relationship is predetermined based on trellis-coded quantization.

44. The system of claim 42, wherein:

the first predetermined relationship is predetermined based on lattice quantization.

45. The system of claim 1, wherein:

the embedding value generator generates the first plurality of embedding values based on a second pre-determined relationship between a second embedding value generated by the third embedding generator and a third embedding value generated by a fourth embedding generator of the plurality of embedding generators.

46. The system of claim 45, wherein:

the second predetermined relationship is a dithered relationship and is predetermined based on lattice quantization.

47. A system that watermarks a host signal with a watermark signal, the watermark signal comprising watermark-signal components, each having one of a plurality of watermark-signal values, and the host signal comprising host-signal components, each having one of a plurality of host-signal values, the system comprising:

a pre-processor that operates on one or more primary-signal components of at least one primary signal and one or more supplemental-signal components of a supplemental signal to generate one or more transformed host-signal components;

an ensemble designator that designates a plurality of embedding generators, each corresponding to a single watermark-signal value of a co-processed group of one or more watermark-signal components;

an embedding value generator that generates, by each embedding generator, a plurality of embedding values, the total of each plurality of embedding values comprising a first embedding-value set, wherein at least one embedding value generated by a first embedding generator is not the same as any embedding value generated by a second embedding generator; and a point coder that sets at least one host-signal value of one or more selected transformed host-signal components to a first embedding value of a third embedding generator, thereby forming a composite-signal value, wherein the third embedding generator corresponds to a first watermark-signal value of the group of co-processed watermark-signal components, and wherein the first embedding value is selected based at least in part on its proximity to the at least one host-signal value, and wherein at least one embedding interval of one embedding generator is not the same as any embedding interval of at least one other embedding generator.

48. The system of claim 47, wherein:

the pre-processor comprises a conventional embedder that embeds at least one supplemental-signal component into at least one primary-signal component to generate at least one transformed host-signal component.

49. The system of claim 48, wherein:

the at least one primary signal is an audio signal.

50. The system of claim 48, wherein:

the at least one primary signal is a television video signal.

51. The system of claim 48, wherein:

the supplemental signal is a paging signal.

52. The system of claim 47 wherein:

the pre-processor comprises a conventional embedder that embeds at least one supplemental-signal component into at least one primary-signal component to generate at least one transformed host-signal component, and further wherein the group of co-processed water-mark-signal components is the same as a group of supplemental-signal components.

53. The system of claim 52, wherein:

the at least one primary signal is an audio signal.

54. The system of claim 52, wherein:

the at least one primary signal is a television video signal.

55. The system of claim 52, wherein:

the supplemental signal is a paging signal.

56. The system of claim 47, wherein:

the pre-processor comprises a conventional embedder that embeds at least one supplemental-signal component into at least one primary-signal component to generate at least one intermediate conventional composite-signal component, and a format transformer, coupled to the conventional embedder, that transforms the at least one intermediate conventional composite-signal component, thereby generating at least one transformed host-signal component.

57. The system of claim 56, wherein:

the format transformer is a frequency modulator.

58. The system of claim 56, wherein:

the format transformer is an amplitude modulator.

59. The system of claim 56, wherein:

the format transformer is a digital modulator.

60. The system of claim 56, wherein:

the at least one primary signal is an audio signal, and the format transformer is a frequency modulator.

61. The system of claim 56, wherein:

the group of co-processed watermark-signal components is the same as a group of supplemental-signal components.

62. A system that watermarks a host signal with a watermark signal, the watermark signal comprising watermark-signal components, each having one of a plurality of watermark-signal values, and the host signal comprising host-signal components, each having one of a plurality of host-signal values, the system comprising:

an ensemble designator that designates a plurality of embedding generators, each corresponding to a single watermark-signal value of a co-processed group of one or more watermark-signal components;

an embedding value generator that generates, by each embedding generator, a plurality of embedding values, the total of each plurality of embedding values comprising a first embedding-value set, wherein at least one embedding value generated by a first embedding generator is not the same as any embedding value generated by a second embedding generator;

a point coder that sets at least one host-signal value of one or more selected host-signal components to a first embedding value of a third embedding generator, thereby forming a composite-signal value of a composite-signal component of a composite signal, wherein the third embedding generator corresponds to a first watermark-signal value of the group of co-processed watermark-signal components, and wherein the first embedding value is selected based at least in part on its proximity to the at least one host-signal value, and wherein at least one embedding interval of one embedding generator is not the same as any embedding interval of at least one other embedding generator; and a conventional embedder that embeds at least one of the group of co-processed watermark-signal components into the composite-signal component.

63. A system that watermarks a host signal with a watermark signal, the watermark signal comprising watermark-signal components, each having one of a plurality of watermark-signal values, and the host signal comprising host-signal components, each having one of a plurality of host-signal values, the system comprising:

a block selector that selects one or more host-signal components for embedding;

an ensemble designator that designates a plurality of embedding generators, each corresponding to a single watermark-signal value of a co-processed group of one or more watermark-signal components;

an embedding value generator that generates, by each embedding generator, a plurality of embedding values, the total of each plurality of embedding values comprising a first embedding-value set, wherein at least one embedding value generated by a first embedding generator is not the same as any embedding value generated by a second embedding generator; and a point coder that sets at least one host-signal value of the one or more selected host-signal components to a first embedding value of a third embedding generator, thereby forming a composite-signal value, wherein the third embedding generator corresponds to a first watermark-signal value of the group of co-processed watermark-signal components, and wherein the first embedding value is selected based at least in part on its proximity to the at least one host-signal value, and wherein at least one embedding interval of one embedding generator is not the same as any embedding interval of at least one other embedding generator.

64. The system of claim 63, wherein:

the block selector selects the one or more host-signal components for embedding based upon their having relatively more important information than host-signal components not so selected.

65. The system of claim 63, wherein:

the block selector selects the one or more host-signal components for embedding based upon their having relatively more information than host-signal components not so selected.

66. The system of claim 63, wherein:

the block selector selects the one or more host-signal components for embedding based upon their having relatively less important information than host-signal components not so selected.

67. The system of claim 63, wherein:

the block selector selects the one or more host-signal components for embedding based upon their having relatively less information than host-signal components not so selected.

68. The system of claim 63, wherein:

the block selector selects the one or more host-signal components for embedding based upon a masking characteristic of the host signal.

69. The system of claim 68, wherein:

the masking characteristic is temporal.

70. The system of claim 68, wherein:

the masking characteristic is frequency spectral.

71. The system of claim 68, wherein:

the block selector selects the or more host-signal components for embedding based upon their location in an FM side band.

72. A system that watermarks a host signal with a watermark signal, the watermark signal comprising watermark-signal components, each having one of a plurality of watermark-signal values, and the host signal comprising host-signal components, each having one of a plurality of host-signal values, the system comprising:

a block selector that selects one or more host-signal components for embedding;

an ensemble designator that designates a plurality of embedding generators, each corresponding to a single watermark-signal value of a co-processed group of one or more watermark-signal components;

an embedding value generator that generates, by each embedding generator, a plurality of embedding values, the total of each plurality of embedding values comprising a first embedding-value set, wherein at least one embedding value generated by a first embedding generator is not the same as any embedding value generated by a second embedding generator; and a point coder that, in a first iteration, sets at least one host-signal value of the one or more selected host-signal components to a first embedding value of a third embedding generator, thereby forming a composite-signal value of at least one composite-signal component, wherein the third embedding generator corresponds to a first watermark-signal value of the group of co-processed watermark-signal components, and wherein the first embedding value is selected based at least in part on its proximity to the at least one host-signal value, and wherein at least one embedding interval of one embedding generator is not the same as any embedding interval of at least one other embedding generator;

wherein the point coder is coupled to the ensemble designator to provide that, in a second iteration, the one or more host-signal components selected for embedding by the block selector comprise the at least one composite-signal component.

* * * * *

UNITED STATES PATENT AND TRADEMARK OFFICE

CERTIFICATE OF CORRECTION

PATENT NO. : 6,396,937 B2
APPLICATION NO. : 09/758695
DATED : May 28, 2002
INVENTOR(S) : Chen et al.

It is certified that error appears in the above-identified patent and that said Letters Patent is hereby corrected as shown below:

Please insert the following at column 1, line 5:

-- Sponsorship Information
This invention was made with government support under Grant Number F49620-96-10072 awarded by the Air Force Aerospace Office of Scientific Research, and under Grant Number N00014-96-1-0930 awarded by the Office of Naval Research. The government has certain rights in the invention. --

Signed and Sealed this
Fourteenth Day of February, 2012

David J. Kappos
*Director of the United States Patent and Trademark Office*